US010236947B2

(12) United States Patent
Urzhumov

(10) Patent No.: US 10,236,947 B2
(45) Date of Patent: *Mar. 19, 2019

(54) SYSTEM WITH TRANSMITTER AND RECEIVER CONFIGURED TO PROVIDE A CHANNEL CAPACITY THAT EXCEEDS A SATURATION CHANNEL CAPACITY

(71) Applicant: Elwha LLC, Bellevue, WA (US)

(72) Inventor: Yaroslav Aleksandrovich Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,888

(22) Filed: Feb. 19, 2016

(65) Prior Publication Data

US 2017/0244455 A1    Aug. 24, 2017

(51) Int. Cl.
*H04B 7/0413*    (2017.01)
*H04B 7/02*    (2018.01)
(Continued)

(52) U.S. Cl.
CPC .............. *H04B 7/0413* (2013.01); *H04B 7/02* (2013.01); *H04B 7/046* (2013.01); *H04B 7/0452* (2013.01);
(Continued)

(58) Field of Classification Search
CPC .......... H04B 7/02; H04B 7/04; H04B 7/0404; H04B 7/0413; H04B 7/0452; H04B 7/046;
(Continued)

(56) References Cited

U.S. PATENT DOCUMENTS 6,097,771 A    8/2000    Foschini
6,359,923 B1    3/2002    Agee et al.
(Continued)

FOREIGN PATENT DOCUMENTS

EP    2234354 A1    9/2010
EP    2547004 A2    1/2013
EP    2802089 A1    11/2014

OTHER PUBLICATIONS

Chu, "Physical Limitations of Omni-Directional Antennas", "Journal of Applied Physics, Dec. 1948", , pp. 1163-1175, vol. 19, Publisher: Massachusetts Institute of Technology, Research Laboratory of Electronics, Published in: Boston, Massachusetts.
(Continued)

*Primary Examiner* — Young T Tse
(74) *Attorney, Agent, or Firm* — Fogg & Powers LLC

(57) ABSTRACT

An embodiment of a system includes a first number of antennas, a transmitter, and a receiver. The antennas are each spaced from another of the antennas by approximately a distance and are configured to provide, at one or more wavelengths that are greater than twice the distance, a channel capacity that exceeds a saturation channel capacity. The transmitter is configured to generate a second number of signals each having a wavelength that is greater than twice the distance, the second number related to a third number of signal pipes, and to couple each of the second number of signals to a respective one of the antennas. And the receiver is configured to receive from at least one of the antennas a fourth number of signals each having a wavelength that is greater than twice the distance, and to recover information from each of the fourth number of signals, the fourth number being related to the third number.

30 Claims, 20 Drawing Sheets

(51) Int. Cl.
*H04B 7/0452* (2017.01)
*H04B 7/0456* (2017.01)
*H04J 11/00* (2006.01)

(52) U.S. Cl.
CPC ........ *H04B 7/0486* (2013.01); *H04J 11/0066* (2013.01)

(58) Field of Classification Search
CPC . H04B 7/0486; H04J 11/0063; H04J 11/0066; H01Q 9/42
USPC ........... 375/259–262, 265, 267; 455/81, 272, 455/500, 503, 553.1, 575.7; 343/729, 343/731, 751, 753, 816, 820, 823, 825, 343/826, 843, 844
See application file for complete search history.

(56) References Cited

U.S. PATENT DOCUMENTS

| | | | |
|---|---|---|---|
| 6,501,964 | B1 | 12/2002 | Hudson et al. |
| 6,876,337 | B2 | 4/2005 | Larry |
| 6,891,897 | B1 | 5/2005 | Bevan et al. |
| 7,548,592 | B2 | 6/2009 | Wight |
| 8,456,374 | B1 | 6/2013 | Bagley et al. |
| 2003/0123565 | A1* | 7/2003 | Fukuda ................ H04B 7/0613 375/267 |
| 2004/0121810 | A1 | 6/2004 | Goransson et al. |
| 2005/0009476 | A1 | 1/2005 | Wu et al. |
| 2005/0047322 | A1 | 3/2005 | Sondur |
| 2007/0087756 | A1 | 4/2007 | Hoffberg |
| 2008/0258981 | A1 | 10/2008 | Achour et al. |
| 2008/0292011 | A1* | 11/2008 | Yang ...................... H04B 7/026 375/260 |
| 2009/0034640 | A1 | 2/2009 | Sondur |
| 2009/0041149 | A1 | 2/2009 | Sarris et al. |
| 2009/0219213 | A1 | 9/2009 | Lee et al. |
| 2009/0284431 | A1 | 11/2009 | Meharry et al. |
| 2010/0231464 | A1 | 9/2010 | Huang et al. |
| 2010/0290552 | A1* | 11/2010 | Sasaki ................. H04B 7/0413 375/267 |
| 2011/0003608 | A1* | 1/2011 | Forenza .................... H04B 7/01 455/501 |
| 2011/0075747 | A1* | 3/2011 | Mihota ................ H04B 7/0413 375/260 |
| 2011/0086598 | A1 | 4/2011 | Ali et al. |
| 2012/0164933 | A1 | 6/2012 | Manahan et al. |
| 2012/0194399 | A1 | 8/2012 | Bily et al. |
| 2013/0082867 | A1 | 4/2013 | Malaga |
| 2013/0115886 | A1 | 5/2013 | Khan et al. |
| 2014/0219124 | A1 | 8/2014 | Chang et al. |
| 2014/0266946 | A1 | 9/2014 | Bily et al. |
| 2014/0349696 | A1 | 11/2014 | Hyde et al. |
| 2015/0063482 | A1* | 3/2015 | Zhou ................... H04B 7/0413 375/267 |
| 2015/0194740 | A1 | 7/2015 | Ju |
| 2015/0264627 | A1 | 9/2015 | Perdomo |
| 2017/0063344 | A1 | 3/2017 | Broyde et al. |

OTHER PUBLICATIONS

Dinger et al., "A Survey of Possible Passive Antenna Applications of High-Temperature Superconductors", "IEEE Transactions on Microwave Theory and Techniques, Sep. 1991", , pp. 1498-1507, vol. 39, No. 9.

Gustafsson et al., "Physical limitations on antennas of arbitrary shape", "Proceedings of the Royal Society", Jan. 18, 2007, pp. 2589-2607, vol. 463.

Hansen, "Fundamental Limitations in Antennas", "Proceedings of the IEEE, Feb. 1981", , pp. 170-182, vol. 69, No. 2.

Harrington, "On the Gain and Beamwidth of Directional Antennas", "IRE Transactions on Antennas and Propagation, Jul. 1958", , pp. 219-225.

Harrington, "Effect of Antenna Size on Gain, Bandwidth, and Efficiency", "Journal of Research of the National Bureau of Standards—D. Radio Propagation, Jan.-Feb. 1960", , pp. 1-12, vol. 64D, No. 1.

Harrington, "Antenna Excitation for Maximum Gain", "IEEE Transactions on Antennas and Propagation, Nov. 1965", , pp. 896-903, vol. 13, No. 6.

Harrington, "Resonant Behavior of a Small Aperture Bavked by a Conducting Body", "IEEE Transactions on Antennas and Propagation, Mar. 1982", , pp. 205-212, vol. AP-30, No. 2.

Kalis et al., "Parasitic Antenna Arrays for Wireless MIMO Systems", "2014", , pp. 1-261, Publisher: Springer Science + Business Media, Published in: New York.

Kildal et al., "Further Investigations of Fundamental Directivity Limitations of Small Antennas With and Without Ground Planes", "Antennas and Propagation Society International Symposium, Jul. 2008", , pp. 1-4.

Lo, "Optimization of Directivity and Signal-to-Noise Ratio of an Arbitrary Antenna Array", "Proceedings FO the IEEE, Aug. 1966", , pp. 1033-1045, vol. 54, No. 8.

Mclean, "A Re-Examination of the Fundamental Limits on the Radiation Q of Electrically Small Antennas", "IEEE Transactions on Antennas and Propagation, May 1996", , pp. 672-676, vol. 44, No. 5.

Sievenpiper et al., "Experimental Validation of Performance Limits and Design Guidelines for Small Antennas", "IEEE Transactions on Antennas and Propagation, Jan. 2012", , pp. 1-12, vol. 60.

Yaghjian et al., "Electrically small supergain end-fire arrays", "Radio Science", May 14, 2008, pp. 1-13, vol. 43.

Yaru, "A Note on Super-Gain Antenna Arrays", "Proceedings of the I.R.E, Sep. 1951", , pp. 1081-1085.

Chizhik, Dmitry et al.; "Propagation and Capacities of Multi-element Transmit and Receive Antennas"; IEEE 2001; pp. 438-441.

Fletcher, P.N. et al.; "Mutual coupling in multi-element array antennas and its influence on MIMO channel capacity"; Electronics Letters; Feb. 20, 2003; pp. 342-344; vol. 39, No. 4; IEEE.

PCT International Search Report; International App No. PCT/US2017/018354; May 23, 2017; pp. 1-3.

Stjernman, Anders, "Antenna Mutual Coupling Effects on Correlation, Efficiency and Shannon Capacity"; First European Conference on Antennas and Propagation, Nov. 6-10, 2006; pp. 1-6; Nice, France.

\* cited by examiner

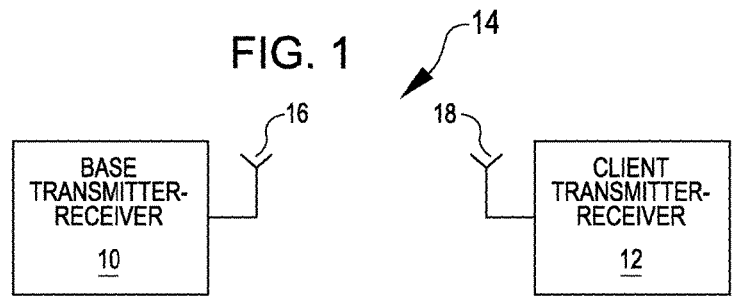
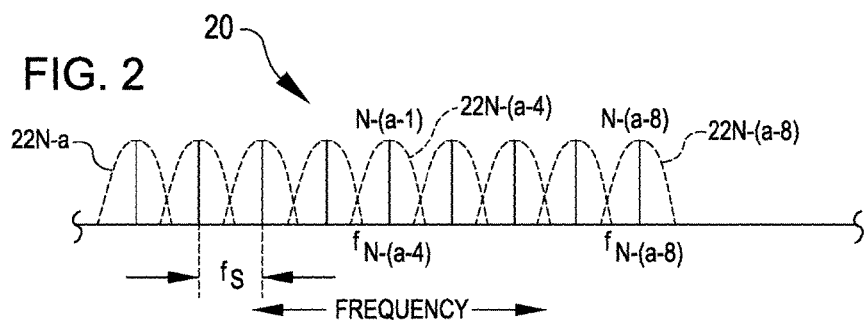
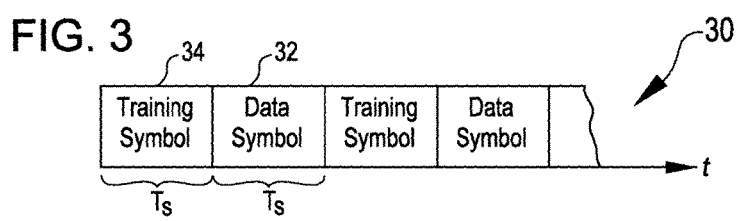
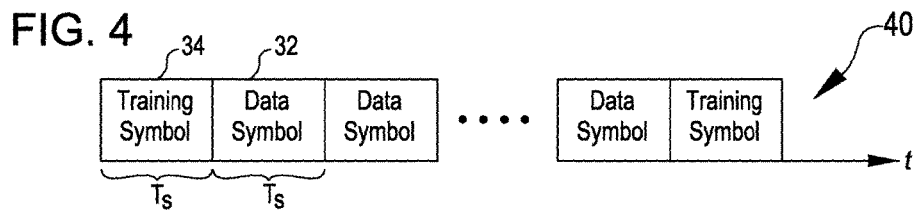
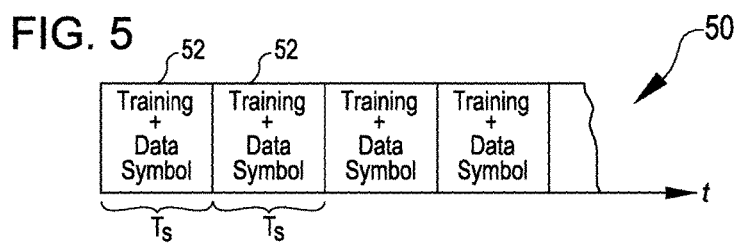

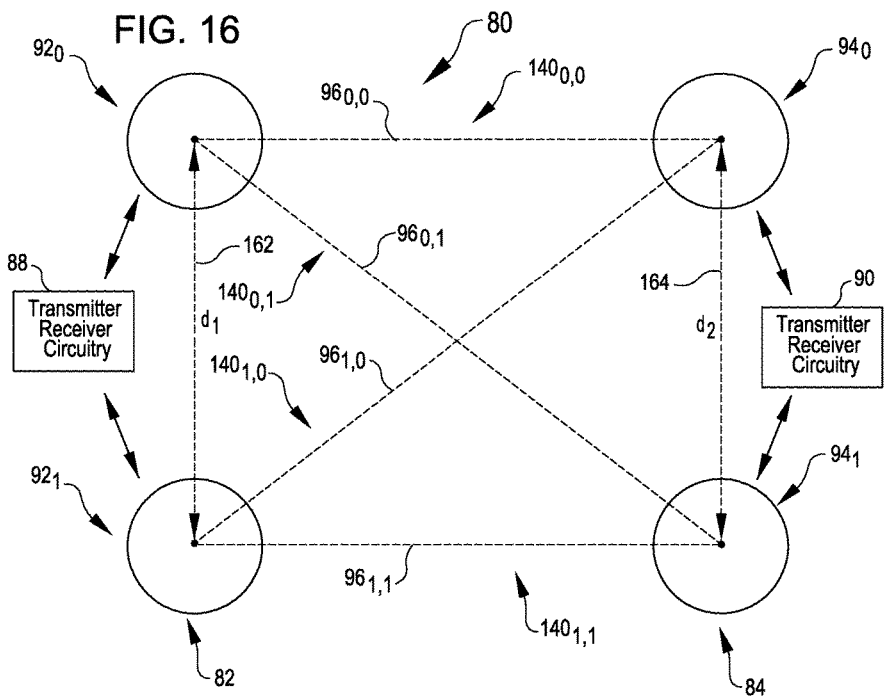
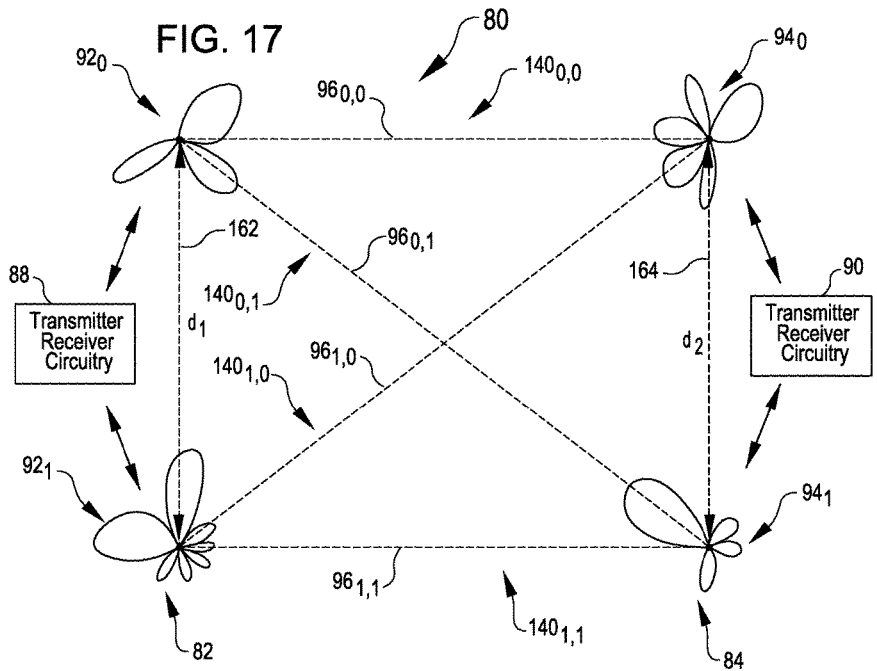

SYSTEM WITH TRANSMITTER AND RECEIVER CONFIGURED TO PROVIDE A CHANNEL CAPACITY THAT EXCEEDS A SATURATION CHANNEL CAPACITY

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

RELATED APPLICATIONS

U.S. patent application Ser. No. 15/048,878, titled TRANSMITTER CONFIGURED TO PROVIDE A CHANNEL CAPACITY THAT EXCEEDS A SATURATION CHANNEL CAPACITY, naming Yaroslav Urzhumov as inventor, filed Feb. 19, 2016, is related to the present application.

U.S. patent application Ser. No. 15/048,880, titled RECEIVER CONFIGURED TO PROVIDE A CHANNEL CAPACITY THAT EXCEEDS A SATURATION CHANNEL CAPACITY, naming Yaroslav Urzhumov as inventor, filed Feb. 19, 2016, is related to the present application.

U.S. patent application Ser. No. 15/048,884, titled SYSTEM WITH TRANSMITTER AND RECEIVER REMOTE FROM ONE ANOTHER AND CONFIGURED TO PROVIDE A CHANNEL CAPACITY THAT EXCEEDS A SATURATION CHANNEL CAPACITY, naming Yaroslav Urzhumov as inventor, filed Feb. 19, 2016, is related to the present application.

If the listings of applications provided above are inconsistent with the listings provided via an ADS, it is the intent of Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

An embodiment of a system includes a first number of antennas, a transmitter, and a receiver.

The first number of antennas are each spaced from another of the antennas by approximately a distance and are configured to provide, at one or more wavelengths that are greater than twice the distance, a channel capacity that exceeds a saturation channel capacity. That is, each antenna is each spaced from at least one of the other antennas by a distance shorter than approximately half the operational wavelength such that the antennas are configured to provide, at the operational wavelength, a channel capacity that exceeds a saturation channel capacity at the operational wavelength.

The transmitter is configured to generate a second number of signals each having a wavelength that is greater than twice the distance, the second number related to a third number of signal pipes, and to couple each of the second number of signals to a respective one of the antennas.

And the receiver is configured to receive from at least one of the antennas a fourth number of signals each having a wavelength that is greater than twice the distance, the fourth number related to the third number, and to recover information from each of the fourth number of signals.

Such a transmitter-receiver system, in which the transmitter and receiver are part of the same apparatus (e.g., an 802.11 compatible wireless router) and share the same antennas, can be a multiple-input-multiple-output orthogonal-frequency-division-multiplexing (OFDM-MIMO) transmitter-receiver that can be configured to increase the information-carrying capacity of a channel (i.e., increase the channel capacity) beyond a saturation capacity of the channel, where the saturation capacity is the channel capacity that would be provided by the transmitter-receiver if all of the antennas were to present the same antenna characteristics (e.g., gain, phase, polarization) to the antennas of a remote system. Were all of the antennas to present the same antenna characteristics to each of the remote antennas, then, for the transmitter-receiver to be able to use all of the antennas for transmitting or receiving respective OFDM symbols, the minimum spacing between the antennas would be one half of the OFDM carrier signal's free-space wavelength—this minimum, i.e., saturation, spacing can be deduced from the Nyquist sampling theorem and the diffraction theorem, which sets the maximum upper limit on the transverse wavenumbers that can propagate from transmit antennas to the far fields of their apertures. But configuring the antennas such that they each present at least one different antenna characteristic to each remote antenna allows the antennas to be spaced apart by less than the saturation spacing. Consequently, for a given footprint of the transmitter-receiver, configuring the antennas in this manner allows the transmitter-receiver to increase the channel capacity above the saturation capacity by using more antennas to transmit and to receive OFDM symbols. Although the transmitter-receiver system is described, for example purposes, as being suitable for use in a MIMO-OFDM system to transmit and receive OFDM signals, the transmitter-receiver system is suitable for use in applications other than OFDM and MIMO-OFDM applications. For example, the transmitter-receiver system may be used in any application in which multiple signals are simultaneously transmitted or simultaneously received.

BRIEF DESCRIPTION OF THE FIGURES

FIG. 1 is a diagram of base and client single-input-single-output orthogonal-frequency-division-multiplexing (SISO-OFDM) transmitter-receiver systems.

FIG. 2 is a plot of the frequencies of the subcarrier signals (solid lines) generated by the transmitting transmitter-receiver of FIG. 1, and of the frequency "slots" (dashed lines) that the modulated subcarrier signals can respectively occupy at the receiving transmitter-receiver of FIG. 1.

FIG. 3 is a timing diagram of a sequence of OFDM training and data symbols that the transmitter-receivers of FIG. 1 can transmit and receive.

FIG. 4 is a timing diagram of another sequence of OFDM training and data symbols that the transmitter-receivers of FIG. 1 can transmit and receive.

FIG. 5 is a timing diagram of a sequence of OFDM combined training and data symbols that the transmitter-receivers of FIG. 1 can transmit and receive.

FIGS. 16 and 17 are respective planar views of the MIMO-OFDM transmitter-receivers of FIG. 7, where each of the antennas has an omnidirectional radiation pattern in the view plane of FIG. 16, and where each of the antennas has a non-omnidirectional radiation pattern in the view plane of FIG. 17 (the view plane of FIG. 17 is different from the view plane of FIG. 16), according to an embodiment.

DETAILED DESCRIPTION

Figure 6:
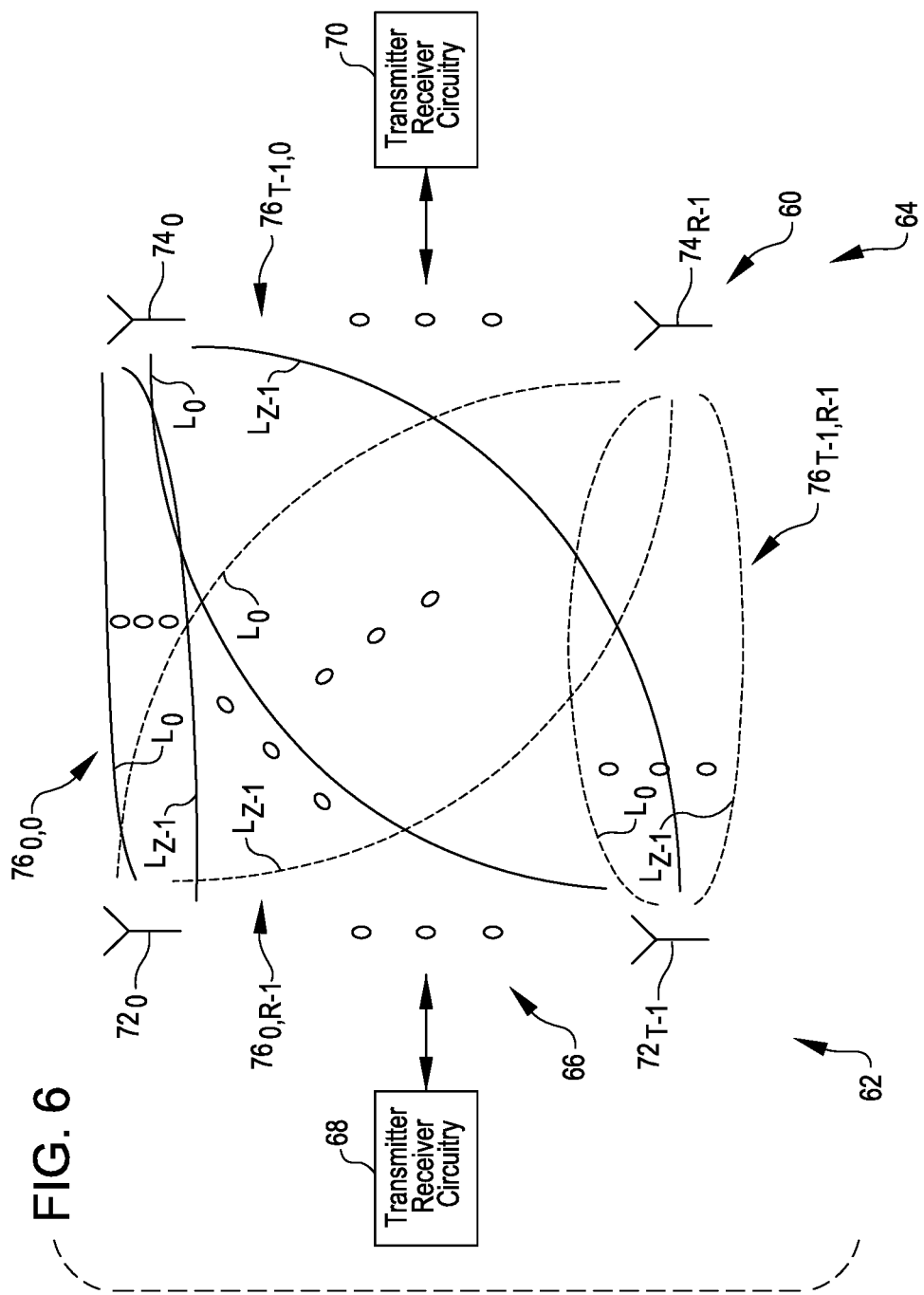
FIG. 6 is a diagram of two MIMO-OFDM transmitter-receivers and the multiple communication paths between their antennas, where the minimum spacing between the antennas of each transmitter-receiver is at least one half the wavelength of the MIMO-OFDM carrier signal.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

One or more embodiments are described with reference to the drawings, wherein like reference numerals may be used to refer to like elements throughout. In the following description, for purposes of explanation, numerous specific details are set forth in order to provide a thorough understanding of the one or more embodiments. It may be evident, however, that one or more embodiments may be practiced without these specific details. In other instances, well-known structures and devices are shown in block-diagram form in order to facilitate describing one or more embodiments.

Since the advent of telegraph and radio, scientists and engineers have been trying to discover new techniques for increasing the amount of information that can be carried by an electromagnetic signal propagating over a communication channel.

The theoretical maximum amount of information that an electromagnetic signal can carry over a given communication channel, i.e., the maximum channel capacity, is given by the Shannon-Hartley theorem, which is represented by the following equation:

$$C = B \cdot \log_2\left(1 + \frac{s}{n}\right) \tag{1}$$

where C is the channel capacity in bits/second (bits/s), B is the passband bandwidth in Hertz (Hz) of a modulated signal, S is the average received signal power in Watts (W) over the passband bandwidth, n is the average noise or interference in W over the passband bandwidth, and S/n is the signal-to-noise ratio (SNR) of the transmitted electromagnetic communication signal to the Gaussian noise interference expressed as a linear power ratio.

Although an in-depth analysis and discussion of the Shannon-Hartley theorem is omitted from this disclosure for brevity, one can see from equation (1) that to increase the channel capacity, he/she can increase the passband bandwidth B of the modulated signal, the signal power P with which the communication signal is transmitted (to increase the average received signal power S), or both the passband bandwidth B and the transmitted signal power.

One can also see from equation (1) that increasing the passband bandwidth B provides "more bang for the buck" than increasing the received signal power S (by increasing the transmitted signal power P). Increasing the bandwidth B provides, at least theoretically, a linear increase in the channel capacity C. For example, doubling the bandwidth B doubles the channel capacity C, tripling the bandwidth B triples the channel capacity C, quadrupling the bandwidth B quadruples the channel capacity C, and so on. But increasing the received signal power S provides, for signal-to-noise ratio greater than one, only a logarithmic increase in the channel capacity C. For example, assume that S=n=1 W. To double the channel capacity C one would need to triple the received signal power S (S=3), to triple the channel capacity C one would need to increase the received signal power S by a factor of 7 (S=7), and to quadruple the channel capacity C, one would need to increase the received signal power S by a factor of 15 (S=15)!

Consequently, scientists and engineers have developed techniques to linearly increase the channel capacity of a communication channel by effectively increasing the passband bandwidth B of the information-carrying electromagnetic signal.

Referring to FIGS. 1-5, one such technique is orthogonal-frequency-division multiplexing (OFDM).

FIG. 1 is a diagram of a single-input-single-output (SISO)-OFDM base transmitter-receiver 10 and of a SISO-OFDM client transmitter-receiver 12, which communicates with the base transmitter receiver over a wireless communication channel 14 via OFDM signals. For example, the base 10 may be a wireless router in a home or office, and the client 12 may be a computer, tablet, or smart phone that communicates with the base via OFDM signals. The base 10 includes one or more antennas 16, and the client 12 includes one or more antennas 18. SISO means that the base 10 uses only one antenna 16 for signal transmission and signal reception, and that the client 12 uses only one antenna 18 for signal transmission and signal reception. Therefore, each antenna 16 of the base 10 may function as only a transmit antenna, as only a receive antenna, or as a transmit-receive antenna. For example, in the former two cases, the base 10 includes two antennas 16, one for transmitting and one for receiving, and in the latter case, the base includes a single antenna 16 for both transmitting and receiving. Similarly, each antenna 18 of the client 12 may function as only a transmit antenna, as only a receive antenna, or as a transmit-receive antenna.

FIG. 2 is a frequency plot of a portion of an OFDM signal transmitted and received by the base 10 and client 12 of FIG. 1. As described in more detail below, an OFDM signal includes multiple subcarrier signals, and, therefore, linearly increases the channel capacity C by increasing the passband bandwidth B, at least theoretically, up to a factor equal to the number of subcarrier signals. For example, if the OFDM signal includes N subcarrier signals, then, at least theoretically, the OFDM signal can increase the channel capacity by a factor of N as compared to a signal having only a single carrier signal (N=1). Or, viewed another way, an OFDM signal divides the channel into N subchannels each having a maximum capacity given by equation (1).

In more detail, FIG. 2 is a frequency plot of some of the N subcarrier signals (here, the subcarrier signals N–a to N–(a–8) are shown in solid line and are hereinafter called "subcarriers") of an OFDM symbol 20, which may be transmitted by the base 10 and received by the client 12 of FIG. 1, or vice-versa (as further described below in conjunction with FIGS. 3-5, an OFDM symbol is a time-domain portion of an OFDM signal in which the subcarriers are modulated with the same respective information for a symbol period $T_a$). Each of the subcarriers N–a to N–(a–8) has a respective frequency $f_{N-a}$ to $f_{N-(a-8)}$, and is orthogonal to the other subcarriers. In this context, "orthogonal" means that, in the absence of inter-carrier interference (discussed below), noise, and other distortion, one may construct a time-domain signal from these modulated subcarriers (e.g., using an Inverse Fast Fourier Transform (IFFT)), and then extract these modulated subcarriers, and the information that they carry, from the time domain signal (e.g., using a Fast Fourier Transform (FFT)) with no loss of information. Furthermore, although the base 10 is described as transmitting the OFDM signal to the client 12 in the example below, it is understood that this example would be similar if the client were transmitting the OFDM signal to the base.

Referring to FIGS. 1-2, the transmitter of the base 10 modulates each of at least some of the N subcarriers with a respective information value for a time period $T_s$, which is hereinafter called a symbol period—the transmitter may not use one or more of the N subcarriers due to, for example, excessive interference at the frequencies of these subcarriers. Examples of suitable subcarrier-modulation techniques include binary phase-shift keying (BPSK), quadrature phase shift keying (QPSK), and quadrature amplitude modulation (QAM). In the latter two schemes, each subcarrier has two sinusoidal components at the subcarrier frequency, a component at 0° phase (e.g., cos ωt) and an orthogonal component at ±90° phase (e.g., ±sin ωt), and each component can be amplitude modulated such that the subcarrier carries multiple bits of information. For example, using the modulation technique 256 QAM, each subcarrier component carries four bits of information such that each subcarrier carries eight bits of information.

Then, the transmitter of the base 10 modulates an OFDM carrier signal having a frequency $f_c$ (and wavelength $\lambda_c$) with the N subcarriers to generate an OFDM signal, and transmits this OFDM signal to the client 12. Modulating the OFDM carrier signal with the modulated OFDM subcarriers effectively shifts the N subcarriers (the baseband OFDM signal) up to $f_c$. Example values for $f_c$ include 2.4 GHz, 3.6 GHz, 4.9 GHz, 5.0 GHz, 5.9 GHz, and 60 GHz, which are specified by the IEEE 802.11 standard.

Still referring to FIGS. 1-2, the frequency spacing $f_s$ between adjacent ones of the N subcarriers is typically constant, and is conventionally selected to minimize inter-carrier interference (ICI), which is a phenomenon that occurs if energy from one subcarrier "spills over" to the frequency slot of another subcarrier at the receiver of the client 12. At the transmitter of the base 10, each of the active ones of the N subcarriers has a frequency $f_k$ (for k:0 to N−1) represented by a respective one of the solid lines (only the frequencies $f_k$ for k=N−a to N−(a−8) are shown in FIG. 2), and the bandwidth associated with each subcarrier is $f_k$±the frequency of the information signal that modulates the subcarrier (typically small compared to $f_k$). But at the receiver of the client 12, the respective bandwidth associated with each subcarrier frequency $f_k$ may be effectively shifted within a respective frequency slot 22 indicated by the dashed lines (only the slots 22 of the frequencies $f_k$ for k=N−a to N−(a−8) are shown in FIG. 2). For example, at the receiver of the client 12, the bandwidth associated with the frequency $f_{N-a}$ of the subcarrier k=N−a may be shifted to another location within the frequency slot $22_{N-a}$, or may be "spread" over multiple locations within this frequency slot. Causes for this frequency shifting/spreading may include, for example, the existence of multiple transmission paths within the channel and the existence of channel conditions (e.g., humidity, temperature) that may effectively shift the respective phase and attenuate the respective amplitude of one or more of the modulated subcarrier. But as long as the bandwidth associated with one subcarrier k does not spill over into the slot 22 of another subcarrier k, or there is minimum spillage, then the receiver of the client 12 can recover the information transmitted by the transmitter of the base 10.

FIG. 3 is a time plot of an OFDM signal 30, which includes data symbols 32 and training symbols 34 each having a duration of one symbol period $T_s$. Each data symbol 32 carries the useful information, i.e., data, to be transmitted to a receiver, and is the combination of all of the data information (i.e., data subsymbols) that modulate the respective subcarriers k during a data-symbol period $T_s$. Furthermore, the information carried by each data symbol 32 is unknown to the receiver ahead of time (i.e., a priori). In contrast, each training symbol 34 carriers information that is known a priori at the receiver and allows the receiver to determine the state of the channel, i.e., to estimate the effects (e.g., phase shift, attenuation) that channel imparts to the OFDM signal at each of the subcarrier frequencies $f_k$. Similar to a data symbol 32, each training symbol 34 is the combination of all the training information (i.e., training subsymbols) that modulate the respective subcarriers during a training-symbol period $T_s$.

Referring to FIGS. 1-3, to allow the receiver of the client 12 to recover the transmitted data subsymbols 32 in the presence of ICI and other interference or noise, the transmitter of the base 10 transmits an OFDM training symbol 34 shortly before transmitting each OFDM data symbol 32. That is, the transmitter of the base 10 transmits a training symbol 32 during a first OFDM symbol period, and transmits a data symbol 32 during a second, subsequent OFDM symbol period. Because the receiver of the client 12 "knows" the identity of the transmitted training symbol 34 a priori, the receiver characterizes the channel 14 by comparing the received training symbol with the known transmitted training symbol 34 (the received training symbol typically differs from the transmitted training symbol due to the phase shift, attenuation, noise, and other distortion introduced to the OFDM signal by the channel). For example, the receiver can characterize the channel 14 by generating an N×N matrix $\hat{H}$ of estimated complex frequency-domain coefficients that respectively represent the estimated frequency response (e.g., the imparted ICI, amplitude attenuation, and phase shift) of the channel at each of the subcarrier frequencies $f_k$—the "^" indicates that H is an estimate of the actual channel matrix H. The receiver of the client 12 can then use this channel estimation matrix $\hat{H}$ to recover the transmitted data symbol 32 from the respective received data symbol (the received data symbol typically differs from the transmitted data symbol due to the phase shift, attenuation, noise, and other distortion introduced to the OFDM signal by the channel).

FIG. 4 is a time plot of an OFDM signal 40 in which a training symbol 34 is transmitted once every A data symbols 32, where A>1. Because the OFDM signal 40 includes more data symbols 32 per training symbol 34 than does the OFDM signal 30 of FIG. 3, for a given signal bandwidth, signal power, and channel conditions, the OFDM signal 40 can have a higher data throughput than the OFDM signal 30. The OFDM signal 40 may be suitable, for example, in applications where the channel conditions are relatively static, i.e., change relatively slowly over time, compared to the symbol period $T_s$.

FIG. 5 is a time plot of an OFDM signal 50 in which subcarriers carrying training information (hereinafter called pilot subcarriers) are combined with subcarriers carrying data (hereinafter called data subcarriers) to form combined symbols 52. The OFDM signal 50 may be suitable, for example, in applications where the channel conditions are relatively dynamic, i.e., change relatively rapidly over time, compared to the symbol period $T_s$. For example, the OFDM signal 50 may be suitable where the base 10 and client 12 of FIG. 1 are moving relative to one another.

Referring to FIGS. 1-5, in addition to increasing the channel capacity linearly as compared to a single-carrier technique, OFDM techniques can have other benefits. Because the passband bandwidth of each subchannel (each subchannel is the respective portion of the channel 14 that corresponds to a respective subcarrier k) is relatively narrow, each subchannel can often be modeled as a flat-fading subchannel, which means that the subchannel can be modeled as having constant (i.e., non-time varying) attenuation, phase shift, noise, and other distortion over the symbol period $T_s$. The ability to model each subchannel as a flat-fading subchannel can simplify the channel-estimation procedure, and can decrease the error rate inherent in the recovery of data from an OFDM data symbol. Furthermore, an OFDM signal can be more tolerant of narrow-band interference than a single-carrier technique. For example, if there is interference that renders one or more OFDM subcarriers k unusable to carry information, then the OFDM transmitter can still transmit information on the other OFDM subcarriers k.

Referring again to equation (1), one way to further increase the channel capacity using an OFDM technique is to increase the number N of subcarriers k. Theoretically, as long as the transmission power of each subcarrier k remains the same regardless of the number N of subcarriers, the channel capacity C can increase linearly with N. That is:

$$C = \sum_{k=0}^{k=N-1} B_k \log_2\left(1 + \frac{S_k}{n_k}\right) \qquad 2)$$

where C is the total OFDM channel capacity in bits/s), $B_k$ is the passband bandwidth in Hz of the modulated $k^{th}$ subcarrier, $S_k$ is the average received signal power in W over the passband bandwidth for the modulated $k^{th}$ subcarrier, and $n_k$ is the average noise or interference in W over the passband bandwidth for the modulated $k^{th}$ subcarrier.

Although increasing the number N of OFDM subcarriers k to increase the channel capacity C may work in theory, in practice a transmitter typically cannot arbitrarily continue to maintain the same transmitted signal power for each subcarrier k added to an OFDM signal. The total transmission power $P_{total}$ of an OFDM transmitter is typically limited to a maximum value $P_{max}$ such that with the addition of each subcarrier k, the transmission power $P_k$ per subcarrier k drops so that the total transmission power $P_{total}$ remains constant at $P_{max}$. Although adding subcarriers k can still increase the channel capacity C where the total transmission power is limited (this is because the channel capacity C increases linearly with the addition of each subcarrier k, but decreases only logarithmically with a corresponding reduction in the per-subcarrier received power $S_k$), at some point the transmission power $P_k$ per subcarrier k will become so low that the addition of additional subcarriers k will not increase the channel capacity C, and may actually decrease the channel capacity because there is too little transmission power per subcarrier.

But as described below in conjunction with FIG. 6, engineers and scientists have discovered that they can further increase the channel capacity C by using a multiple-input-multiple-output (MIMO)-OFDM technique, which leverages the diversity of the communication channel to increase the channel capacity beyond the channel capacity of an OFDM technique while still transmitting within the same passband B as an OFDM technique using a same number N of subcarriers k.

FIG. 6 is a diagram of a MIMO-OFDM system 60, which includes two MIMO-OFDM transmitter-receivers 62 and 64, and of the portion 66 of the communication channel between the transmitter-receivers. The transmitter-receivers 62 and 64 respectively include transmit-receive circuitry 68 and 70 and antennas 72 and 74, the channel portion 66 includes subchannel portions 76 each located between a respective pair of antennas 72 and 74, and the minimum spacing between the antennas 72 and the minimum spacing between the antennas 74 is at least one half the wavelength $$\left(\frac{\lambda_c}{2}\right)$$

of the MIMO-OFDM carrier signal at frequency $f_c$. The differences between the subchannel portions 76 and the subchannels and the channel portion 66 and the channel, and the reason for the minimum antenna spacing of $$\frac{\lambda_c}{2},$$

are described below. Furthermore, for example purposes, it is assumed that the transmitter-receiver 62 is transmitting MIMO-OFDM signals with the antennas 72, and that the transmitter-receiver 64 is receiving the transmitted signals with the antennas 74, it being understood that the below description would be similar if the transmitter-receiver 64 where transmitting the signals and the transmitter-receiver 62 were receiving the signals. Moreover, it is assumed that the number T of transmitting antennas 72 is equal to the number R of receiving antennas 74.

Each subchannel portion 76 includes Z>1 communication paths L, where Z is an integer with a typical range 2≤Z≤10. The paths L are typically caused by one or more objects (e.g., furniture, walls, people) that are located between, or otherwise near, the antennas 72 and the antennas 74 and that scatter and redirect the MIMO-OFDM signals transmitted from the antennas 72. For example, the subchannel portion $76_{0,0}$ includes Z communication paths $L_0$-$L_{Z-1}$. That is, the MIMO-OFDM signal transmitted from the antenna $72_0$ traverses each path $L_0$-$L_{Z-1}$ of the subchannel portion $76_{0,0}$ to arrive at the antenna $74_0$ such that the antenna $74_0$ receives Z versions of the signal transmitted from the antenna $72_0$. Typically, the receiver 64 distinguishes the communication paths $L_0$-$L_{Z-1}$ from one another by the time delay (hereinafter "path delay") that each path $L_0$-$L_{Z-1}$ imparts to the signal transmitted by the antenna $72_0$. For example, assuming that $L_0$ is the shortest path, the path delay that the path $L_0$ imparts to the signal transmitted from the antenna $72_0$ is considered to be zero, and the path delays imparted to the transmitted signal by the other paths $L_1$-$L_{Z-1}$ are given values that indicate how much longer they are than the path delay of $L_0$. For example, $L_1$ may have a path delay of 0.25 microseconds (p) because it takes the version of the signal transmitted from the antenna $72_0$ along the path $L_1$ an additional 0.25 µs to arrive at the antenna $74_0$ as compared to the time it takes the version of the signal transmitted along the path $L_0$ to arrive at the antenna $74_0$. Furthermore, if multiple paths L have the same delay, then the receiver 64 treats these paths as a single path L. Moreover, because the path-causing objects may move over time (or the transmitter 62 and the receiver 64 may move relative to one another over time), the receiver 64 may periodically recalculate the number Z, and path delays, of the paths L in each subchannel portion 76. Alternatively, the receiver 64 may assume that the number Z, and the path delays, of the paths L are fixed; for example, a look-up table (LUT) of the transmitter-receiver circuitry 68 may store values for Z and path delays for a number of different applications (e.g., use as, or as part of, a stationary wireless router, and use as, or as part of, a mobile device) of the receiver 64.

Still referring to FIG. 6, a property of the described MIMO-OFDM technique is that each receive antenna $74_0$-$74_{R-1}$ receives, over respective subchannel portions 76, the MIMO-OFDM signals transmitted by each of the transmit antennas $72_0$-$72_{T-1}$. For example, the receive antennas $74_0$-$74_{R-1}$ receive the MIMO-OFDM signal transmitted from the transmit antenna $72_0$ over the subchannel portions $76_{0,0}$-$76_{0,R-1}$, respectively (only the subchannel portions $76_0$ and $76_{0,R-1}$ are shown in FIG. 6), receive the signal transmitted from the transmit antenna $72_1$ (not shown in FIG. 6) over the subchannel portions $76_{1,0}$-$76_{1,R-1}$, respectively (not shown in FIG. 6), . . . , and receive the signal transmitted from the transmit antenna $72_{T-1}$ over the subchannel portions $76_{T-1,0}$-$76_{T-1,R-1}$, respectively (only the subchannel portions $76_{T-1,0}$ and $76_{T-1,R-1}$ are shown in FIG. 6).

Furthermore, the collection of subchannel portions 76 over which a signal transmitted by a transmit antenna 72 propagates to the receive antennas 74 is hereinafter referred to as a signal-pipe portion (the difference between a signal-pipe portion and a signal pipe is described below). For example, a signal-pipe portion 0 includes all of the subchannel portions 76 between the transmit antenna $72_0$ and each of the receive antennas $74_0$-$74_{R-1}$, a signal-pipe portion 1 includes all of the subchannel portions 76 between the transmit antenna $72_1$ (not shown in FIG. 6) and each of the receive antennas $74_0$-$74_{R-1}$, . . . , and a signal-pipe portion T-1 includes all of the subchannel portions 76 between the transmit antenna $72_{T-1}$ and each of the receive antennas $74_0$-$74_{R-1}$.

Therefore, the maximum number of signal-pipe portions that the channel portion 66 can support is equal to the number T of transmit antennas, and, at least in theory, a signal-pipe portion exists for a transmit antenna 72 as long as there is at least one viable subchannel portion 76 between the transmit antenna and at least one of the receive antennas 74.

Still referring to FIG. 6, a benefit of a MIMO-OFDM technique is that each transmit antenna 72 can transmit a respective data symbol (e.g., a data symbol 32 of FIGS. 3-4) over the same N subcarriers k as the other transmit antennas. That is, instead of transmitting just one data symbol over a set of N subcarriers k as in the SISO-OFDM technique described above in conjunction with FIGS. 1-5, a MIMO-OFDM technique allows the transmitter-receiver 62 to transmit up to T respective data symbols over the same set of N subcarriers k. It can be shown that under certain conditions, the Shannon-Hartley capacity formula for a MIMO-OFDM system, such as the MIMO-OFDM system 60, is given by the following equation:

$$C = T \cdot B \cdot \log_2(1+\rho) \quad (3)$$

where T is the number of transmit antennas and ρ is the sum of the SNRs associated with the individual subchannel portions 76. The conditions under which this equation holds true include that the number T of transmit antennas equals the number R of receive antennas, the channel-state information (e.g., the attenuations and phase shifts imparted by the subchannels) is known at the receiver, the eigenvalues of the singular value decomposition (SVD) of the channel-estimation matrix $\hat{H}$ are equal and are such that the channel does not attenuate any of the transmitted signals more than a threshold amount, and the channel-estimation matrix $\hat{H}$ is effectively full rank.

So, in other words, a MIMO-OFDM technique allows a linear increase, by up to a factor of T, of the channel capacity C; that is, a MIMO-OFDM system can be thought of as a system including T SISO-OFDM systems.

Although a rigorous mathematical derivation and discussion of equation (3) is omitted for brevity, a more detailed derivation and discussion can be found in Hampton, J., *Introduction to MIMO Communications*, Cambridge University Press 2014, which is incorporated by reference in its entirety.

Using a MIMO-OFDM technique to increase the channel capacity C by up to a factor of T as described above is often called spatial multiplexing, and the ability to spatially multiplex respective data symbols from T>1 transmit antennas depends on the diversities and the gains (in the context of this disclosure, gain is the inverse of attenuation) of the subchannels as described below.

The following are examples to illustrate the above points.

Still referring to FIG. 6, for example purposes, assume that the MIMO-OFDM system 60 is a 2×2 system, which means that the system includes T=2 two transmit antennas $72_0$-$72_1$ (also labeled $T_0$ and $T_1$ below) and R=2 two receive antennas $74_0$-$74_1$ (also labeled $R_0$ and $R_1$ below), and that the channel portion 66 between the transmit and receive antennas imparts only a gain (no phase shift, no noise, and no other distortion) to the transmitted signals. Further assume that the transmitter 62 can transmit data symbols each having one of the following values: 0, 1, 2, 3, and 4.

In a first example, it is assumed that the communication channel has no diversity, the antenna $T_0$ transmits a data symbol $DS_0$, the antenna $T_1$ transmits a data symbol $DS_1$, and the combined signal power that the receive antennas $R_0$ and $R_1$ together receive from each of the transmit antennas $T_0$ and $T_1$ is the same (this indicates that the eigen values of the above-mentioned singular value decomposition of the estimated channel matrix are equal). The estimated channel matrix $\hat{H}$ is as follows:

|       | $R_0$         | $R_1$         |
|-------|---------------|---------------|
| $T_0$ | $H_{0,0} = 2$ | $H_{0,1} = 2$ |
| $T_1$ | $H_{1,0} = 2$ | $H_{1,1} = 2$ | where $H_{0,0}$ is the normalized channel gain of the sub channel that includes the subchannel portion $76_0$ between the antennas $T_0$ and $R_0$, $H_{0,1}$ is the normalized channel gain of the subchannel that includes the subchannel portion $76_{0,1}$ between the antennas $T_0$ and $R_1$, $H_{10}$ is the normalized channel gain of the subchannel that includes the subchannel portion $76_{1,0}$ (not shown in FIG. 6) between the antennas $T_1$ and $R_0$, and $H_{1,1}$ is the normalized channel gain of the subchannel that includes the subchannel portion $76_{1,1}$ (not shown in FIG. 6) between the antennas $T_1$ and $R_1$ (although the subchannel gains in this example are shown being greater than one to simplify the example, in actuality the gains are typically less than one). The channel that includes the channel portion 66 has no diversity because the subchannel gains $H_{0,0}$, $H_{0,1}$, $H_{1,0}$, and $H_{1,1}$ are all equal to the same value 2.

Continuing with the example, the receiver 64 obtains the following two equations, one from each receive antenna $R_0$ and $R_1$, where the MIMO-OFDM signals received by the receive antennas $R_0$ and $R_1$ are labeled $u_0$ and $u_1$, respectively:

$$u_0=8=DS_0 \cdot H_{0,0}+DS_1 \cdot H_{1,0} \quad (4)$$

$$u_1=8=DS_0 \cdot H_{0,1}+DS_1 \cdot H_{1,1} \quad (5)$$

Because $H_{0,0}=H_{0,1}=H_{1,0}==2$, one can divide both sides of equations (4) and (4) by 2 to obtain the following equations:

$$u_0/2=4=DS_0+DS_1 \quad (6)$$

$$u_1/2=4=DS_0+DS_1 \quad (7)$$

Although there are two equations with two unknowns, one cannot obtain unique solutions for $DS_0$ and $DS_1$ because equations (6) and (7) are linearly dependent on one another. That is, any of the following pairs of values of $DS_0$ and $DS_1$ are solutions to equations (6) and (7): $DS_0=0$ and $DS_1=4$, $DS_0=1$ and $DS_1=3$, $DS_0=2$ and $DS_1=2$, $DS_0=3$ and $DS_1=1$, and $DS_0=4$ and $DS_1=0$. Because the receiver 64 only "cares" about recovering the correct pair of data symbols $DS_0$ and $DS_1$, the last two of these possibilities can be eliminated; but this still leaves the following three possible value pairs for $DS_0$ and $DS_1$: 0 and 4, 1 and 3, and 2 and 2. Because there are multiple solutions for the values of $DS_0$ and $DS_1$, the receiver 64 cannot accurately determine the values of $DS_0$ and $DS_1$.

In a second example, all of assumptions of the first example hold except that it is assumed that the communication channel has partial diversity, not zero diversity. The estimated channel matrix $\hat{H}$ is as follows:

|       | $R_0$         | $R_1$         |
|-------|---------------|---------------|
| $T_0$ | $H_{0,0} = 2$ | $H_{0,1} = 6$ |
| $T_1$ | $H_{1,0} = 1$ | $H_{1,1} = 3$ |

The channel has partial diversity in this example because the subchannel gains $H_{0,0}$, $H_{0,1}$, $H_{1,0}$, and $H_{1,1}$ are not equal.

In this example, the receiver 64 obtains the following two equations from the receive antennas $R_0$ and $R_1$:

$$u_0=8=DS_0 \cdot H_{0,0}+DS_1 \cdot H_{1,0}=2 \cdot DS_0+6 \cdot DS_1 \quad (8)$$

$$u_1=4=DS_0 \cdot H_{0,1}+DS_1 \cdot H_{1,1}=1 \cdot DS_0+3 \cdot DS_1 \quad (9)$$

Dividing equations (8) and (9) by 2 yields the following equations:

$$u_0=4=DS_0+3 \cdot DS_1 \quad (10)$$

$$u_1=4=DS_0+3 \cdot DS_1 \quad (11)$$

Although there are two equations with two unknowns, unique solutions for $DS_0$ and $DS_1$ cannot be obtained because equations (10) and (11) are linearly dependent on one another. That is, any of the following pairs of values of $DS_0$ and $DS_1$ are solutions to equations (10) and (11): $DS_0=1$ and $DS_1=1$, and $DS_0=4$ and $DS_1=0$. Again, because there are multiple solutions to equations (10) and (11), the receiver 64 cannot accurately determine the values of $DS_0$ and $DS_1$.

In the above two examples, because the equations yielded by the estimated channel matrix $\hat{H}$ are linearly dependent on one another, and, therefore, cannot provide a unique solution for $DS_0$ and $DS_1$, the rows and columns of $\hat{H}$ are said to be linearly dependent on one another.

Consequently, the estimated channel matrices $\hat{H}$ in the above examples are said to have a rank r that is less than full rank, because full rank would be r=2, but the actual rank r=1.

It can be shown that the rank r of an estimated channel matrix $\hat{H}$ dictates how many respective data symbols DS a MIMO-OFDM system can transmit and receive. Per above, the maximum number of respective data symbols that a MIMO-OFDM system can transmit and receive during a same symbol period is equal to the number T of transmit antennas. Therefore, when the estimated channel matrix $\hat{H}$ is full rank, it has a rank r=T. But if the estimated channel matrix $\hat{H}$ has a rank r that is less than full rank, then the MIMO-OFDM system can transmit simultaneously only r respective data symbols even if T>r. That is, in effect, when the estimated channel matrix $\hat{H}$ is less than full rank, at least one of the transmit antennas is "wasted" in the sense that it cannot be used to send a respective data symbol—the "wasted" transmit antenna can be used to transmit a same data symbol as another transmit antenna, but this technique, called spatial diversity, is not discussed herein, although a description of this technique is described in Hampton, J., *Introduction to MIMO Communications*, Cambridge University Press 2014, which is incorporated by reference in its entirety.

Still referring to FIG. 6, In a third example, all of assumptions of the first and second examples hold except that it is assumed that the communication channel has full diversity, and, therefore, is of full rank r=2. The estimated channel matrix $\hat{H}$ is as follows:

|  | $R_0$ | $R_1$ |
|---|---|---|
| $T_0$ | $H_{0,0} = 2.25$ | $H_{0,1} = 3.87$ |
| $T_1$ | $H_{1,0} = 1.62$ | $H_{1,1} = 2.43$ |

It can be shown that the above estimated channel matrix $\hat{H}$ yields two equations that can be solved to yield unique solutions for the data symbols $DS_0$ and $DS_1$ at the receiver. Therefore, unlike in the previous two examples, the channel matrix of this third example would allow a MIMO-OFDM system to transmit T=2 respective data symbols $DS_0$ and $DS_1$ simultaneously from two transmit antennas $72_0$ and $72_k$.

But even if the effective channel matrix $\hat{H}$ is full rank, it still may not allow a MIMO-OFDM system to transmit a number of respective data symbols equal to the number T of transmit antennas.

Consider the following example estimated channel matrix $\hat{H}$:

|  | $R_0$ | $R_1$ |
|---|---|---|
| $T_0$ | $H_{0,0} = 2.01$ | $H_{0,1} = 6.04$ |
| $T_1$ | $H_{1,0} = 1.10$ | $H_{1,1} = 3.07$ |

Although from a precise mathematical standpoint the rows and columns of this matrix are not linearly dependent one on another, they are so close to being linearly dependent that in an actual MIMO-OFDM system, with noise, distortion, etc., the estimated channel matrix $\hat{H}$ is "too close" to having a rank of only r=1 one that the receiver 64 would be unable to yield two equations from which the receiver could obtain unique solutions for $DS_0$ and $DS_1$.

This result gives rise to the concept of an estimated channel matrix $\hat{H}$ that is effectively full rank, or has an effective full rank, which means that the rows and columns are linearly independent from one another by a sufficient margin to allow the receiver 64 to obtain unique solutions for $DS_0$ and $DS_1$. Using the third example above, this margin, m, may be determined according to the following equation:

$$m = \sqrt{(0.01-0.10)^2 + (0.04-0.07)^2} \quad 12)$$

which effectively quantizes the difference between the rows of the estimated channel matrix $\hat{H}$ being linearly independent and being linearly dependent.

If m is greater than a threshold $Threshold_{margin}$, then the estimated channel matrix $\hat{H}$ has an effective full rank. The threshold $Threshold_{margin}$ can be determined according to the particular application, and according to other parameters such as the minimum SNR specified by the receiver 64.

But even if the estimated channel matrix $\hat{H}$ is effectively full rank, it still may not allow a MIMO-OFDM system to transmit simultaneously a number of data symbols equal to the number T of transmit antennas.

Consider the following example estimated channel matrix $\hat{H}$, which is effectively full rank:

|  | $R_0$ | $R_1$ |
|---|---|---|
| $T_0$ | $H_{0,0} = .01$ | $H_{0,1} = .04$ |
| $T_1$ | $H_{1,0} = .20$ | $H_{1,1} = .07$ |

Even though the estimated channel matrix $\hat{H}$ is effectively full rank, the gains of the subchannels between the transmitter and receiver are so low that by the time the transmitted signals arrive at the receive antennas, the respective powers of the transmitted signals are so low that they do not meet the minimum SNR threshold that the receiver needs to recover the transmitted data symbols $DS_0$ and $DS_1$ from the received signals.

This result gives rise to the concept of an estimated channel matrix $\hat{H}$ that has large enough gain (or, conversely, small enough attenuation) to allow transmitted signals to reach the receiver with sufficient received signal power. Using the above example estimated channel matrix $\hat{H}$, one can determine the power gains corresponding to each of the transmit antennas according to the following equations:

$$\text{Power gain corresponding to } T_0 = \sqrt{(0.01)^2 + (0.04)^2} \quad 13)$$

$$\text{Power gain corresponding to } T_1 = \sqrt{(0.20)^2 + (0.07)^2} \quad 14)$$

If the power gains corresponding to $T_0$ and $T_1$ are both greater than or equal to a power-gain threshold $P_{gain}$, then the estimated channel matrix $\hat{H}$ has an effective full rank. If only one of the power gains corresponding to the transmit antennas $T_0$ and $T_1$ is greater than or equal to $P_{gain}$, then effective rank of the estimated channel matrix $\hat{H}$ is less than full rank (effective rank r=1 in this example) and the transmitter 62 can transmit only one data symbol DS at a time. And of course if neither of the power gains associated with $T_0$ and $T_1$ is greater than $P_{gain}$, then the transmitter 62 may be unable to send any data symbols DS to the receiver 64.

In summary, for the transmitter 62 to be able to send a respective data symbol DS from each of its T transmit antennas 72, the estimated channel matrix $\hat{H}$ for the communication channel including the channel portion 66 must have effective full rank and have a sufficient gain for each transmit antenna.

Still referring to FIG. 6, it may seem that based on the above description, as long as the estimated channel matrix $\hat{H}$ has effective full rank and sufficient gain, a designer can linearly increase the MIMO-OFDM channel capacity C by adding as many transmit and receive antennas 72 and 74 as one can "cram" onto the transmitter 62 and the receiver 64.

But there is a limitation to the number of antennas 72 and 74 that the MIMO-OFDM transmitter-receivers 62 and 64 can include for a given transmitter-receiver size.

When the MIMO-OFDM receiver 64 is in the radiative far field of the MIMO-OFDM transmitter 62, it can be shown, by application of the Diffraction Theorem and the Nyquist Sampling Theorem, that the minimum spacing between the transmit antennas 72, and the minimum spacing between the receive antennas 74, is $$\frac{\lambda_c}{2},$$

where, as discussed above, $\lambda_c$ is the wavelength of the MIMO-OFDM carrier signal at carrier frequency $f_c$. That is, if, for example, two transmit antennas 72 are spaced apart by less than $$\frac{\lambda_c}{2},$$

then these two transmit antennas are indistinguishable from one another at the receiver 64, i.e., these two transmit antennas appear as a single transmit antenna to the receiver. Likewise, if, for example, two receive antennas 74 are spaced apart by less than $$\frac{\lambda_c}{2},$$

then these two receive antennas are indistinguishable from one another at the transmitter 62, i.e., these two receive antennas appear as a single receive antenna to the transmitter.

And when the MIMO-OFDM receiver 62 is in the radiative near field of the MIMO-OFDM transmitter 64, although the Diffraction Theorem and the Nyquist Sampling Theorem do not dictate a minimum spacing of $$\frac{\lambda_c}{2}$$

between the transmit antennas 72 and between the receive antennas 74, it has been found that for a minimum spacing less than $$\frac{\lambda_c}{2},$$

the channel lacks diversity, and, therefore, is not full rank. That is, if two transmit antennas 72 are spaced apart by less than $$\frac{\lambda_c}{2},$$

the lack of diversity in the communication channel causes one of these two transmit antennas to be "wasted," i.e., the transmitter 62 cannot transmit two respective data symbols via these two antennas, but can transmit only one data symbol with these antennas.

Therefore, this minimum antenna spacing of $$\frac{\lambda_c}{2}$$

can limit significantly the number of antennas 72 and 74 that the MIMO-OFDM transmitter-receivers 62 and 64 can respectively include. As an example, the wavelength A of a MIMO-OFDM carrier at 2.4 GHz (a popular frequency for devices, such as routers, compatible with the IEEE 802.11 standard) is about 12.5 centimeters (cm), such that $$\frac{\lambda_c}{2} \approx 6 \text{ cm} = 2.5 \text{ inches.}$$

Therefore, a wireless router with a footprint of, for example, 5 inches (in)×7 in can include four antennas with a minimum spacing between pairs of antennas of 2.5 in. And devices (e.g., smart phones) with smaller footprints can support even fewer antennas. Even at higher carrier frequencies $f_c$, such as the newer 60 GHz carrier frequency for 802.11, the restriction as to the number of antennas that a wireless device can have is significant.

Referring to FIGS. 7-10, described is an embodiment of an MIMO-OFDM transmitter-receiver that can transmit and receive respective MIMO-OFDM symbols using antennas having a minimum antenna spacing of less than $$\frac{\lambda_c}{2}.$$

As described below, such a MIMO-OFDM transmitter-receiver leverages that the channel includes portions of the transmitter and receiver, including the transmit and receive antennas, and uses these portions to increase the diversity of the channel to a level that allows the estimated channel matrix $\hat{H}$ to have a higher effective rank r than even a full-rank estimated channel matrix for a system with a minimum antenna spacing that is greater than or equal to $$\frac{\lambda_c}{2}.$$

Figure 7:
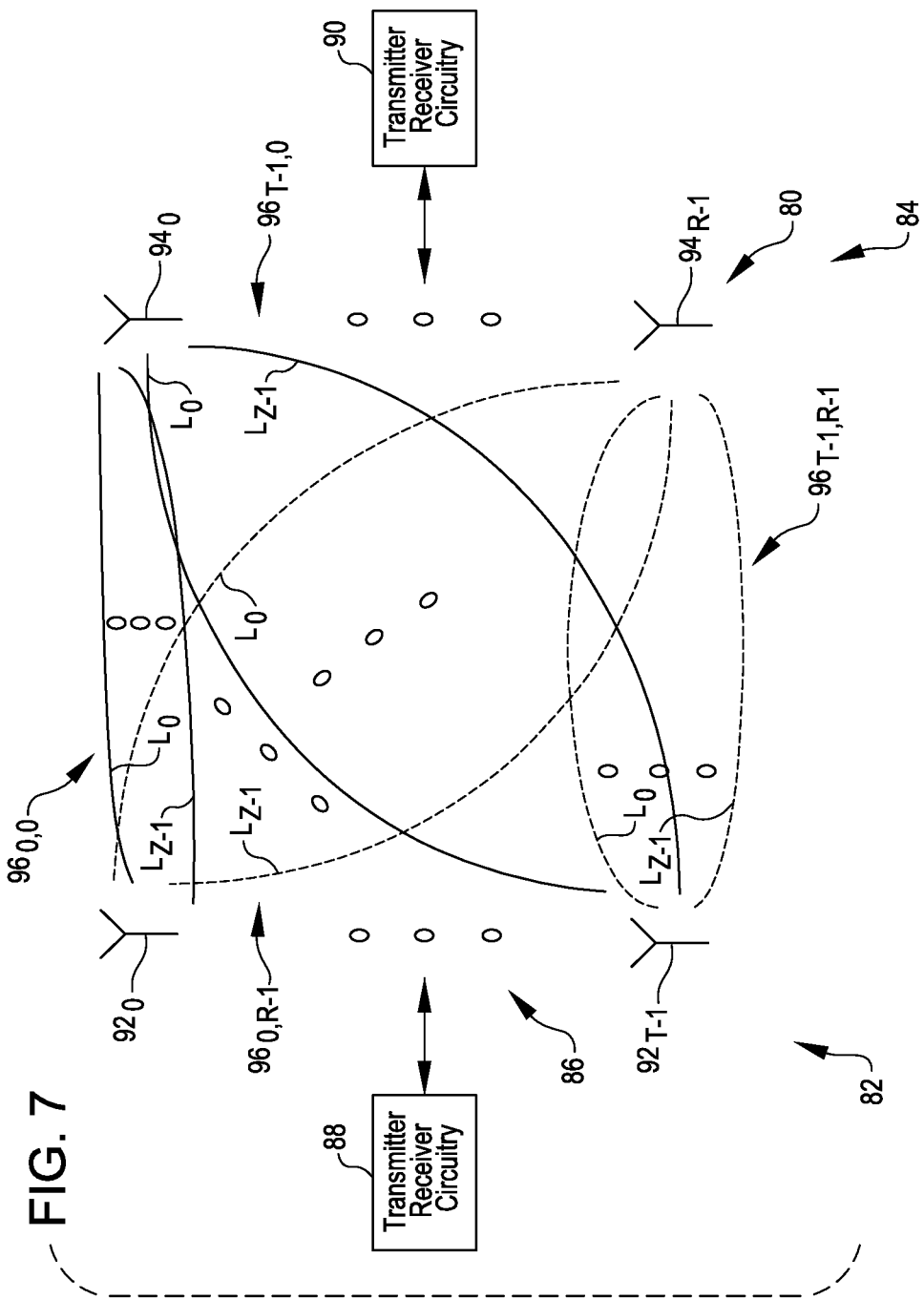
FIG. 7 is a diagram of two MIMO-OFDM transmitter-receivers and the multiple communication paths between their antennas, where the antennas of each transmitter-receiver are arrange in a one-dimensional array, and the minimum spacing between the antennas of each transmitter-receiver is less than one half the wavelength of the MIMO-OFDM carrier signal, according to an embodiment.

FIG. 7 is a diagram of a MIMO-OFDM system 80, which includes two MIMO-OFDM transmitter-receivers 82 and 84, and of the portion 86 of the communication channel between the transmitter-receivers, according to an embodiment. The transmitter-receivers 82 and 84 respectively include transmit-receive circuitry 88 and 90 and antennas 92 and 94, the channel portion 86 includes subchannel portions 96 each located between a respective pair of antennas 92 and 94, and the minimum spacing between the antennas 92 and the minimum spacing between the antennas 94 is less than one half the wavelength $$\left(\frac{\lambda_c}{2}\right)$$

of the MIMO-OFDM carrier signal at frequency $f_c$. The differences between the subchannel portions 96 and the subchannels and the channel portion 96 and the channel, and the reason for the minimum antenna spacing of less than $$\frac{\lambda_c}{2},$$

are described below. Furthermore, for example purposes, it is assumed that the transmitter-receiver 82 is transmitting MIMO-OFDM signals with the antennas 92, and that the transmitter-receiver 84 is receiving the transmitted signals with the antennas 94, it being understood that the below description would be similar if the transmitter-receiver 84 where transmitting the signals and the transmitter-receiver 82 were receiving the signals. Moreover, it is assumed that the number T of transmitting antennas 92 is equal to the number R of receiving antennas 94.

Figure 8:
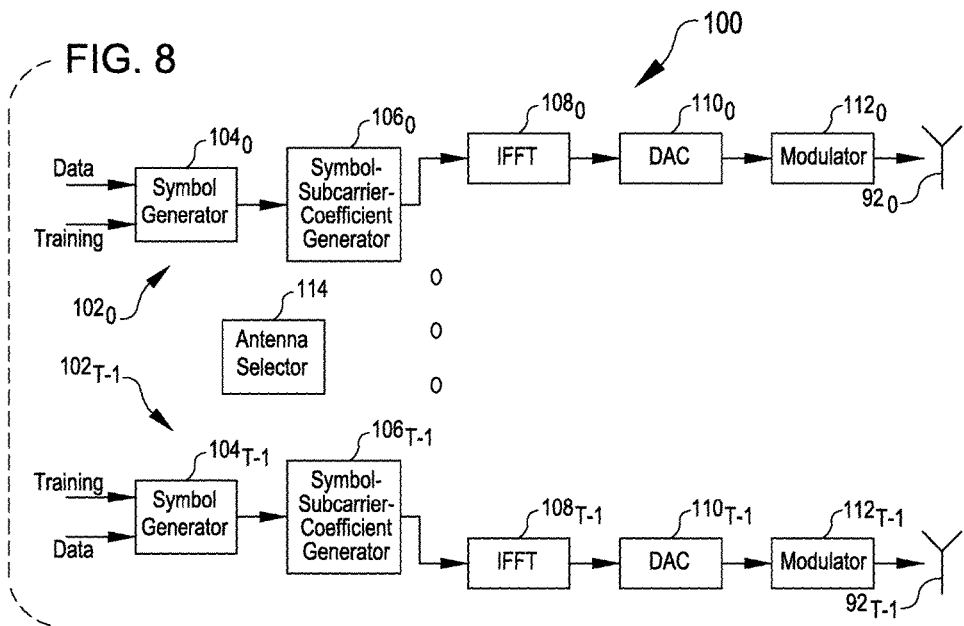
FIG. 8 is a diagram of the transmitter circuitry of the MIMO-OFDM transmitter-receiver of FIG. 7, according to an embodiment.

FIG. 8 is a diagram of an embodiment of the MIMO-OFDM transmitter-circuitry portion 100 of the transmitter-receiver circuitry 88 and 90 of FIG. 7, according to an embodiment. The transmitter circuitry 100 includes T transmit paths $102_0$-$102_{T-1}$; but for brevity, only the path $102_0$ is described in detail, it being understood that the remaining paths $102_1$-$102_{T-1}$ can be similar. Furthermore, for example purposes, the transmitter circuitry 100 is described below as being part of the transmitter-receiver circuitry 88, it being understood that the description of the transmitter circuitry 100 when part of the transmitter-receiver circuitry 90 is similar. Moreover, the transmitter circuitry 100 can be referred to as a signal generator.

The transmit path $102_0$ includes a symbol (data and training) generator circuit $104_0$, a symbol-subcarrier-coefficient generator circuit $106_0$, an Inverse Fourier Transform (IFFT) circuit $108_0$, a digital-to-analog converter (DAC) $110_0$, and a modulator $112_0$, which is coupled to the antenna $92_0$ (although the antennas in FIG. 8 may also be used as receive antennas, they are labeled as transmit antennas because the transmitter-receiver 82 of FIG. 7 is described herein as transmitting MIMO-OFDM signals). The symbol generator circuit $104_0$ is configured to generate data and training sub symbols from data information and training information, respectively, and the symbol-subcarrier-coefficient generator circuit $106_0$ is configured to generate from each sub symbol a respective complex frequency-domain coefficient for mapping to the respective subsymbol subcarrier. The IFFT circuit $108_0$ is configured to transform the subsymbol-subcarrier coefficients into a digital time-domain waveform, and the DAC $110_0$ is configured to convert the digital time-domain waveform into an analog time-domain waveform. The modulator $112_0$ is configured to modulate a carrier signal at a carrier frequency $f_c$ (e.g., 2.4 GHz, 3.6 GHz, 5 GHz, or 60 GHz) with the analog time-domain waveform to generate a modulated carrier signal having a bandwidth centered around $f_c$. And the antenna $92_0$ is configured to transmit the modulated carrier signal for reception by a receiver such as the receiver 84 of FIG. 7.

The transmitter circuitry 100 also includes a transmit-path-and-antenna selector circuit 114, which is configured to select the transmit paths 102, and thus the antennas 92, over which the transmitter circuitry 100 is to transmit respective data symbols. For example, as described below in conjunction with FIGS. 38-39 and 41, depending on the channel capacity, the transmitter circuitry 100 may be unable to utilize all of the transmit paths 102 and transmit antennas 92 for transmitting respective data symbols. In such a situation, the selector circuit 114 is configured to select which transmit paths 102 and antennas 92 are to be utilized for sending respective data symbols, and which transmit paths and antennas are to be deactivated or utilized to send redundant data symbols (i.e., the same data symbol as another transmit path and antenna).

Figure 9:
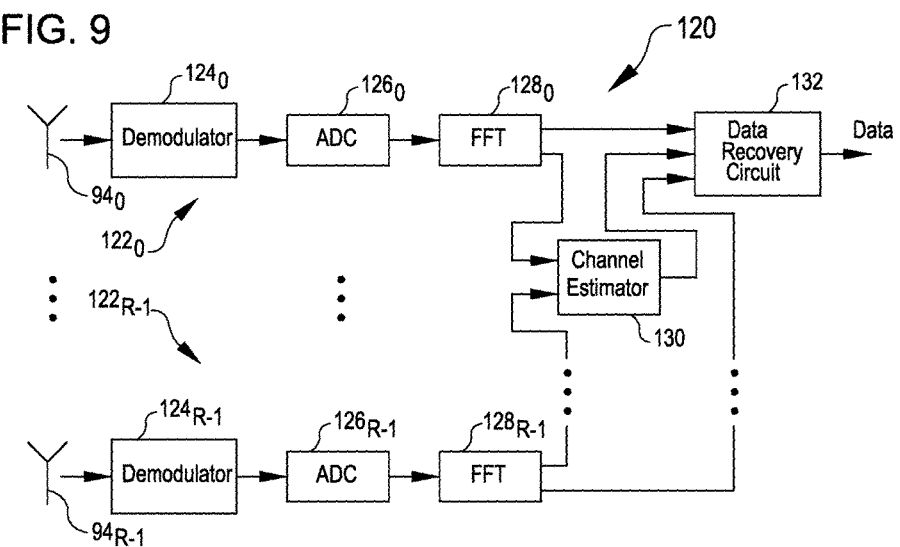
FIG. 9 is a diagram of the receiver circuitry of the MIMO-OFDM transmitter-receiver of FIG. 7, according to an embodiment.

FIG. 9 is a diagram of an embodiment of the MIMO-OFDM receiver-circuitry portion 120 of the transmitter-receiver circuitry 88 and 90 of FIG. 7, according to an embodiment. The receiver circuitry 120 includes R receive paths $122_0$-$122_{R-1}$; but for brevity, only the path $122_0$ is described in detail, it being understood that the remaining paths $122_1$-$122_{R-1}$ can be similar. Furthermore, for example purposes, the receiver circuitry 120 is described below as being part of the transmitter-receiver circuitry 90, it being understood that the description of the receiver circuitry 120, when part of the transmitter-receiver circuitry 88, is similar.

The receive path $122_0$ includes a demodulator $124_0$ coupled to the antenna $94_0$ (although the antennas in FIG. 9 may also be used as transmit antennas, they are described as receive antennas because the transmitter-receiver 84 of FIG. 7 is described herein as receiving MIMO-OFDM signals) for demodulating the modulated carrier signal received by the antenna $94_0$, an analog-to-digital converter (ADC) $126_0$ for converting the analog demodulated signal into a digital signal, and a Fourier Transform (FFT) circuit $128_0$ for converting the time-domain digital signal into a frequency-domain coefficients. A channel-estimator circuit 130, and a data-recovery circuit 132 for recovering data from the data symbols (and training information from the training symbols), are common to all receive paths 122.

Referring to FIGS. 7-9, as described below, unlike conventional MIMO-OFDM transmitter-receivers, the MIMO-OFDM transmitter-receivers 82 and 84 can increase the diversity of the communication channel between them such that they can include antennas with a minimum spacing less than $$\frac{\lambda_c}{2}$$

to achieve a higher channel capacity C, at least in the near field, as compared to MIMO-OFDM transmitter-receivers having antennas with a minimum spacing of at least $$\frac{\lambda_c}{2}.$$

Figure 10:
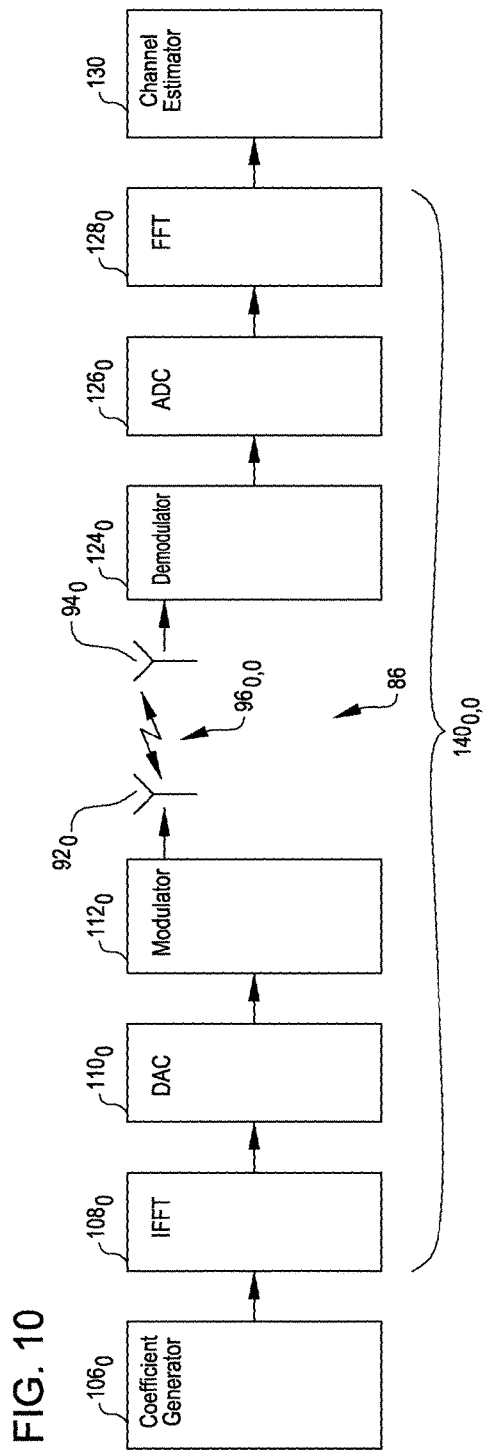
FIG. 10 is a diagram of the components of a subchannel between an antenna of a transmitting one of the MIMO-OFDM transmitter-receivers of FIG. 7 and an antenna of a receiving one of the MIMO-OFDM transmitter-receivers of FIG. 7, according to an embodiment.

FIG. 10 is a diagram of portions of the transmit path $102_0$ of FIG. 8, portions of the receiver path $122_0$ of FIG. 9, the transmit and receive antennas $92_0$ and $94_0$, and the subchannel portion $96_{0,0}$ between the transmit and receive antennas.

Referring to FIG. 10, because the channel estimator circuit 130 determines, e.g., the attenuation, phase shift, noise, and other distortion introduced to the MIMO-OFDM signal between the output of the symbol-subcarrier coefficient generator circuit $106_0$ and the input of the channel estimator circuit, the corresponding subchannel $140_{0,0}$, at least as "seen" by the channel estimator, includes not only the subchannel portion $96_{0,0}$ of the channel portion 86, which is the propagation medium between the transmit and receive antennas, but also includes the IFFT $108_0$, DAC $110_0$, modulator $112_0$, antennas $92_0$ and $94_0$, demodulator $124_0$, ADC $126_0$, and FFT $128_0$.

Because the subchannel $140_{0,0}$ includes portions of the transmitter and receiver paths $102_0$ and $122_0$ and the transmit and receive antennas $92_0$ and $94_0$, an engineer can design one or more of these path portions and antennas to impart increased diversity to the subchannel $140_{0,0}$, as compared to the other subchannels 140, such that at least when the receive antennas are in the near field of the transmit antennas, the increased channel diversity is sufficient to allow the antennas to increase the channel capacity C by having a minimum spacing that is less than $$\frac{\lambda_c}{2},$$

thus allowing more antennas per a given footprint of the MIMO-OFDM transmitter-receiver. With such a technique, the diversity of the subchannels 140 is no longer dictated by the propagation medium (subchannel portions 96) between the transmit and receive antennas 92 and 94. For example, in embodiments described below, the transmit and receive antennas 92 and 94 are configured to provide this increased channel diversity and channel capacity in a MIMO-OFDM system. But it is contemplated that embodiments of the below-described techniques for increasing channel diversity and channel capacity in a MIMO-OFDM system can also be used in applications other than OFDM and MIMO-OFDM. For example, such embodiments may be used in any application in which multiple signals are simultaneously transmitted or simultaneously received.

Figure 11:
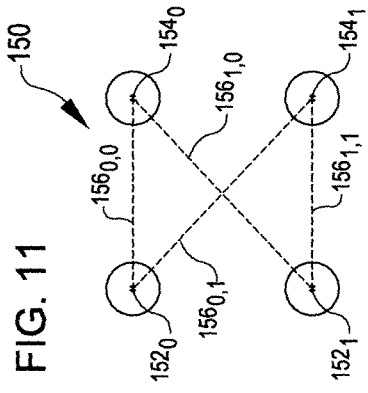
FIG. 11 is a planar view of the antennas of the two MIMO-OFDM transmitter-receivers of FIG. 6, where the antennas all have the same radiation patterns.

FIG. 11 is a diagram of a MIMO-OFDM system 150 having two transmit antennas 152$_0$ and 152$_1$ and two receive antennas 154$_0$ and 154$_1$. In this example, all of the antennas 152 and 154 have substantially uniform omnidirectional beam, i.e., radiation, patterns, which means that they have the same power gain, phase, and polarization in all, or almost all, directions (for example, a half-wavelength dipole is an antenna that has an omnidirectional radiation pattern in all directions within the same plane). Such omnidirectional antennas are often preferred in a conventional MIMO-OFDM transmitter-receiver because they can radiate signal energy to, and receive signal energy from, other MIMO-OFDM transmitter-receivers regardless of the positions of the latter.

But it has been found that when the transmit antennas 152$_0$ and 152$_1$ are spaced less than $$\frac{\lambda_c}{2}$$

apart, the subchannel portions 156 between each transmit antenna and a receive antenna 154 have similar, or the same, state, even in the near field and in a rich multipath environment where the subchannel portions include a relatively large number Z of paths L (see FIG. 6). That is, the gain, phase, noise, and other distortion introduced by the subchannel portion 156$_{0,0}$ is similar to, or the same as, the gain, phase, noise, and other distortion introduced by the subchannel portion 156$_{1,0}$. Similarly, the gain, phase, noise, and other distortion introduced by the subchannel portion 156$_{0,1}$ is similar to, or the same as, the gain, phase, noise, and other distortion introduced by the subchannel portion 156$_{1,1}$.

Because in the above-described scenario the channel diversity is insufficient for the estimated channel matrix $\hat{H}$ to have an effective full rank r=2, the estimated channel matrix has only an effective rank r=1 such that only one data symbol can be transmitted at a time from either or both of the transmit antennas 152$_0$ and 152$_1$.

A similar analysis applies, and yields the same result, if the receive antennas 154$_0$ and 154$_1$ are spaced apart by less than $$\frac{\lambda_c}{2},$$

or if both the transmitter antennas 152$_0$ and 152$_1$ and the receive antennas 154$_0$ and 154$_1$ are spaced apart by less than $$\frac{\lambda_c}{2}.$$

Consequently, when two or more transmit antennas each present same or similar transmit characteristics, i.e., transmission profiles, to each receive antenna, the two or more transmit antennas can only transmit a single data symbol at a time unless the diversity of the channel is sufficient to make the make the transmit antennas appear to have different transmission profiles at each of the receive antennas. Although this is true regardless of the minimum spacing between the antennas and of whether the receiver is in the near field or in the far field of the transmitter, the diversity of the channel is more likely to be insufficient to make the transmit antennas appear to have different transmission profiles at each of the receive antennas when the transmit antennas and the receive antennas are spaced apart by less than $$\frac{\lambda_c}{2}.$$

It follows, therefore, that one can define a saturation channel capacity $C_{saturation}$ as the channel capacity provided by a MIMO-OFDM transmitter-receiver having antennas that each present the same transmission profile to each receive antenna during signal transmission, and that each present the same reception profile to each transmit antenna during signal reception. For example, suppose a transmitter has two transmit antennas with the same transmission profiles spaced at least $$\frac{\lambda_c}{2}$$

apart, and the channel is diverse enough to make the antennas appear to have different transmission profiles at each of the receive antennas. In this example, the saturation channel capacity $C_{saturation}$ would be the combined capacity provided by the two transmit antennas. But if a third transmit antenna is added, and the channel is diverse enough to make only two of the three antennas appear to have different transmission profiles at each of the receive antennas, then $C_{saturation}$ would still be the combined capacity of two transmit antennas.

Alternatively, one can define a saturation channel capacity $C_{saturation}$ as the number of signal pipes provided by a MIMO-OFDM transmitter-receiver having antennas that each present the same transmission profile to each receive antenna during signal transmission, and that each present the same reception profile to each transmit antenna during signal reception.

Or, one can define a saturation channel capacity $C_{saturation}$ as the number of signal pipes that equals the effective rank of an estimated channel matrix that represents the communication channel provided by a MIMO-OFDM transmitter-receiver having antennas that each present the same transmission profile to each receive antenna during signal transmission, and that each present the same reception profile to each transmit antenna during signal reception.

But as discussed below, by appropriately spacing and configuring the characteristics, and thus the profiles, of the transmit antennas 92 and the receive antennas 94, the MIMO-OFDM transmitter-receivers 82 and 84 of FIG. 7 can provide, to the communication channel between them, a channel capacity C that exceeds the saturation channel capacity $C_{saturation}$. That is, such appropriate spacing and configuring of the antenna characteristics can actually increase the capacity C of a channel.

Figure 12:
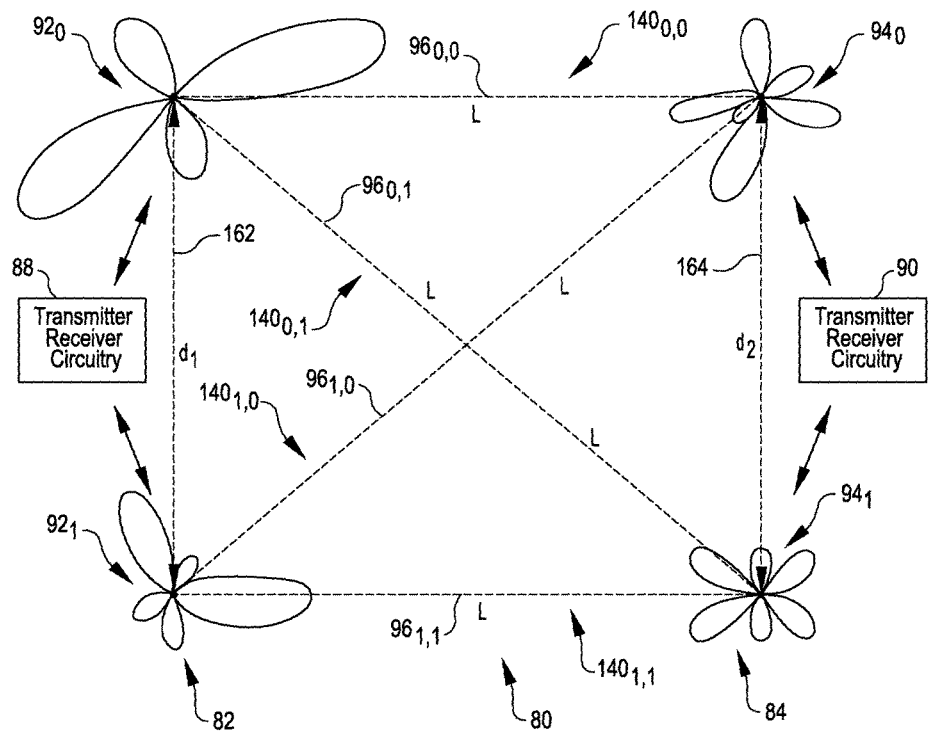
FIG. 12 is a planar view of the MIMO-OFDM transmitter-receivers of FIG. 7, where the antennas of one of the transmitter-receivers have radiation patterns that differ from one another, and where the antennas of the other of the transmitter-receivers have radiation patterns that differ from one another, according to an embodiment.

FIG. 12 is a diagram of the MIMO-OFDM system 80 of FIG. 7 according to an embodiment where the antennas 92 and 94 of the transmitter 82 and receiver 84, respectively, are configured to provide a channel capacity C that exceeds the saturation channel capacity $C_{saturation}$, and where like numbers reference like items relative to FIG. 7. In this embodiment, the transmitter-receiver 82 has two antennas 92$_0$ and 92$_1$, which are spaced apart by a distance $d_1$ that is less than $$\frac{\lambda_c}{2},$$

and which are configured to transmit respective MIMO-OFDM data symbols $DS_0$ and $DS_1$. Similarly, in this embodiment, the transmitter-receiver 84 has two antennas 94$_1$ and 94$_2$, which are spaced apart by a distance $d_2$ that is less than $$\frac{\lambda_c}{2},$$

and which are configured to receive the respective MIMO-OFDM symbols $DS_0$ and $DS_1$ transmitted from the antennas 92$_0$ and 92$_1$. The distance $d_1$ may be measured from an edge of the antenna 92$_0$ to an edge of the antenna 92$_1$, or, may be measured between the geometrical centers, the centers of mass, the center axes, or other suitable points of the antennas 92$_0$ and 92$_1$; and the distance $d_2$ between the antennas 94$_0$ and 94$_1$ may be measured similarly. Furthermore, the view of FIG. 12 is in an azimuth plane that all of the antennas 92 and 94 intersect.

The antennas 92$_0$, 92$_1$, 94$_0$, and 94$_1$ each have different respective beam, i.e., radiation patterns and peak directivities $$D\left(D = \frac{1}{\frac{1}{4\pi}\int_0^{2\pi}\int_0^\pi |F(\theta,\varphi)|^2 \sin\theta d\theta d\varphi}\right)$$

and is along the main lobes of the radiation patterns in FIG. 12), which cause the antennas 92$_0$ and 92$_1$ to each present a different transmission profile to the receive antenna 94$_0$, and to each present a different transmission profile to the receive antenna 94$_1$, regardless of the diversity of the subchannel portions 96 and even though the antennas 92$_0$ and 92$_1$ are spaced apart by less than $$\frac{\lambda_c}{2}.$$

And these different transmission profiles not only sufficiently diversify the subchannels 140 so that the estimated channel matrix is full rank, but also provide each subchannel 140 with sufficient gain so that the estimated channel matrix is effective full rank. An alternative way to view this configuration is that the different respective radiation patterns and peak directivities D of the antennas 92$_0$, 92$_1$, 94$_0$, and 94$_1$ cause the antennas 94$_0$ and 94$_1$ to each present a different reception profile to the transmit antenna 92$_0$, and to each present a different reception profile to the transmit antenna 94$_1$, even though the antennas 94$_0$ and 94$_1$ are spaced apart by less than $$\frac{\lambda_c}{2}.$$

The straight-line path L of the subchannel portion 96$_{0,0}$ is along a side of a main lobe of the antenna 92$_0$ and through a main lobe of the antenna 94$_0$, where the lobes represent antenna power gain along the direction of the lobe.

In contrast, the straight-line path L of the subchannel portion 96$_{1,0}$ is along the edge of a minor lobe of the antenna 92$_1$ and through a minor lobe of the antenna 94$_0$.

Therefore, the gain that the antennas 92$_0$ and 94$_0$ impart to the subchannel 140$_{0,0}$, which, per FIG. 10, includes these antennas and the subchannel portion 96$_{0,0}$, is significantly different from the gain that the antennas 92$_1$ and 94$_0$ impart to a subchannel 140$_{1,0}$, which includes these antennas and the subchannel portion 96$_{1,0}$. And because an antenna's radiation pattern typically undergoes a phase shift of about 180° between lobe nulls (the locations between lobes where the gain is, or is approximately, zero), the phase that the antennas 92$_0$ and 94$_0$ impart to the subchannel 140$_{0,0}$ is significantly different from the phase that the antennas 92$_1$ and 94$_0$ impart to the subchannel 140$_{1,0}$.

Similarly, the straight-line path L of the subchannel portion 96$_{0,1}$ is along the edge of a minor lobe of the antenna 90$_0$ and bisects a main lobe of the antenna 92$_k$.

In contrast, the straight-line path L of the subchannel portion 96$_{1,1}$ bisects a major lobe of the antenna 92$_1$ and is along an edge of a minor lobe of the antenna 94$_1$.

Therefore, the gain and phase that the antennas 94$_0$ and 94$_1$ impart to a subchannel 140$_{0,1}$, which includes these antennas and the subchannel portion 96$_{0,1}$, is significantly different from the gain and phase that the antennas 92$_1$ and 94$_1$ impart to a subchannel 140$_{1,1}$, which includes these antennas and the subchannel portion 96$_{1,1}$.

Consequently, the transmission profiles of the antennas 92$_0$ and 92$_1$, and the reception profiles of the antennas 94$_0$ and 94$_1$, sufficiently diversify the subchannels 140$_{0,0}$, 140$_{0,1}$, 140$_{1,0}$, and 140$_{1,1}$ such that the estimated channel matrix $\hat{H}$ has an effective full rank r=2. This is true even though the antenna spacings $$d_1 < \frac{\lambda_c}{2} \text{ and } d_2 < \frac{\lambda_c}{2},$$

and the subchannel portions 96 may be insufficiently diverse to provide an estimated channel matrix of effective full rank without the additional diversity provided by the antennas 92 and 94.

Therefore, as long as the gains of the subchannels 140$_{0,0}$ 140$_{0,1}$, 140$_{1,0}$, and 140$_{1,1}$ are greater than or equal to a minimum-gain threshold $Th_{gain}$ that allows the transmitted MIMO-OFDM signals to have a sufficient SNR at the receive antennas 94$_0$ and 94$_k$, the transmitter 82 can transmit respective data symbols $DS_0$ and $DS_1$ simultaneously via the transmit antennas 92$_0$ and 92$_k$, respectively.

Furthermore, because $$d_1 < \frac{\lambda_c}{2} \text{ and } d_2 < \frac{\lambda_c}{2},$$

the channel capacity C that the transmitter 82 and receiver 84 provide to the communication channel between them is greater than the saturation channel capacity $C_{saturation}$, which is the capacity (e.g., the number of signal pipes) that the transmitter and receiver would provide if the antennas 92$_0$ and 92$_1$ each presented a same transmission profile to the antennas 94$_0$ and 94$_k$, or the antennas 94$_0$ and 94$_1$ each presented a same reception profile to the antennas 92$_0$ and 92$_1$.

Still referring to FIG. 12, alternate embodiments of the MIMO-OFDM system 80 are contemplated. For example, $d_1$ may equal, or be unequal to, $d_2$. Furthermore, although the antennas 92$_0$ and 92$_1$ lie along a line 162 that is parallel to a line 164 along which lie the antennas 94$_0$ and 94$_k$, the lines 162 and 164 need not be parallel. Moreover, although described as including two antennas 92$_0$ and 92$_k$, the transmitter-receiver 82 may include more than two antennas 92; similarly, although described as including two antennas 94$_0$ and 94$_k$, the transmitter-receiver 84 may include more than two antennas 94. In addition, although the number of transmit antennas 92 is described as being equal to the number of receive antennas 94, the number of transmit antennas may be greater than or less than the number of receive antennas. Furthermore, although all the antennas 92 and 94 are described as intersecting a same plane, not all of the antennas may intersect the same plane. Moreover, although described as diversifying the channel by diversifying the gains and phases of the subchannels 140, the antennas 92 and 94 may diversify the channel by altering other characteristics of the subchannels, such as the antenna polarizations. In addition, although described as each having different radiation patterns and directivities, some or all of the antennas 92 and 94 may have the same radiation patterns, the same directivities, or both the same radiation patterns and directivities as long as the antennas are oriented, or otherwise configured, such that the transmit antennas each present different transmission profiles to each of the receive antennas, and such that the receive antennas each present different reception characteristics to each of the transmit antennas. For example, some or all of the antennas may present the same transmission/reception profiles in one or more planes, but present different transmission/reception profiles in one or more other planes. Furthermore, the antennas 92 and 94 may have randomly determined radiation patterns, directivities, or orientations. Moreover, to provide a uniform total gain in multiple or all directions, the antennas 92 may have their major lobes oriented in different directions, and the antennas 94 may have their major lobes oriented in different directions. In addition, $d_1$ and $d_2$ can have any suitable values, such as in the range of $$0.10 \cdot \frac{\lambda_c}{2} \text{ to } 0.90 \cdot \frac{\lambda_c}{2}.$$

Furthermore, the radiation patterns and other characteristics (e.g., polarization) of the antennas 92 and 94 can be fixed or configurable.

Figure 13:
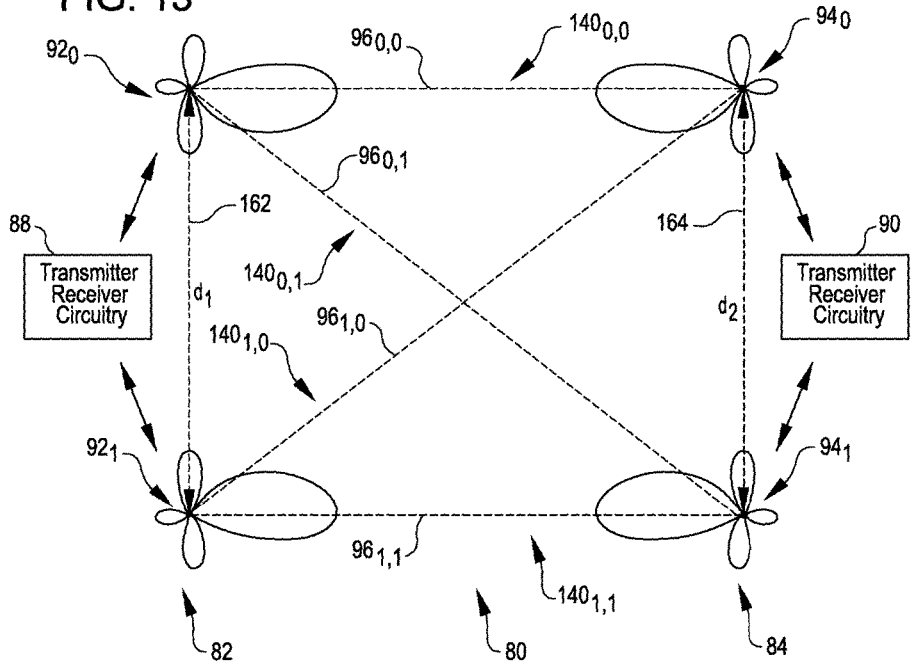
FIG. 13 is a planar view of the MIMO-OFDM transmitter-receivers of FIG. 7, where the antennas of one of the transmitter-receivers have the same non-omnidirectional radiation patterns and the same orientations relative to one another, and where the antennas of the other of the transmitter-receivers have the same non-omnidirectional radiation patterns and the same orientations relative to one another, according to an embodiment.

FIG. 13 is a diagram of the MIMO-OFDM system 80 of FIG. 7, according to another embodiment where the antennas 92 and 94 of the transmitter 82 and receiver 84, respectively, are configured so as to provide a channel capacity C that exceeds the saturation channel capacity $C_{saturation}$, where like numbers reference like items relative to FIGS. 7 and 12. This embodiment is similar to the embodiment of FIG. 12, except that, at least in the plane of FIG. 13, all of the antennas 92 and 94 have the same radiation pattern, and, therefore, have the same directivity D, the antennas 92 each have the same orientation relative to the line 162, and the antennas 94 each have the same orientation relative to the line 164. Although the antenna 92$_0$ presents to the antenna 94$_0$ the same transmission profile that the antenna 92$_1$ presents to the antenna 94$_k$, the subchannels 96 are still sufficiently diverse from one another because the antennas 92$_0$ and 92$_1$ each present different transmission profiles to the antenna 94$_0$ and to the antenna 94$_1$ according to an analysis that is similar to the analysis applied above in conjunction with FIG. 12.

Still referring to FIG. 13, alternate embodiments are contemplated. For example, the alternate embodiments of the MIMO-OFDM system 80 described above in conjunction with FIG. 12 can be applicable to the embodiments of the MIMO-OFDM system 80 described in conjunction with FIG. 13.

Figure 14:
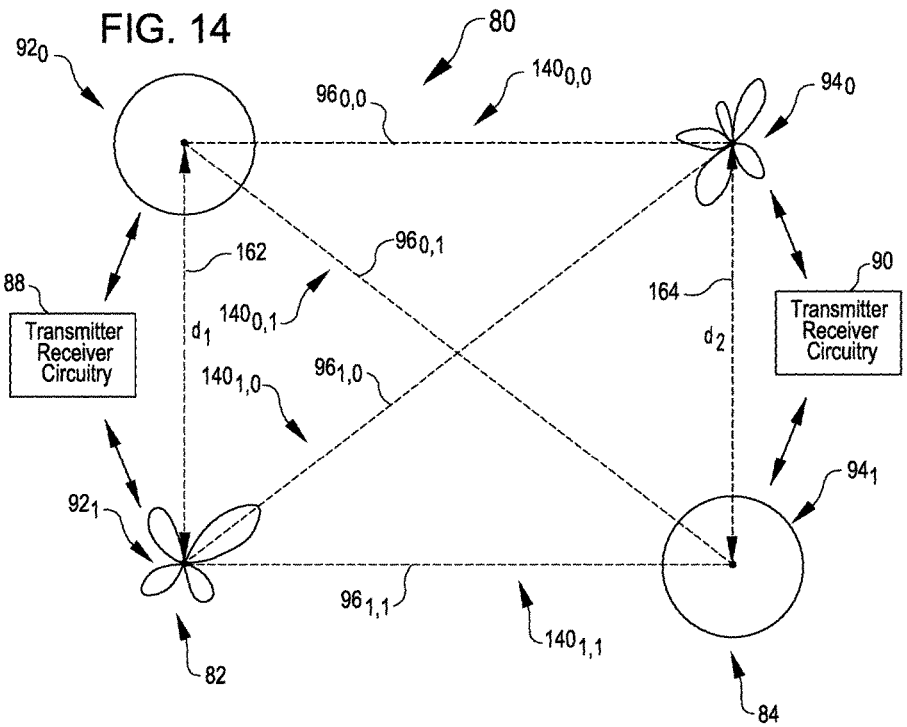
FIG. 14 is a planar view of the MIMO-OFDM transmitter-receivers of FIG. 7, where at least one, but not all, antennas of one of the transmitter-receivers has an omnidirectional radiation pattern at least in a plane, and where at least one, but not all, antennas of the other of the transmitter-receivers has an omnidirectional radiation pattern at least in a plane, according to an embodiment.

FIG. 14 is a diagram of the MIMO-OFDM system 80 of FIG. 7 according to another embodiment where the antennas 92 and 94 of the transmitter 82 and receiver 84, respectively, are configured to provide a channel capacity C that exceeds the saturation channel capacity $C_{saturation}$, and where like numbers reference like items relative to FIGS. 7 and 12-13. This embodiment is similar to the embodiment of FIG. 12, except that, at least in the plane of FIG. 14, the antennas 92$_0$ and 94$_1$ have omni-directional radiation patterns with directivities D=1 (D=0 dBi), and the antennas 92$_1$ and 94$_0$ have different, non-omnidirectional radiation patterns and different directivities D from each other and from the antennas 92$_0$ and 94$_k$.

Still referring to FIG. 14, alternate embodiments of the MIMO-OFDM system 80 are contemplated. For example, the alternate embodiments of the MIMO-OFDM system 80 described above in conjunction with FIG. 12 can be applicable to the embodiment of the MIMO-OFDM system described in conjunction with FIG. 14. Furthermore, the positions of the antennas 92$_0$ and 92$_1$ may be swapped, the positions of the antennas 94$_0$ and 94$_1$ may be swapped, or the positions of the antennas 92$_0$ and 92$_1$ may be swapped and the positions of the antennas 94$_0$ and 94$_1$ may be swapped. In addition, the antennas 90$_1$ and 92$_0$ may have the same non-omnidirectional radiation patterns and directivities as one another, at least in the plane of FIG. 14.

Figure 15:
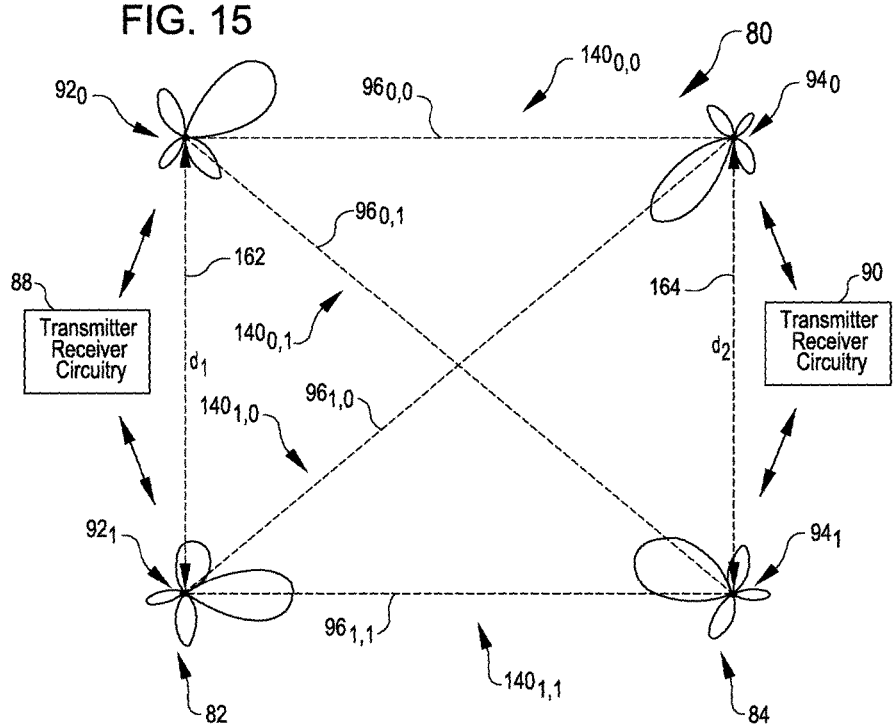
FIG. 15 is a planar view of the MIMO-OFDM transmitter-receivers of FIG. 7, where the antennas of one of the transmitter-receivers have the same non-omnidirectional radiation patterns but different orientations relative to one another, and where the antennas of the other of the transmitter-receivers have the same non-omnidirectional radiation patterns but different orientations relative to one another, according to an embodiment.

FIG. 15 is a diagram of the MIMO-OFDM system 80 of FIG. 7 according to another embodiment where the antennas 92 and 94 of the transmitter 82 and receiver 84, respectively, are configured to provide a channel capacity C that exceeds the saturation channel capacity $C_{saturation}$, and where like numbers reference like items relative to FIGS. 7 and 12-14. This embodiment is similar to the embodiment of FIG. 12, except that, at least in the plane of FIG. 15, all of the antennas 92 and 94 have the same radiation pattern, and, therefore, have the same directivity D, the antennas 92 each have different orientations relative to the line 162, and the antennas 94 each have different orientations relative to the line 164.

Still referring to FIG. 15, alternate embodiments of the MIMO-OFDM system 80 are contemplated. For example, the alternate embodiments of the MIMO-OFDM system 80 described above in conjunction with FIGS. 12 and 14 can be applicable to the embodiments of the MIMO-OFDM system 80 described in conjunction with FIG. 15. Furthermore, two or more of the antennas 92$_0$, 92$_k$, 94$_0$, and 94$_1$ can have different radiation patterns with the same or different directivities D, at least in the plane of FIG. 15.

FIGS. 16-17 are diagrams of the MIMO-OFDM system 80 of FIG. 7 according to another embodiment where the antennas 92 and 94 of the transmitter 82 and receiver 84, respectively, are configured to provide a channel capacity C that exceeds the saturation channel capacity $C_{saturation}$, and where like numbers reference like items relative to FIGS. 7 and 12-15. This embodiment is similar to the embodiment of FIG. 12, except that, at least in the plane of FIG. 16, all of the antennas 92 and 94 have the same omnidirectional radiation pattern, and that, at least in the plane of FIG. 17, which plane is different from the plane of FIG. 16, all of the antennas 92 and 94 have different radiation patterns (the antennas 92 and 94 also have different directivities D). For example, the plane of FIG. 17 can be parallel to or perpendicular to the plane of FIG. 16, or may intersect the plane of FIG. 16 at an angle other than 90°.

Still referring to FIGS. 16 and 17, alternate embodiments of the MIMO-OFDM system 80 are contemplated. For example, the alternate embodiments of the MIMO-OFDM system 80 described above in conjunction with FIGS. 12 and 14-15 can be applicable to the embodiments of the MIMO-OFDM system 80 described in conjunction with FIGS. 16 and 17. Furthermore, two or more of the antennas $92_0$, $92_k$, $94_0$, and $94_1$ can have the same non-omnidirectional radiation patterns with the same or different directivities D at least in the plane of FIG. 17. Moreover, although shown having the same gains in the plane of FIG. 16, one or more of the antennas $90_0$, $90_k$, $92_0$, and $92_1$ can have different gains than the other antennas.

Referring to FIGS. 12-17, the antennas 92 of the transmitter-receiver 82 are described as being arranged, i.e., as forming, a one-dimensional antenna array along a line 162; similarly, the antennas 94 of the transmitter-receiver 84 are described as forming a one-dimensional antenna array along a line 164.

But as described below in conjunction with FIGS. 18-21, it is contemplated that the antennas 92 and 94 can form multi-dimensional arrays.

Figure 18:
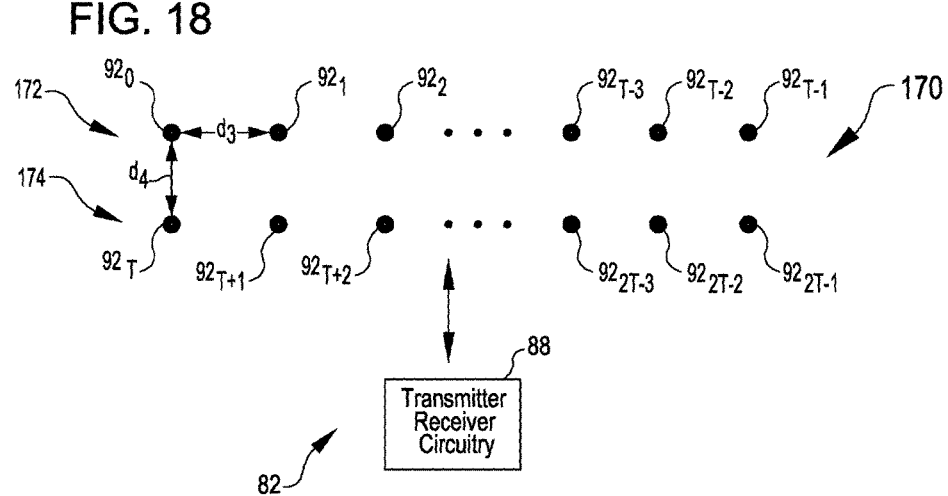
FIG. 18 a diagram of a MIMO-OFDM transmitter-receiver having a two-dimensional row-column antenna array that has a minimum spacing between antennas that is less than one half of the wavelength of a MIMO-OFDM carrier signal, according to an embodiment.

FIG. 18 is a diagram of the MIMO-OFDM transmitter-receiver 82 of FIG. 7 according to an embodiment where the antennas 92 are configured to provide a channel capacity C that exceeds the saturation channel capacity $C_{saturation}$, and where like numbers refer to like items relative to FIG. 12, it being understood that the antennas 94 of the MIMO-OFDM transmitter-receiver 84 of FIG. 7 can be configured similarly.

The transmitter-receiver 82 includes 2T antennas $92_0$-$92_{2T-1}$, which are configured in a two-dimensional array 170. The antennas 92 are arranged in two rows 172 and 174 of equal length, each row including T of the antennas 92. Adjacent ones of the antennas 92 in each row are separated by a uniform minimum spacing $d_3$, and adjacent ones of the antennas 92 in different rows are separated by a uniform minimum spacing $d_4$, where $$d_3 < \frac{\lambda_c}{2} \text{ and } d_4 < \frac{\lambda_c}{2},$$

Each of the distances $d_3$ and $d_4$ can be measured from an edge of an antenna 92 to an edge an adjacent antenna 92, or, may be measured between the geometrical centers, the centers of mass, the center axes, or other suitable points of adjacent antennas 92.

The antennas 92 may have radiation patterns, directivities, orientations, and other antenna characteristics according to any of the embodiments described above in conjunction with FIGS. 12-17, or may have other radiation patterns, directivities, orientations, and antenna characteristics as long as the antennas 92 present to other MIMO-OFDM transmitter-receivers antenna profiles that sufficiently diversify the channel so that the channel capacity C is greater a saturation capacity $C_{saturation}$ of the channel.

Still referring to FIG. 18, alternate embodiments of the transmitter-receiver 82 are contemplated. For example, although the antenna array 170 is described as having two rows 172 and 174 of T antennas 92, it may have more than two rows with more or fewer that 2T total antennas, and these rows may be arranged to form any two-dimensional shape such as a square, rectangle, or a triangle. Furthermore, although the antennas 92 in reach row 172 and 174 are described as having a uniform minimum spacing $d_3$, the spacing between the antennas in each row may be non-uniform, and some of the spacings may be greater than $$\frac{\lambda_c}{2}.$$

Similarly, although the antennas 92 in the row 172 are aligned with the antennas in the row 174, some or all of the antennas in the row 172 may be misaligned with the antennas in the row 174. Moreover, although the minimum spacing $d_4$ between antennas 92 in one row and antennas in the other row are described as being uniform and less than $$\frac{\lambda_c}{2},$$

the minimum spacing may be greater than $$\frac{\lambda_c}{2}$$

as long as at least some antennas in the array are spaced apart by less than $$\frac{\lambda_c}{2}.$$

In addition, although the rows 172 and 174 of antennas 92 are described as being along respective straight lines that are parallel to one another, the rows may not be parallel to one another, and the antennas may be arranged in other than straight lines.

Figure 19:
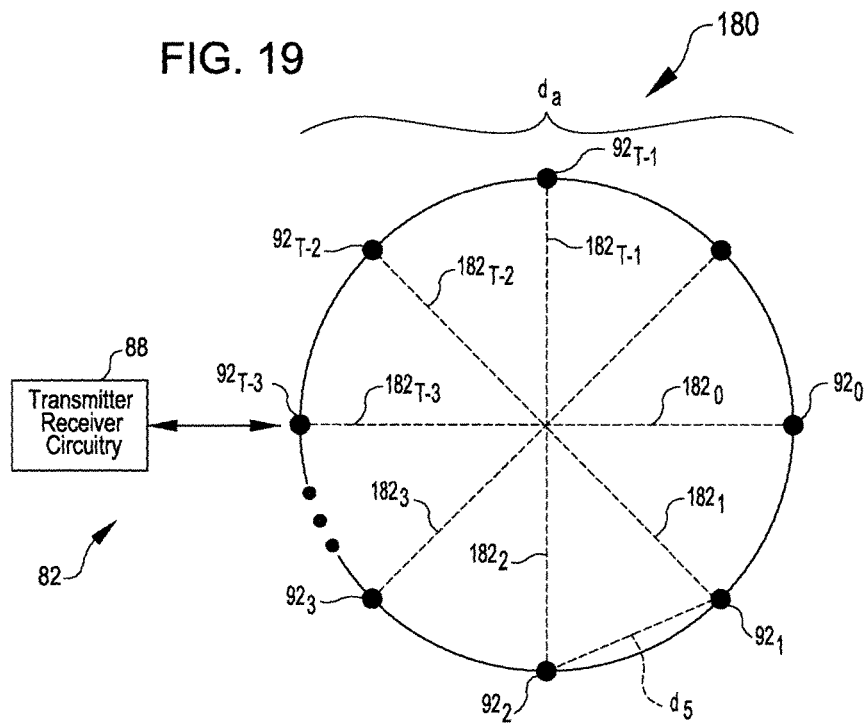
FIG. 19 a diagram of a MIMO-OFDM transmitter-receiver having a two-dimensional circular antenna array that has a minimum spacing between antennas that is less than one half of the wavelength of a MIMO-OFDM carrier signal, according to an embodiment.

FIG. 19 is a diagram of the MIMO-OFDM transmitter-receiver 82 of FIG. 7, according to another embodiment where the antennas 92 are configured so as to provide a channel capacity C that exceeds the saturation channel capacity $C_{saturation}$, and where like numbers refer to like items relative to FIG. 12, it being understood that the antennas 94 of the MIMO-OFDM transmitter-receiver 84 of FIG. 7 can be arranged similarly.

The transmitter-receiver 82 includes T antennas $92_0$-$92_{T-1}$, which are configured in a two-dimensional circular array 180. Adjacent ones of the antennas 92 are each separated by a uniform minimum circumferential spacing $$d_5 < \frac{\lambda_c}{2} \text{ (along a straight line)},$$

and the array 180 has a diameter $da_1$, which may be greater than, less than, or equal to $$\frac{\lambda_c}{2}.$$

Each of the distance $d_5$ and the diameter $da_1$ can be measured along a straight line from an edge of an antenna 92 to an edge of a circumferentially or diametrically adjacent other antenna 92, or, may be measured between the geometrical centers, the centers of mass, the center axes, or other suitable points of the adjacent antennas 92.

The antennas 92 can have radiation patterns, directivities, orientations, and other characteristics according to any of the embodiments described above in conjunction with FIGS. 12-17, or can have other radiation patterns, directivities, orientations, and characteristics as long as the antennas 92 present to other MIMO-OFDM transmitter-receivers antenna profiles that sufficiently diversify the channel so that the channel capacity C is greater a saturation capacity $C_{saturation}$ of the channel. For example, the antennas 92 can each have a same radiation pattern, same directivity, a same orientation, or same other characteristics relative to a radius 182 along which the antenna lies. Or one or more of the antennas 92 can each have a different (e.g., randomly generated) radiation pattern, different directivity, different orientations, or different other characteristics relative to the radius 182 along which the antenna lies.

Still referring to FIG. 19, alternate embodiments of the transmitter-receiver 82 are contemplated. For example, one or more of the alternate embodiments described above in conjunction with the transmitter-receiver 82 of FIG. 18 can apply to the transmitter-receiver 82 of FIG. 19. Furthermore, the transmitter-receiver 82 of FIG. 19 can include more than one concentric or adjacent circular array 180, or can include one or more additional arrays of another shape such as a square, rectangle, or triangle. For example, where the transmitter-receiver 82 includes concentric circular arrays 180, the antennas 92 of the circular arrays may be aligned along the same radii or may be offset from one another in a circumferential direction. Or where the transmitter-receiver 82 includes three or more concentric circular arrays 180, the radial spacing between antennas in one array and antennas in another array can be uniform or non-uniform, and can be greater than, equal to, or less than $$\frac{\lambda_c}{2}.$$

If this radial spacing is greater than or equal to $$\frac{\lambda_c}{2},$$

then the circumferential spacing between at least two of the antennas 92 is less than $$\frac{\lambda_c}{2}$$

so as to provide a channel capacity C that is greater than the saturation channel capacity $C_{saturation}$.

Figure 20:
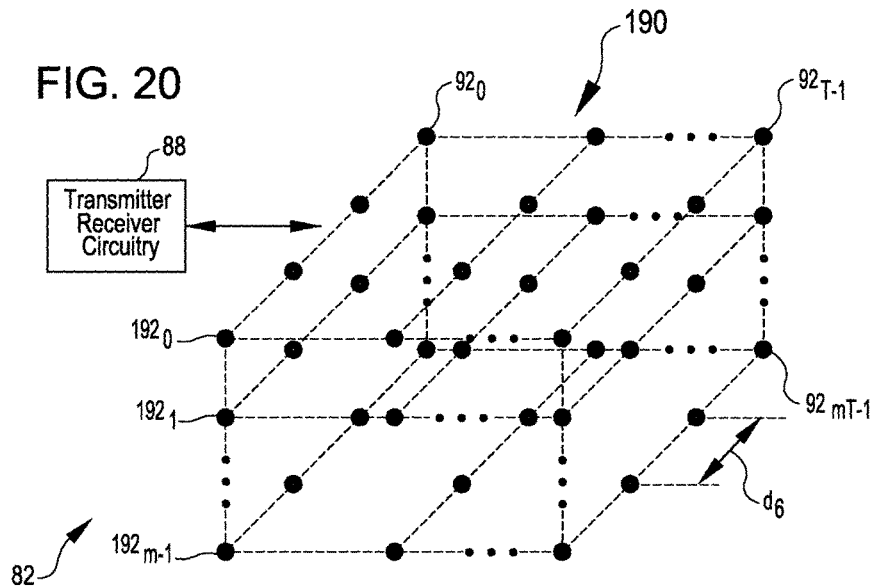
FIG. 20 a diagram of a MIMO-OFDM transmitter-receiver having a three-dimensional row-column-layer antenna array that has a minimum spacing between antennas that is less than one half of the wavelength of a MIMO-OFDM carrier signal, according to an embodiment.

FIG. 20 is a diagram of the MIMO-OFDM transmitter-receiver 82 of FIG. 7, according to another embodiment where the antennas 92 are configured to provide a channel capacity C that exceeds the saturation channel capacity $C_{saturation}$, and where like numbers reference items common to FIGS. 12 and 20, it being understood that the antennas 94 of the MIMO-OFDM transmitter-receiver 84 of FIG. 7 can be configured similarly.

The transmitter-receiver 82 includes mT antennas $92_0$-$92_{mT-1}$, which are configured in a three-dimensional array 190 having m layers $192_0$-$192_{m-1}$. Adjacent ones of the antennas 92 are separated by a uniform minimum distance $$d_6 < \frac{\lambda_c}{2}.$$

The distance $d_6$ may be measured from an edge of an antenna 92 to an edge of an adjacent antenna 92, or, may be measured between the geometrical centers, the centers of mass, the center axes, or other suitable points of the adjacent antennas 92.

The antennas 92 can have radiation patterns, directivities, orientations, and other characteristics according to any of the embodiments described above in conjunction with FIGS. 12-17, or may have other radiation patterns, directivities, orientations, or characteristics as long as the antennas 92 present to other MIMO-OFDM transmitter-receivers antenna profiles that sufficiently diversify the channel so that the channel capacity C is greater a saturation capacity $C_{saturation}$ of the channel. For example, the antennas 92 can each have a same radiation pattern, same directivity, a same orientation, and same other characteristics relative to a line (e.g., a row, a column, or a layer line) along which the antenna lies. Or one or more of the antennas 92 can each have a different (e.g., randomly generated) radiation pattern, directivity, orientation, or other characteristics relative to a line along which the antenna lies.

Still referring to FIG. 20, alternate embodiments of the transmitter-receiver 82 are contemplated. For example, one or more of the alternate embodiments described above in conjunction with the transmitter-receiver 82 of FIGS. 18-19 can apply to the transmitter-receiver 82 of FIG. 20. Furthermore, although shown having a rectangular shape, the array 190 can have any other suitable three-dimensional shape such as a cylinder, sphere, cone, or horn.

Figure 21:
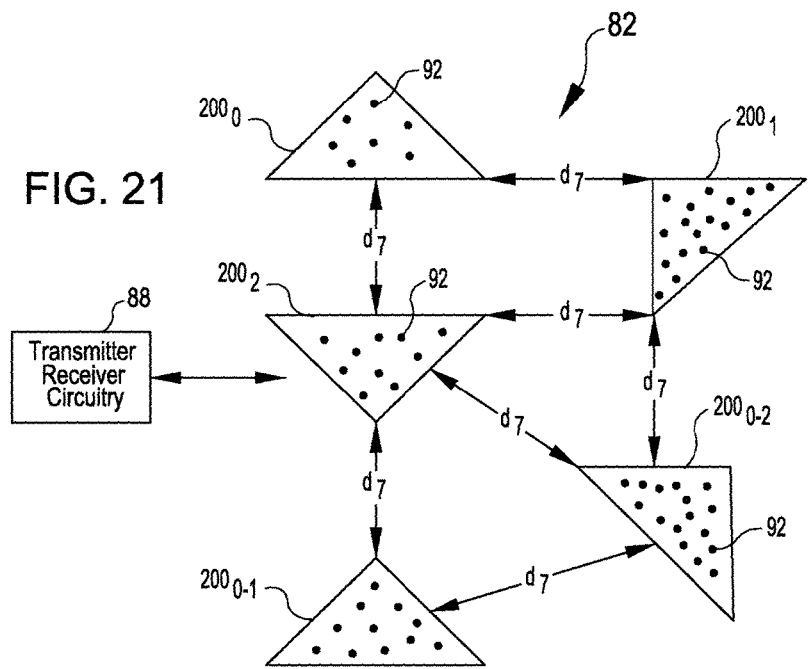
FIG. 21 a diagram of a MIMO-OFDM transmitter-receiver having an antenna array formed from subarrays of antennas, a minimum spacing between antennas within each subarray being less than one half of the wavelength of a MIMO-OFDM carrier signal, a minimum spacing between the subarrays being at least one half of the wavelength of the MIMO-OFDM carrier signal, according to an embodiment.

FIG. 21 is a diagram of the MIMO-OFDM transmitter-receiver 82 of FIG. 7, according to another embodiment where the antennas 92 are configured to provide a channel capacity C that exceeds the saturation channel capacity $C_{saturation}$, and where like numbers refer to like items relative to FIG. 12, it being understood that the antennas 94 of the MIMO-OFDM transmitter-receiver 84 of FIG. 7 can be arranged similarly.

The transmitter-receiver 82 includes o triangular subarrays 200 of T antennas 92, where the minimum spacing $d_7$ between subarrays is greater than or equal to $$\frac{\lambda_c}{2},$$

and where the minimum spacing between the antennas within each subarray is less than $$\frac{\lambda_c}{2}.$$

The distance $d_7$ may be measured from an edge of a subarray 200 to an edge of an adjacent subarray, or, may be measured between the geometrical centers, the centers of mass, the center axes, or other suitable points of the adjacent subarrays; and the distances between the antennas within the subarrays 200 can be measured similarly. Furthermore, an edge of a subarray 200 may be along a curve that connects the outermost antennas 92 in the subarray, or a curve that encloses all of the antennas in the subarray.

Consequently, if, in a particular configuration or application the antennas 92 within each subarray 200 are too close together to further diversify a channel (e.g., when a receiver is in the far field of the transmitter-receiver 82), then the transmitter-receiver 82 can use a single antenna from each subarray to transmit a respective data symbol DS (or multiple antennas within each subarray to transmit a same data symbol DS).

The antennas 92 within each subarray 200 may have radiation patterns, directivities, orientations, or other characteristics according to any of the embodiments described above in conjunction with FIGS. 12-17, or may have other radiation patterns, directivities, orientations, and characteristics as long the antennas present to another MIMO-OFDM transmitter-receiver antenna profiles that sufficiently diversify the channel so that the channel capacity C is greater a saturation capacity $C_{saturation}$ of the channel.

Still referring to FIG. 21, alternate embodiments of the transmitter-receiver 82 are contemplated. For example, although the subarrays 200 of antennas 92 are described as being two-dimensional and having equilateral-triangular shapes, the subarrays may be one-dimensional or three-dimensional, may have any suitable shapes, and may have different sizes. Furthermore, although each subarray 200 is described as including the same number T of antennas 92, one or more subarrays may have a different number of antennas relative to the other subarrays. In addition, although described as being uniformly spaced from one another, the subarrays 200 may be non-uniformly spaced from one another.

Described below in conjunction with FIGS. 22-37 are antennas that can be used as the antennas 92 and 94 of FIGS. 7-21 and the radiation patterns of these antennas, according to embodiments.

Figure 22:
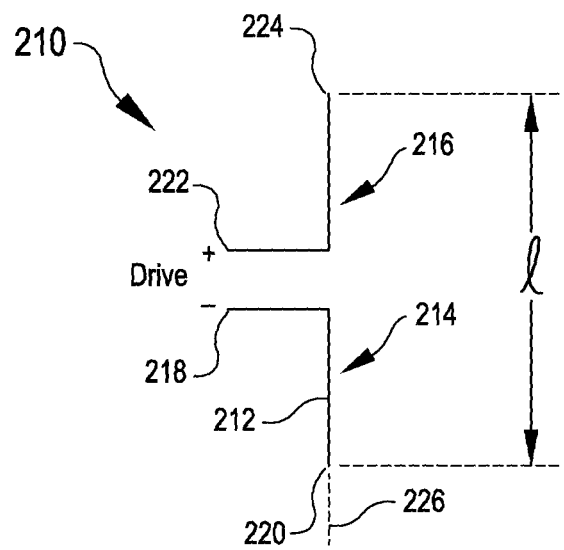
FIG. 22 is a diagram of a half-wavelength dipole antenna that is suitable for use as one or more of the antennas of the MIMO-OFDM transmitter-receivers of FIGS. 7 and 12-21, according to an embodiment.

FIG. 22 is a diagram of a half-wave dipole antenna 210, which can be used as one or more of the antennas 92 and 94 of the MIMO-OFDM transmitter-receivers 82 and 84 of FIGS. 7-21, according to an embodiment.

The antenna 210 is made of conductor 212, such as copper, which has a $$\text{diameter/thickness} << \frac{\lambda_c}{2}.$$

The conductor 212 includes two portions 214 and 216. The portion 214 has a drive end 218 and a termination end 220, and the portion 216 has a drive end 222 and a termination end 224. The drive ends 218 and 222 are in the center of the antenna 210 (i.e., the antenna is a center-tapped half-wave dipole antenna) and are relatively close together such that the combined length 1 of the antenna along its axis 226 is equal to $$\frac{\lambda_c}{2};$$

alternatively, 1 may be slightly less than $$\frac{\lambda_c}{2}$$

to reduce the reactive portion of the antenna's impedance to, or near, zero. Furthermore, the directivity D of the antenna 210 is, or is approximately, 1.76 dBi if the antenna operates other $f_c$ (non-resonant dipole), and is, or is approximately, 2.15 dBi if the antenna operates at $f_c$ (resonant dipole), and the electric field of the electromagnetic waves that the antenna emits are linearly polarized in the dimension of the axis 226.

In operation during signal transmission, the transmitter-receiver circuitry 88 or 90 (FIGS. 7-21) drives the drive ends 218 and 222 differentially with a MIMO-OFDM signal, and during signal reception the transmitter-receiver circuitry differentially receives a MIMO-OFDM signal via the drive ends 218 and 222.

Figure 23:
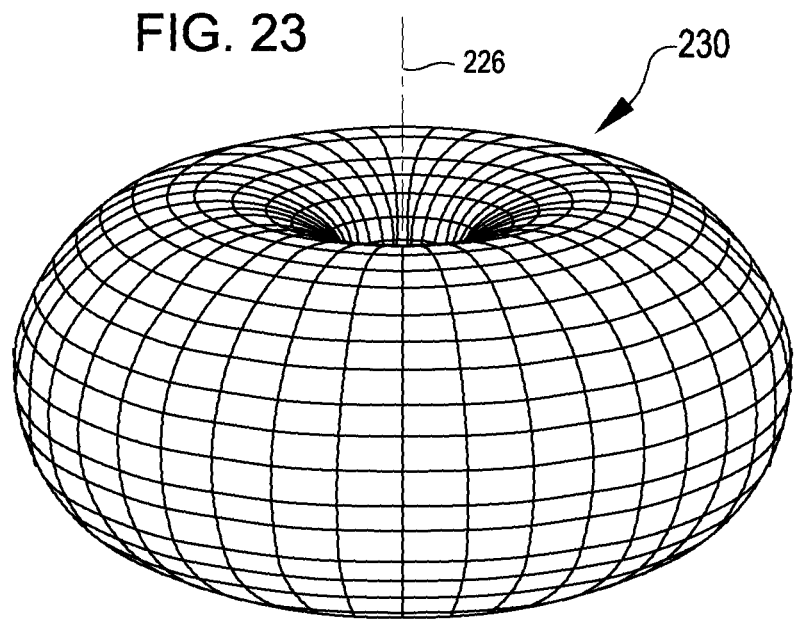
FIG. 23 is a diagram of the radiation pattern of the half-wavelength dipole antenna of FIG. 22, according to an embodiment.

FIG. 23 is a diagram of the radiation pattern 230 of the half-wave dipole antenna 210 of FIG. 22, according to an embodiment.

Although in each horizontal plane that is perpendicular to the antenna axis 226 the antenna 210 has an omnidirectional radiation pattern, the antenna 210, when used as one or more of the antennas 92 and 94 of FIGS. 7-21, can still be used to diversify the communication channel. For example, the axes 226 of two or more of the antennas 210 may be oriented in different directions (i.e., nonparallel to one another), so that in a same plane the antennas present different gains or polarizations. Alternatively, two or more of the antennas 210 may be located at different heights above a reference plane even if their axes 226 are parallel to one another so that in a same plane the antennas present different gains or polarizations.

Referring to FIGS. 22-23, alternate embodiments of the antenna 210 are contemplated. For example, to allow densely arranging the antennas 92 and 94 of the MIMO-OFDM transmitter-receivers 82 and 84 of FIG. 7 with a minimum antenna spacing of less than, even much less than, $$\frac{\lambda_c}{2},$$

one can modify the antenna 210 such that its length $$l < \frac{\lambda_c}{2}.$$

One can even modify the antenna 210 such that its length $$l << \frac{\lambda_c}{2},$$

in which case the antenna is considered to be deeply subwavelength. And to further diversify the channel, one can increase the directivity D of such a reduced-length version of the antenna 210 by increasing the antenna's Q-factor to ten, one hundred, or beyond according to techniques that are described below.

Figure 24:
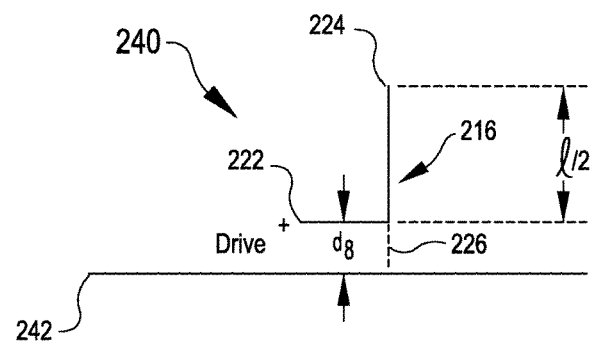
FIG. 24 is a diagram of a quarter-length dipole antenna with ground plane that are suitable for use as one or more of the antennas of the MIMO-OFDM transmitter-receivers of FIGS. 7 and 12-21, according to an embodiment.

FIG. 24 is a diagram of a quarter-wave dipole antenna 240 with ground plane 242, which together can be used as one or more of the antennas 92 and 94 of the MIMO-OFDM transmitter-receivers 82 and 84 of FIGS. 7-21, according to an embodiment.

The antenna 240 is similar to the resonant half-wave dipole 210 of FIG. 22 except that it includes only the upper portion 216 of the conductor 212 having a length $$l/2 = \frac{\lambda_c}{4}$$

(or slightly less than this to reduce the reactive portion of the antenna's impedance to, or to near, zero). The ground plane 242, which is sometimes called a redirector or reflector plane, is formed from a conductive material (e.g., copper) and redirects energy emitted by the antenna 240 such that on the same side of the ground plane as the antenna, the antenna appears as a half-wavelength dipole antenna. And the distance $d_g$ between the drive end 222 and the ground plane 242 is typically much less than l/2.

In operation during signal transmission, the transmitter-receiver circuitry 86 or 88 (FIGS. 7-21) drives the drive end 222 in a single-ended manner with a MIMO-OFDM signal, and during signal reception the transmitter-receiver circuitry receives, in a single-ended manner, a MIMO-OFDM signal via the drive end 222.

Figure 25:
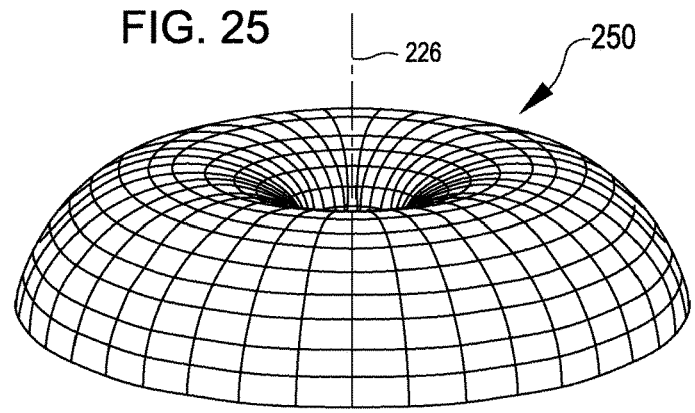
FIG. 25 is a diagram of the radiation pattern of the quarter-length dipole antenna and ground plane of FIG. 24, according to an embodiment.

FIG. 25 is a diagram of the radiation pattern 250 of the quarter-wave dipole antenna 240 of FIG. 24, according to an embodiment.

Although in each horizontal plane that is perpendicular to the antenna axis 226 the antenna 240 has an omnidirectional radiation pattern, the antenna 240, when used as one or more of the antennas 92 and 94 of FIGS. 7-21, can still be used to diversify the communication channel. For example, the axes 226 of two or more of the antennas 240 and their ground planes 242 may be oriented in different directions (i.e., nonparallel to one another), so that in a same plane the antennas present different gains or polarizations. Alternatively, two or more of the antennas 240 and their ground planes 242 may be located at different heights above a reference plane even if their axes 226 are parallel to one another so that in a same plane the antennas present different gains or polarizations.

Referring to FIGS. 24-25, alternate embodiments of the antenna 240 are contemplated. For example, to allow densely arranging the antennas 92 and 94 of the MIMO-OFDM transmitter-receivers 82 and 84 of FIG. 7 with a minimum spacing of less than, even much less than, $$\frac{\lambda_c}{2},$$

one can modify the antenna 240 such that its length $$l/2 < \frac{\lambda_c}{4}.$$

One can even modify the antenna 240 such that its length $$l/2 \ll \frac{\lambda_c}{2},$$

in which case the antenna is considered to be deeply subwavelength. And to further diversify the channel, one can increase the directivity D of such a reduced-length version of the antenna 240 by increasing the antenna's Q-factor to ten, one hundred, or beyond according to techniques that are described below.

Figure 26:
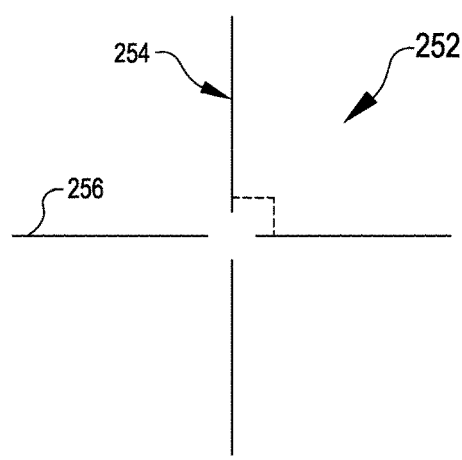
FIG. 26 is a diagram of a two-dimensional polarizing antenna that is suitable for use as one or more of the antennas of the MIMO-OFDM transmitter-receivers of FIGS. 7 and 12-21, according to an embodiment.

FIG. 26 is a diagram of a polarized antenna 252, which can be used as one or more of the antennas 92 and 94 of the MIMO-OFDM transmitter-receivers 82 and 84 of FIGS. 7-21, according to an embodiment.

The antenna 252 is made of two half-wavelength dipoles 254 and 256, each of which may be the same as, or similar to, the half-wavelength dipole 210 of FIG. 22, and which are oriented perpendicular to one another.

One may alter the polarization pattern of the antenna 252 in a number of different ways. For example, one may vary the polarization pattern by varying the phase difference between the signals transmitted or received by the antenna. Furthermore, one may change the angle (90° as shown) between the two dipoles 254 and 256. In addition, one may arrange the dipoles 254 and 256 so that their centers do not coincide; for example, sliding the dipole 256 to the right results in the portion of the dipole 256 to the left of the dipole 254 to be shorter than the portion of the dipole 256 to the right of the dipole 254.

Figure 27:
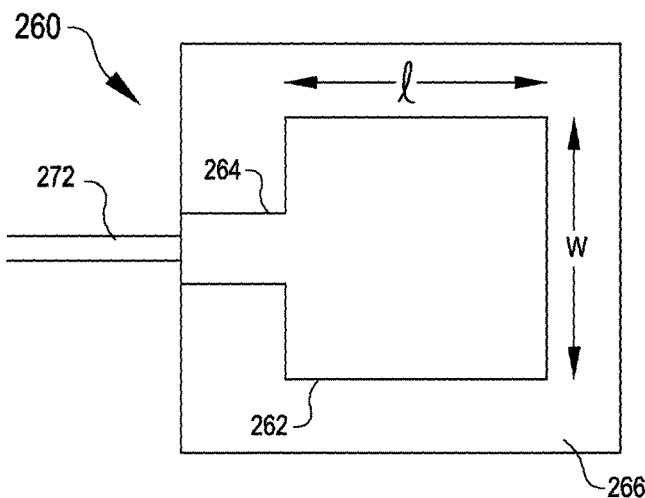
FIG. 27 is a plan view of a patch antenna that is suitable for use as one or more of the antennas of the MIMO-OFDM transmitter-receivers of FIGS. 7 and 12-21, according to an embodiment.
Figure 28:
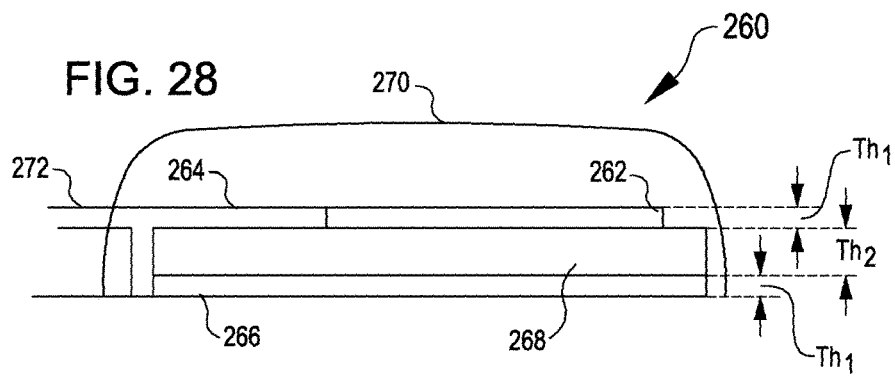
FIG. 28 is a side view of the patch antenna of FIG. 27, according to an embodiment.

FIGS. 27-28 are plan-view and side-view diagrams, respectively, of a patch antenna 260, which can be used as one or more of the antennas 92 and 94 of the MIMO-OFDM transmitter-receivers 82 and 84 of FIGS. 7-21, according to an embodiment.

The antenna 260 includes a plate, i.e., patch 262, made from a conductive material, such as copper, which has a thickness $$T_{h1} \ll \frac{\lambda_c}{2}$$

and which has a length $$l = \frac{\lambda_c}{2}$$

and a width w, where w=l in the described embodiment. A microstrip 264 feeds the MIMO-OFDM signal from the transmitter-receiver circuitry 88 or 90 (FIGS. 7-21) to the patch 262 such that the electric fields of the electromagnetic waves generated by the patch antenna 260 are linearly polarized in the 1 dimension.

The patch 262 is disposed over a ground plane 266, which is also made from a conductive material such as copper and which has, for example, the same thickness $T_{h1}$ as the patch. Typically, the ground plane 266 has the same shape as, but is larger than, the patch 262 in one or both of the length and width dimensions, and one can alter the radiation pattern (see FIG. 29 below) of the antenna 260 by varying the size of the ground plane in one or both of the length and width dimensions.

An insulating separation layer 268 made, for example, from a dielectric material such a printed circuit board (PCB), is disposed between the patch 262 and the ground plane 266. The layer 268 has a thickness $T_{h2}$, where $$T_{h1} < T_{h2} \ll \frac{\lambda_c}{2},$$

where the impedance, Q, and bandwidth of the antenna 260 are dependent on $T_{h2}$. That is, a designer can adjust $T_{h2}$ to vary one or more of the impedance, Q, and bandwidth of the antenna 260.

A radome 270, which is made from a nonconductive material such as a plastic, forms a protective covering over the patch 262, microstrip 264, ground plane 266, and separation layer 268.

The antenna 260 can also include a conventional cable connector (e.g., coaxial cable) 272 having a signal conductor coupled to the microstrip 264 and a ground conductor coupled to the ground plane 266. The cable connector 272 can allow one to couple the patch antenna 260 to the transmitter-receiver circuitry 88 or 90 (FIGS. 7-21) via a conventional cable (e.g., a coaxial cable).

Figure 29:
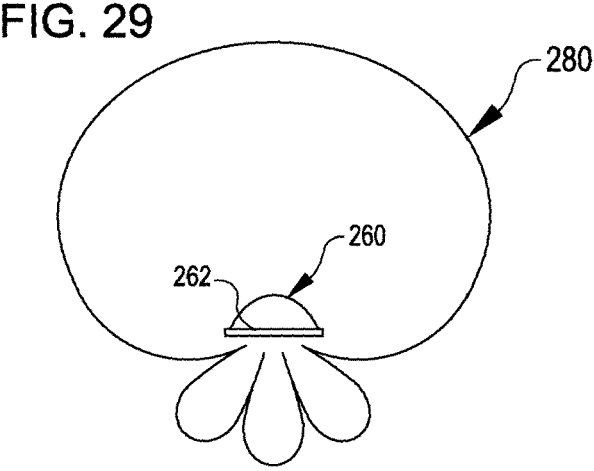
FIG. 29 is a planar view of a radiation pattern of the patch antenna of FIGS. 27 and 28 in the plane of FIG. 29, according to an embodiment.

FIG. 29 is a diagram of the radiation pattern 280 of the patch antenna 260 of FIGS. 27-28, according to an embodiment. The pattern 280 is in a plane that is normal to the surface of the patch 262 and that is parallel to the length 1 dimension of the patch, and the directivity D of the patch antenna 260 is approximately 9 dBi.

In an embodiment, the radiation pattern (not shown in FIG. 28) in a plane that is normal to the surface of the patch 262 and that is parallel to the width w dimension of the patch may be similar to the radiation pattern 280.

Referring to FIGS. 27-29, alternate embodiments of the patch antenna 260 are contemplated. For example, the separation layer 268 may be a gap filled with a fluid such as air. Furthermore, one can alter the microstrip 264, or add slots to the patch 262, in a conventional manner such that the antenna 260 produces circularly polarized waves instead of linearly polarized waves. Moreover, to allow densely arranging the antennas 92 and 94 of the MIMO-OFDM transmitter-receivers 82 and 84 of FIGS. 7-21 with a minimum spacing of less than, even much less than, $$\frac{\lambda_c}{2},$$

one can modify the antenna 260 such that its length 1 and width w are both less than $$\frac{\lambda_c}{2}.$$

One can even modify the antenna 260 such that its length 1 and width w are much, much less than $$\frac{\lambda_c}{2},$$

in which case the antenna is considered to be deeply subwavelength. In addition, the ground plane 266 can be a metamaterial surface such as described below in conjunction with FIGS. 31-33. And to further diversify the channel, one can increase the directivity D of such a reduced-area version of the antenna 260 by increasing the antenna's Q-factor to ten, one hundred, or beyond according to techniques that are described below.

Figure 30:
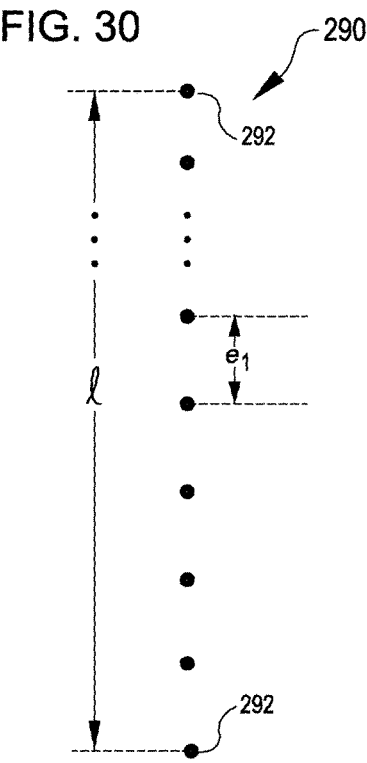
FIG. 30 is a plan view of a multi-antenna-element antenna that is suitable for use as one or more of the antennas of the MIMO-OFDM transmitter-receivers of FIGS. 7 and 12-21, according to an embodiment.

FIG. 30 is diagram of a multiple-element antenna 290, which can be used as one or more of the antennas 92 and 94 of the MIMO-OFDM transmitter-receivers 82 and 84 of FIGS. 7-21, according to an embodiment.

The antenna 290 includes multiple antenna elements 292, which are separated by a uniform distance $$e_1 \ll \frac{\lambda_c}{2},$$

where e can be measured between, for example, the edges, geometric centers, central axes, or centers of mass of adjacent antenna elements 292. By selectively activating and deactivating one or more of the elements 292, the transmitter-receiver circuitry 88 or 90 (FIGS. 7-21) can alter one or more characteristics (e.g., radiation pattern, directivity, gain, phase, polarization) of the antenna 290, and, therefore, can tailor the transmission or the reception profile that the antenna presents to another MIMO-OFDM transmitter-receiver. And this altering and tailoring can be performed and fixed one time by the manufacturer or user, or the MIMO-OFDM transmitter-receiver 82 or 84 can perform this altering and tailoring dynamically depending on the channel conditions so as to increase the capacity of the channel above the channel's saturation capacity, and even to maximize the channel capacity (altering the transmission characteristics of an antenna is described further below in conjunction with FIG. 41).

Each element 292 of the antenna 290 may itself be an antenna such as a half-wave dipole, may be a nonconductive element such as a dielectric, may be a conductive element, or may be a metamaterial element as described below in conjunction with FIGS. 31-33.

To deactivate an element 292, the transmitter-receiver circuitry 88 or 90 (FIGS. 7-21) can electrically uncouple the element from all voltage references such that the element floats electrically.

To activate an element 292 while the transmitter-receiver circuitry 88 or 90 (FIGS. 7-21) is transmitting a signal via the antenna 290, the transmitter-receiver circuitry can couple the element to a fixed voltage reference (e.g., ground or a non-zero voltage), can drive the element with the MIMO-OFDM signal being transmitted, or can drive the element with another signal such as a phase-shifted or gain-altered version of the MIMO-OFDM signal being transmitted.

To activate an element 292 while the transmitter-receiver circuitry 88 or 90 (FIGS. 7-21) is receiving a signal via the antenna 290, the transmitter-receiver circuitry can couple the element to a fixed voltage reference, can couple the element to a time-varying voltage, can couple the element to the transmitter-receiver circuitry with no phase shift or attenuation/amplification, or can couple the element to the transmitter-receiver circuitry via a phase shifter or attenuator/amplifier.

Still referring to FIG. 30, alternate embodiments of the antenna 290 are contemplated. For example, although the antenna elements 292 are described as being arranged along a straight line in one dimension, the elements may be arranged in two or three dimensions and in any suitable shape (e.g., rectangle, square, circle, triangle, cube, sphere, cylinder, cone, or horn). Furthermore, although described as being spaced apart by a uniform distance $e_1$, two or more of the elements 292 may be spaced apart by different distances that are less than $$\frac{\lambda_c}{2}.$$

Moreover, to allow densely arranging the antennas 92 and 94 of the MIMO-OFDM transmitter-receivers 82 and 84 of FIGS. 7-21 with a minimum spacing of less than, even much less than, $$\frac{\lambda_c}{2},$$

one can modify the antenna 290 such that its length $$l < \frac{\lambda_c}{2}.$$

One can even modify the antenna 290 such that its length $$l \ll \frac{\lambda_c}{2},$$

in which case the antenna is considered to be deeply subwavelength. And to further diversify the channel, one can increase the directivity D of such a reduced-length version of the antenna 290 by increasing the antenna's Q-factor to ten, one hundred, or beyond according to techniques that are described below.

Figure 31:
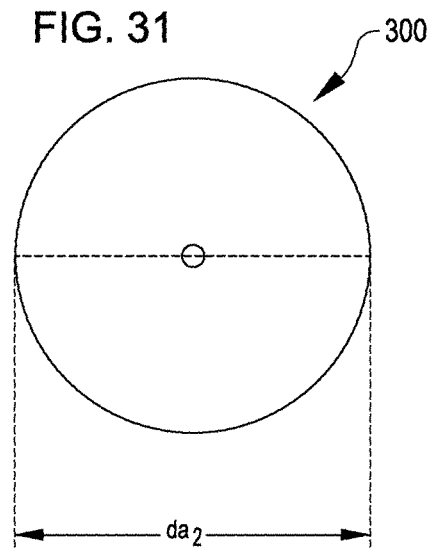
FIG. 31 is a plan view of a metamaterial antenna that is suitable for use as one or more of the antennas of the MIMO-OFDM transmitter-receivers of FIGS. 7 and 12-21, according to an embodiment.
Figure 32:
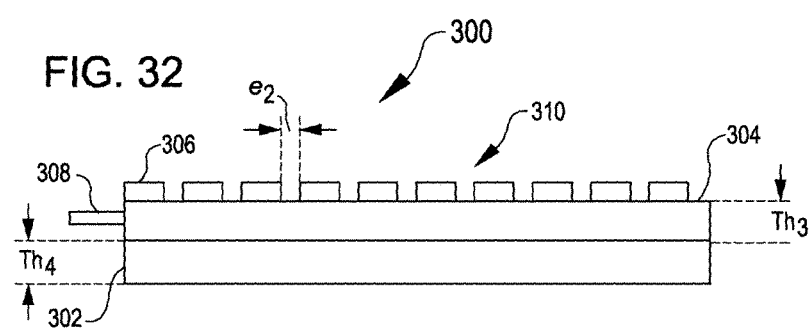
FIG. 32 is a side view of the metamaterial antenna of FIG. 31, according to an embodiment.
Figure 33:
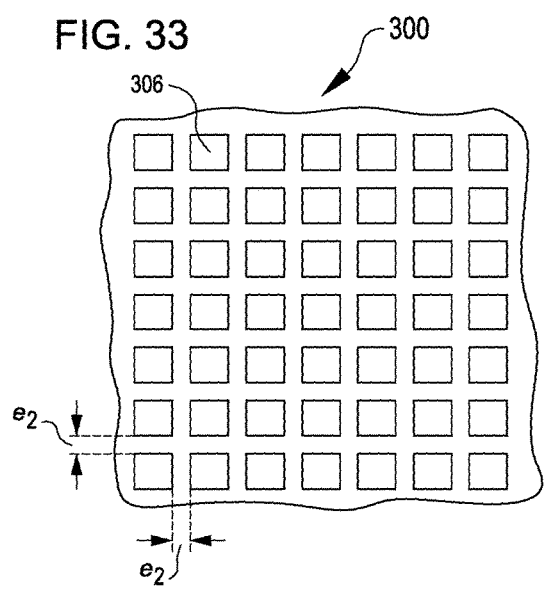
FIG. 33 is a magnified plan view of a region of the metamaterial antenna of FIGS. 31 and 32, according to another embodiment.

FIGS. 31-33 are plan-view, side-view, and magnified plan-view diagrams, respectively, of a metamaterial antenna 300, which can be used as one or more of the antennas 92 and 94 of the MIMO-OFDM transmitter-receivers 82 and 84 of FIGS. 7-21, according to an embodiment.

The antenna 300 includes a base 302 formed from a nonconductive material such as a dielectric, a waveguide plate 304 formed from a conductive material such as copper, metamaterial elements 306 disposed over the plate, each element separated from adjacent elements by a uniform distance $$e_2 \ll \frac{\lambda_c}{2},$$

and a signal coupler 308. The elements 306 may be conductive, nonconductive, or may be separated from the waveguide plate 304 by a thin nonconductive, electrically insulating layer (not shown in FIGS. 31-33). Together, the base 302, plate 304, and elements 306 form a metamaterial; that is, neither the base, plate, nor elements alone form a metamaterial, but the combination of these items forms a metamaterial. Furthermore, the plate 304 and the elements 306 form a metamaterial surface 310.

The diameter $da_2$ of the antenna 300 is greater than or equal to $$\frac{\lambda_c}{2},$$

and the thickness $T_{h3}$ of the waveguide plate 304 is $$\ll \frac{\lambda_c}{2}.$$

The thickness $T_{h4}$ of the base 302 can be any thickness that is suitable for providing sufficient support and stability to the antenna 300, and the thickness $T_{h4}$ and the other electromagnetic properties of the base 302 can be any values suitable to provide acceptable boundary conditions between the base and the plate 304 for a particular application.

By selectively activating and deactivating one or more of the metamaterial elements 306 (this activating and deactivating may be done via the connector 308 or via another connector not shown in FIGS. 31-33), the transmitter-receiver circuitry 88 or 90 (FIGS. 7-21) can alter one or more characteristics (e.g., radiation pattern, directivity, gain, phase, polarization) of the antenna 300, and, therefore, can tailor the transmission profile or the reception profile that the antenna presents to another MIMO-OFDM transmitter-receiver. And this altering and tailoring can be performed and fixed one time by the manufacturer or user, or the MIMO-OFDM transmitter-receiver 82 or 84 (FIGS. 7-21) can perform this altering and tailoring dynamically depending on the channel conditions so as to increase the capacity of the channel above the channel's saturation capacity, and even to maximize the channel capacity.

To deactivate an element 306, the transmitter-receiver circuitry 88 or 90 (FIGS. 7-21) may electrically uncouple the element from all voltage references such that the element floats electrically.

To activate an element 306 while the transmitter-receiver circuitry 88 or 90 (FIGS. 7-21) is transmitting or receiving a signal via the antenna 300, the transmitter-receiver circuitry can couple the element to a fixed voltage reference (e.g., ground, a nonzero voltage), can drive the element with another signal such as an AC signal, or can couple the element to the waveguide plate 304 such that the element is at the same voltage potential as portion of the plate 304 that the element contacts.

In operation during a transmit mode, the transmit-receive circuitry 88 or 90 (FIGS. 7-21) drives the waveguide plate 304 with the MIMO-OFDM signal via the connector 308, causing a wave, such as a standing wave, to form in the waveguide plate.

According to known principles of refraction and diffraction, the metamaterial elements 306 cause the MIMO-OFDM signal to radiate from the metamaterial surface 310 with transmission characteristics (e.g., radiation pattern, directivity, gain, phase, polarization) that are set by the pattern of active and inactive metamaterial elements. If the transmitter-receiver circuitry 88 or 90 (FIGS. 7-21) can alter this pattern dynamically, then the transmitter-receiver circuitry can dynamically alter one or more transmission characteristics of the antenna 300, and thus can dynamically alter the transmission profile that the antenna presents to one or more receive antennas.

In operation during a receive mode, the metamaterial elements 306 cooperate to couple an incoming MIMO-OFDM signal to the waveguide plate 304, thus causing to form in the waveguide plate a wave, such as a standing wave, that propagates to the transmit-receive circuitry 88 or 90 (FIGS. 7-21) via the connector 308.

According to known principles of refraction and diffraction, the metamaterial elements 306 couples to the waveguide plate 304 the MIMO-OFDM signal incident on the metamaterial surface 310 with reception characteristics (e.g., radiation pattern, directivity, gain, phase, polarization) that are set by the pattern of active and inactive metamaterial elements. If the transmitter-receiver circuitry 88 or 90 (FIGS. 7-21) can alter this pattern dynamically, then the transmitter-receiver circuitry can dynamically alter one or more reception characteristics of the antenna 300, and thus can dynamically alter the reception profile that the antenna presents to one or more transmit antennas.

Still referring to FIGS. 31-33, alternate embodiments of the antenna 300 are contemplated. For example, although the antenna elements 306 are described as being arranged in a circular two-dimensional array, the elements may be arranged in one or three dimensions and in any suitable shape (e.g., rectangle, square, triangle, cube, sphere, cylinder, cone, horn). Furthermore, although described as being spaced apart by an uniform distance $e_2$, two or more of the elements 306 may be spaced apart by different distances that are less than $$\frac{\lambda_c}{2}.$$

Moreover, although $e_2$ is described as being measured between edges of adjacent elements 306, $e_2$ may be measured between the geometrical centers, the centers of mass, the central axes, or other points of the adjacent antenna elements. In addition, although the diameter $da_2$ of the antenna 300 is described as being greater than or equal to $$\frac{\lambda_c}{2},$$

$da_2$ may be less than, even much, much less than, $$\frac{\lambda_c}{2}.$$

Furthermore, the metamaterial elements 306 may be arranged such that they, together with the waveguide plate 304 and the base 302, can form multiple antennas 300; for example, the metamaterial elements, waveguide plate, and base may form all of antennas 92 of the transmitter-receiver 82 (FIGS. 7-21) or all of the antennas 94 of the transmitter-receiver 84 (FIGS. 7-21).

FIGS. 34-37 are diagrams of metamaterial elements that can be used as one or more of the metamaterial elements 306 of FIGS. 31-33, according to an embodiment.

Figure 34:
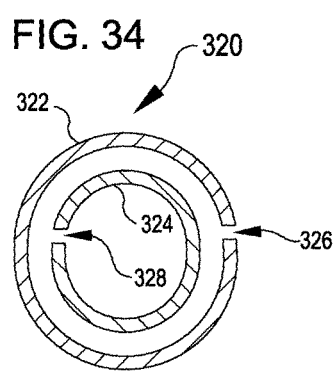
FIG. 34 is a side view of a split-ring resonator that is suitable to be, or to form part of, an element of the metamaterial antenna of FIGS. 31-33, according to an embodiment.

FIG. 34 is a diagram of a conventional split-ring resonator 320, which may form, or form a part of, one or more of the metamaterials elements 306 of FIGS. 31-33, according to an embodiment; the resonator 320 may also be called an electrical inductor-capacitor element. The resonator 320 includes split-ring elements 322 and 324, which are formed from a conductive material, such as copper, and which have respective gaps 326 and 328. A nonconductive fluid such as air or a solid dielectric may fill the gaps 326 and 328. And the dimensions of the resonator 320 are all $$<< \frac{\lambda_c}{2}.$$

Furthermore, although shown as being round, the split-ring elements 322 and 324 may have any suitable shape such as square, rectangular, or triangular.

Figure 35:
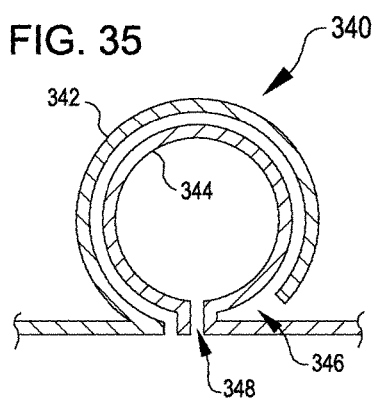
FIG. 35 is a side view of an open split-ring resonator that is suitable to be, or to form part of, an element of the metamaterial antenna of FIGS. 31-33, according to an embodiment.

FIG. 35 is a diagram of a conventional open split-ring resonator 340, which may form, or form a part of, one or more of the metamaterials elements 306 of FIGS. 31-33, according to an embodiment; the resonator 340 may also be called an electrical inductor-capacitor element. The resonator 340 includes split-ring elements 342 and 344, which are formed from a conductive material, such as copper, and which have respective gaps 346 and 348. A nonconductive fluid such as air or a solid dielectric may fill the gaps 346 and 348. And the dimensions of the resonator 340 are all $$<< \frac{\lambda_c}{2}.$$

Furthermore, although shown as being round, the split-ring elements 342 and 344 may have any suitable shape such as square, rectangular, or triangular.

Figure 36:
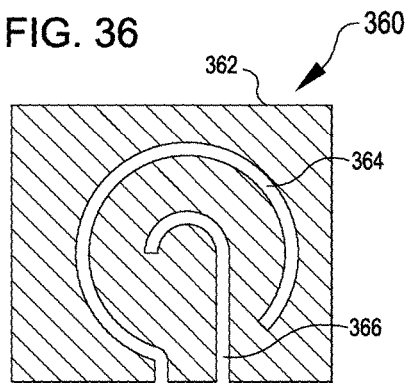
FIG. 36 is a side view of an open complementary split-ring resonator that is suitable to be, or to form part of, an element of the metamaterial antenna of FIGS. 31-33, according to an embodiment.

FIG. 36 is a diagram of a conventional complementary split-ring resonator 360, which may form, or form a part of, one or more of the metamaterials elements 306 of FIGS. 31-33, according to an embodiment; the resonator 360 may also be called a complementary electrical inductor-capacitor element. The resonator 360 includes a resonator plate 362, which is formed from a conductive material, such as copper, and which has split-ring gaps 364 and 366 formed therein. A nonconductive fluid such as air or a solid dielectric may fill the gaps 364 and 366. And the dimensions of the resonator 360 are all $$<< \frac{\lambda_c}{2}.$$

Furthermore, although described as being round, the split-ring gap 364 may have any suitable shape such as square, rectangular, or triangular. Moreover, although described as being candy-cane shaped, the split-ring gap 366 may have any suitable shape such as an "L" shape or an arrow shape.

Figure 37:
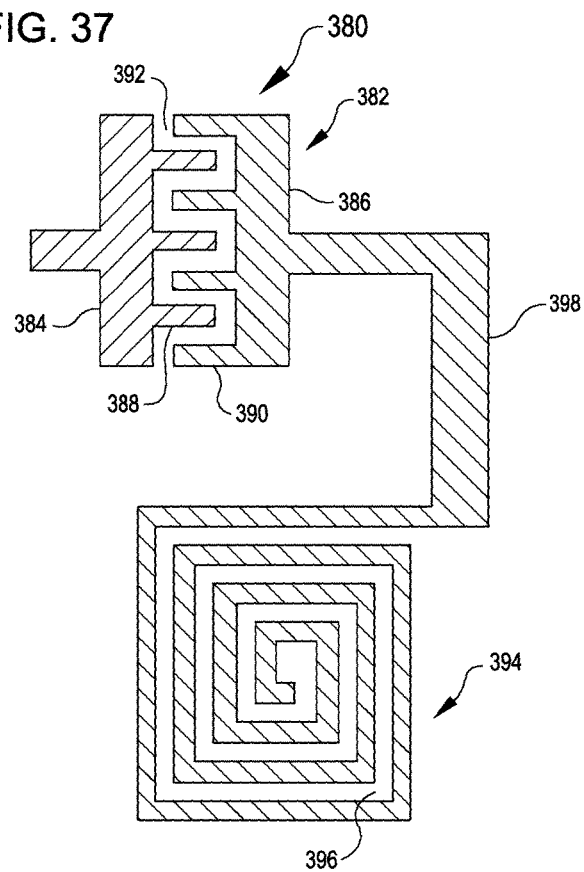
FIG. 37 is a side view of an electrical inductor-capacitor element that is suitable to be, or to form part of, an element of the metamaterial antenna of FIGS. 31-33, according to an embodiment.

FIG. 37 is a diagram of a conventional electrical inductor-capacitor element 380, which may form, or form a part of, one or more of the metamaterials elements 306 of FIGS. 31-33, according to an embodiment.

The electrical inductor-capacitor element 380 includes a capacitor 382 having a first capacitor plate 384 and a second capacitor plate 386. The first capacitor plate 384 is formed from a conductive material, such as copper, and has fingers 388; likewise, the second capacitor plate 386 is formed form a conductive material, such as copper, and includes fingers 390 that are interleaved with the fingers 388. A nonconductive fluid such as air or a solid dielectric can fill gaps 392 between the fingers 388 and 390. The element 380 also includes an inductor 394 formed from a conductive material, such as copper, and a nonconductive fluid such as air or a solid dielectric can fill gaps 396 between the windings of the inductor. A strip 398, which is formed from a conductive material such as copper, electrically and structurally couples together, and is integral with, the second capacitor plate 386 and the inductor 394. Although described as being a straight parallel-plate capacitor, the capacitor 382 can have any suitable shape; likewise, although described as having a square shape, the inductor 394 can have any suitable shape such as round. And the dimensions of the element 380 are all $$\ll \frac{\lambda_c}{2}.$$

Referring again to FIGS. 7 and 12-33, it is evident that antennas having high directivities D can be used as the antennas 92 and 94 to diversify the communication channel sufficiently to provide a channel capacity C that exceeds the saturation channel capacity $C_{saturation}$.

In a densely packed (minimum spacing substantially less than $$\frac{\lambda_c}{2})$$

array of antennas, the antennas, and, therefore, the elements that form multi-element antennas, can be deeply subwavelength in their dimensions (e.g., length, width, depth/thickness, diameter); as such they can be classified as electrically small antennas, with a nuance discussed below.

The maximum directivity D of electrically small antennas, in particular, the fundamental limits thereupon, has been the subject of many studies in the past. For example, an electrically small dipole already has a non-negligible directivity of D=1.50 (1.76 dBi). Per FIGS. 22-23, this directivity alone can have a non-negligible effect on the capacity of a MIMO-OFDM communication channel. And an ideal half-wave ("resonant") dipole has an even higher directivity D=1.64 (2.15 dBi).

Theoretical considerations suggest that the so-called normal directivity D, i.e., the maximum directivity D achievable in a non-resonant antenna (antennas with a resonance Q-factor on the order of unity or below unity) is approximately $D_{max}=AP^2+2AP$, where AP (a dimensionless aperture parameter)=max(1, $k_0Ra$), $k_0$ is the free-space wavenumber (not to be confused with a k subcarrier), and Ra is the antenna radius (half of its diameter). Another theory suggests that the upper limit for normal directivity is $D_{max}=AP^2+2AP+1=(AP+1)^2$. The AP parameter signifies the highest order of a spherical harmonic (or multipole) which can efficiently interact with the antenna of that radius. For an electrically small antenna, AP=1, because the dipole harmonic always exists. In either case, the directivity D of electrically small and non-resonant antennas is capped at 3-4 (4.8-6.0 dBi) according to these theories.

A patch (microstrip) antenna, such as described above in conjunction with FIGS. 27-29 has a substantially higher directivity D in the range 3.2-6.3 (5-9 dBi); however, its unusual directivity is actually due to the participation of the conducting ground plane or dielectric substrate. Currents induced in the ground plane or substrate contribute to the radiation pattern and lead to an effective increase in the size of the patch effective aperture.

This observation leads to a range of embodiments for highly-directive, deeply subwavelength, antennas and antenna elements. Certain antenna geometries, such as those used in metamaterial antennas, such as described above in conjunction with FIGS. 31-33, utilize a ground plane and a one-dimensional or two-dimensional array of antenna elements above it. While the directivity D of any such element without the ground plane and in free space is rather low, and limited by the "normal directivity" theories to a value of 3-6 dBi as described above, in combination with a very wide ground plane these elements can have individual directivities reaching 8-9 dBi, with no known fundamental limit. Such antenna elements can be, for example, rectangular patches (as in the classical patch antenna such as described above in conjunction with FIGS. 27-29), or they can have more intricate shapes, like split-ring resonators (SRR), electrical-inductor-capacitor (ELC) elements and their complementary versions (cSRR, cELC) such as described above in conjunction with FIGS. 34-37. The ground plane itself may be a simple electrical conductor, or a patterned "metasurface" (such as the metasurface 310 described above in conjunction with FIGS. 31-33) exhibiting a wide range of surface impedances, including the known high-impedance ("magnetic ground plane") limit.

Furthermore, interactions between densely packed, tightly spaced antennas or antenna elements can lead to an increase in the effective aperture of each antenna/element, which can enable a higher-than-normal directivity D for each antenna/element. In such a mode of operation, the surrounding antennas/elements act as passive, parasitic antennas/elements each having an impedance that can be tuned to facilitate the creation of a desirable individual-element radiation pattern and directivity.

In such a configuration, it is worth noting that, although multiple antennas/elements participate simultaneously in sending or receiving a signal, the degrees of freedom are nevertheless not lost by virtue of dilution because each multi-antenna/multi-element excitation pattern still has a well-defined power peak with a unique transverse coordinate (this power peak is typically adjacent to the active antenna/element that is being excited). As long as the radiation patterns created by feeding one antenna/element at a time are all distinguishable at the receiver antenna array, these patterns count as linearly independent degrees of freedom (i.e., correspond to linearly independent rows/columns of the estimated channel matrix). In general, the effective rank of the estimated channel matrix is not affected by the mutual coupling between the elements, with the exception of special cases where this coupling is purposely designed to create linear dependencies between the excitation vectors (such special cases are typically not useful to increase the channel capacity by increasing the channel diversity).

A further increase in the directivity D of individual antennas or antenna elements can be obtained when these antennas/elements are highly resonant, that is, when they are characterized by a high Q factor (Q≫1). The normal directivity D described above applies to a situation where the antenna Q-factor is kept low (e.g., on the order of unity). When no constraint is placed on the Q-factor of the antenna/element (and, consequently, the modal Q-factors corresponding to various spherical harmonics are also unlimited), it has been shown by numerous independent studies that the antenna directivity D is not at all limited by any dimensional parameter such as the free-space wavelength. In other words, arbitrarily high-Q antennas can be arbitrarily directive, regardless of their size relative to the wavelength. Antennas having directivity D or gain in excess of the "normal gain" are known as superdirective or supergain antennas.

In general, a low Q-factor can be a desirable feature of a conventional communications antenna/element as it enables wide Instantaneous Bandwidth (IBW). For this reason, super-gain antennas/elements are often deemed impractical for communications. However, in certain applications such as MIMO-OFDM, the available bandwidth is pre-allocated (for example, as a licensed band in the regulated portion of the spectrum). In such applications, the pre-allocated bandwidth can be rather small—on the order of 1% of the MIMO-OFDM carrier frequency $f_c$. This implies that a relatively high-Q antenna (with Q>1, such as Q~10 or higher, or Q~100 or higher) can utilize the entire pre-allocated band efficiently as the band fits within its IBW.

Q-factors in the range of hundreds are readily achievable with regular metals at room temperatures and microwave frequencies; a metamaterial antenna with metamaterial-forming antenna elements is an example. While most metamaterial resonators considered are small electrical or magnetic dipoles, all of the above techniques can utilize higher-order multipole antenna elements as well.

With superconducting metals at temperatures below their superconducting transition, the Q-factors are virtually unlimited. As radiation impedance is the only source of resonator decay rate, the Q-factors can be driven higher by suppressing the radiation impedance through low-order multipole moments. By increasing the internal structural complexity, ohmic loss-free resonators can be turned into arbitrarily high-order multipoles, whose radiative decay rate scales as a power law with the minimum order of the radiating multipole.

In summary, antennas and antenna elements, such as the antenna and antenna elements described above in conjunction with FIGS. 12-37, can be made to have higher directivities D by increasing their Q-factors as described immediately above. And, as described above in conjunction with FIGS. 7 and 12-33, using antennas with relatively high directivities D in a MIMO-OFDM transmitter-receiver, such as the transmitter-receivers 82 and 84 of FIGS. 7 and 12-21, can increase the channel capacity C beyond the saturation capacity $C_{saturation}$ by increasing the diversity of the channel.

Figure 38:
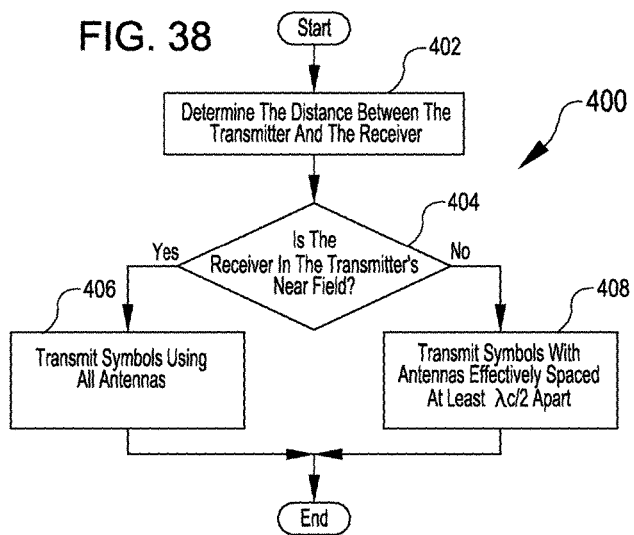
FIG. 38 is a flow diagram of a procedure that the MIMO-OFDM transmitter-receivers of FIGS. 7 and 12-21 can implement for increasing the channel capacity above the saturation channel capacity by increasing the number of signal pipes in the channel, according to an embodiment.

FIG. 38 is a flow diagram of a procedure 400, which the MIMO-OFDM transmitter-receiver 82 of FIGS. 7 and 12-21 can use to determine how many respective data symbols that it can transmit simultaneously to the MIMO-OFDM transmitter-receiver 84, according to an embodiment. Although the transmitter-receiver 82 is described as transmitting data symbols to the transmitter-receiver 84, it is understood that a description of the transmitter-receiver 84 transmitting data symbols to the transmitter-receiver 82 would be similar. Furthermore, for purposes of example, in the below example the transmitter-receiver 82 is referred to as the transmitter, and the transmitter-receiver 84 is referred to as the receiver. Moreover, for purposes of example, it is assumed that the configurations of the antennas 92 and 94 are fixed, and were determined previously to be suitable for increasing the channel diversity in the particular environment (e.g., home, office, public area) in which the transmitter 82 and receiver 84 are being used. In addition, although an action may be attributed to the transmitter 82 or the receiver 84, it is understood that such action is performed by circuitry on board the transmitter or receiver, such as the transmitter circuitry 100 of FIG. 8, the receiver circuitry 120 of FIG. 9, other circuitry that is part of the transmitter-receiver circuitry 88 or 90 of FIGS. 7 and 12-21, or other circuitry that is part of the transmitter 82 or the receiver 84.

First, at a step 402, the transmitter 82 determines the distance between the transmitter 82 and the receiver 84. The transmitter 82 may do this using any suitable conventional distance-determining technique.

Next, at a step 404, the transmitter 82 determines whether the receiver 84 is within the near field of the transmitter 82. Although the boundary between the near field and far field of the aperture formed by the transmit antennas 92 can be difficult to calculate precisely, e.g., because the boundary depends on the number and location of scattering objects in the subchannel portions between the transmitter 82 and receiver 84, one can calculate, a priori, a conservative boundary based on the configuration of the antennas 92, the configuration of the antennas 94 (if known a priori), and the statistical channel state for the particular application or environment in which the transmitter 82 and receiver 84 are being used. For example, one can calculate near-field/far-field boundaries for different applications and environments, store them in a look-up table (LUT, not shown in FIG. 7, 12-21, or 38), and use as the boundary the stored boundary value that corresponds most closely with the current application or environment, which one may input to the transmitter 82 during its set up (e.g., in response to a set-up wizard or the like).

If the transmitter 82 determines that the receiver 84 is in the near field of the transmitter 82, then, at a step 406, the transmitter 82 transmits training symbols from each of the transmit antennas 92 so that the receiver 84 can estimate the channel matrix $\hat{H}$. Then, the transmitter 82 transmits a respective data symbol via each of the transmit antennas 92. That is, the transmitter 82 "assumes" that because the receiver 84 is within the transmitter's near field, the channel is sufficiently diverse for the receiver to distinguish all of the transmit antennas 92. Consequently, because the minimum spacing between adjacent transmit antennas 92 is less than $$\frac{\lambda_c}{2}$$

and the receiver 84 is within the near field of the transmitter 82, the transmitter is able to take advantage of the channel capacity provided by the transmit antennas, which capacity is above the channel's saturation capacity.

In contrast, if the transmitter 82 determines that the receiver 84 is not in the near field of the transmitter 82, then, at a step 408, the transmitter 82 transmits training symbols only via ones of the transmit antennas 92 that are spaced apart by at least $$\frac{\lambda_c}{2}$$

so that the receiver 84 can estimate the channel matrix $\hat{H}$. Next, the transmitter 82 transmits a respective data symbol only via the same ones of the transmit antennas 92 that are spaced apart by at least $$\frac{\lambda_c}{2}.$$

For example, if the antennas 92 are arranged in subarrays 200 as described above in conjunction with FIG. 21, then the transmitter 82 transmits a single respective data symbol via the antennas in each subarray. The transmitter 82 can use a single antenna 92 within each subarray 200, or can use multiple antennas within each subarray to transmit the same respective data symbol so as to increase the SNR of the signal carrying this data symbol at the receiver 84. In this example, the transmitter 82 "assumes" that because the receiver 84 is not within the transmitter's near field, the channel is insufficiently diverse for the receiver to distinguish all of the transmit antennas 92, but is sufficiently diverse for the receiver to distinguish the transmit antennas that are spaced apart by at least $$\frac{\lambda_c}{2}.$$

Consequently, the transmitter 82 "assumes' that in this situation, the channel capacity is no more than its saturation capacity.

Still referring to FIG. 38, alternate embodiments of the procedure 400 are contemplated. For example, the procedure 400 may include steps not described herein, the procedure may omit one or more of the described steps, and the transmitter 82 may perform the steps 402-408 (minus any omitted steps and including any added steps) in an order that is different from the described order.

Figure 39:
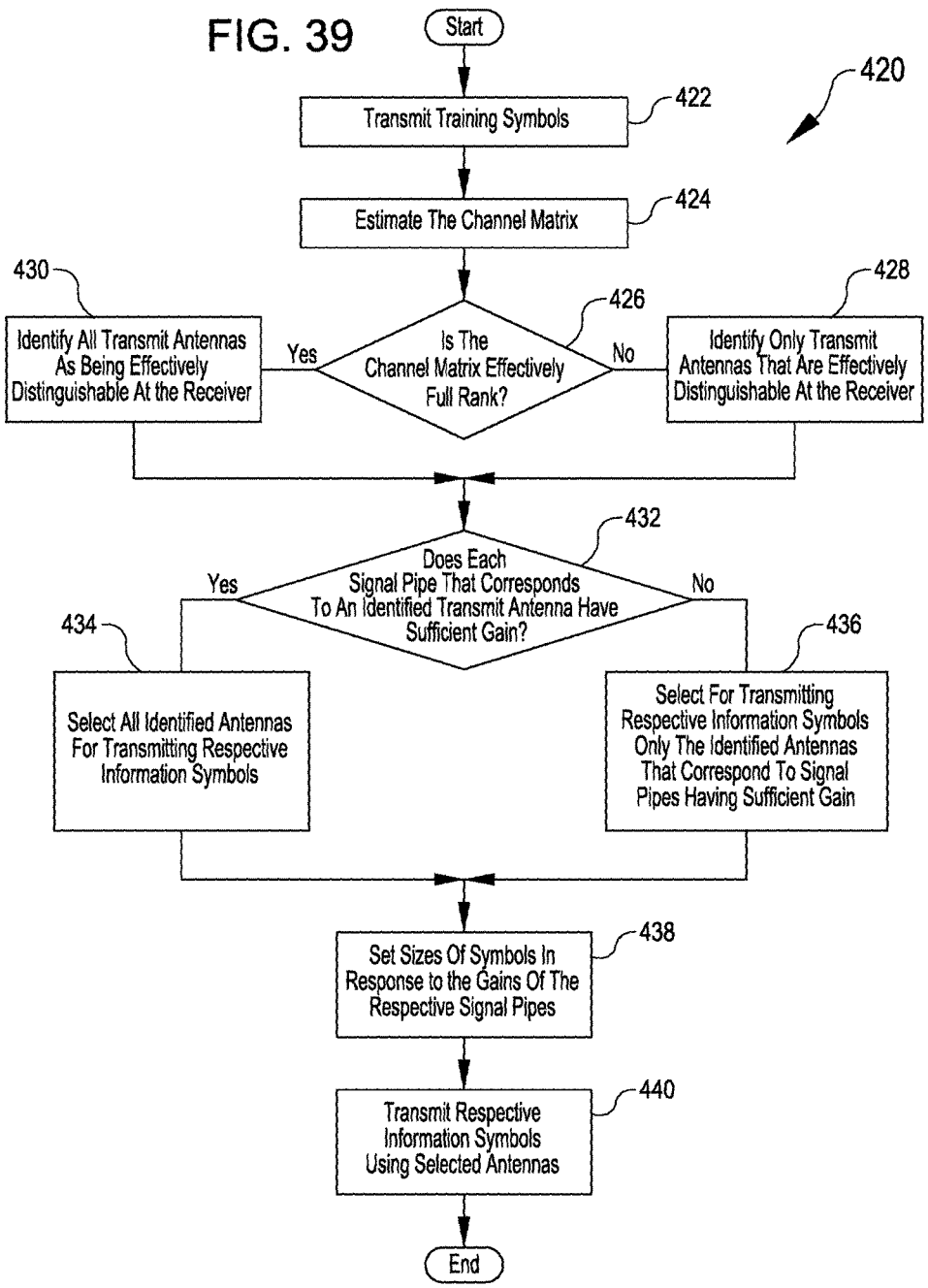
FIG. 39 is a flow diagram of a procedure that the MIMO-OFDM transmitter-receivers of FIGS. 7 and 12-21 can implement for increasing the channel capacity above the saturation channel capacity by increasing the number of signal pipes in the channel, according to an embodiment.

FIG. 39 is a flow diagram of a procedure 420, which the MIMO-OFDM transmitter-receiver 84 of FIGS. 7 and 12-21 can use to determine how many respective data symbols the MIMO-OFDM transmitter-receiver 82 (also of FIGS. 7 and 12-21) can transmit simultaneously to the transmitter-receiver 84, according to an embodiment. Although the transmitter-receiver 82 is described as transmitting symbols to the transmitter-receiver 84, it is understood that a description of the transmitter-receiver 84 transmitting symbols to the transmitter-receiver 82 would be similar. Furthermore, for purposes of example, in the below example the transmitter-receiver 82 is referred to as the transmitter, and the transmitter-receiver 84 is referred to as the receiver. Moreover, for purposes of example, it is assumed that the configurations of the antennas 92 and 93 are fixed, and were determined previously to be suitable for increasing the channel diversity in the particular environment (e.g., home, office, public area) in which the transmitter-receivers 82 and 84 are being used. In addition, although an action may be attributed to the transmitter 82 or the receiver 84, it is understood that such action is performed by circuitry on board the transmitter or receiver, such as the transmitter circuitry 100 of FIG. 8, the receiver circuitry 120 of FIG. 9, other circuitry that is part of the transmitter-receiver circuitry 88 or 90 of FIGS. 7 and 12-21, or other circuitry that is part of the transmitter 82 or the receiver 84.

First, at a step 422, the transmitter 82 transmits respective training symbols from each of the antennas 92, where each of the training symbols is different from the other training symbols. The transmitter 82 may transmit each of the training symbols serially, i.e., at separate times, or may transmit the training symbols simultaneously such as described above in conjunction with FIGS. 3-4. Sending different training symbols helps the receiver 84 better determine from which transmit antenna 92 the transmitter 82 is transmitting each training symbol, particularly when the transmitter transmits the training symbols simultaneously.

Next, at a step 424, the receiver 84 estimates the channel matrix $\hat{H}$.

Then, at a step 426, the receiver 84 determines whether the estimated channel matrix $\hat{H}$ is effectively full rank as described above in conjunction with FIG. 6.

If, at step 426, the receiver 84 determines that the channel is not effectively full rank, then, at a step 428, the receiver identifies the one or more transmit antennas 92 that the receiver can distinguish; that is, the receiver identifies the one or more transmit antennas that are associated with rows/columns of the estimated channel matrix $\hat{H}$ that are effectively linearly independent from the other rows/columns of $\hat{H}$.

In contrast, if, at step 426, the receiver 84 determines that the channel is effectively full rank, then, at a step 430, it identifies all of the transmit antennas 92 as being distinguishable at the receiver; that is, the receiver determines that all of the rows/columns of the estimated channel matrix $\hat{H}$ are effectively linearly independent from one another.

Next, at a step 432, for each signal pipe respectively associated with one of the identified transmit antennas 92, the receiver 84 determines whether the gain of the signal pipe is sufficient to provide, at the receiver, a SNR that is large enough for the receiver to recover a symbol from the MIMO-OFDM signal transmitted over the signal pipe. For example, the receiver 84 can determine whether a signal pipe has sufficient gain by calculating a sum $Gain_{sum}$ of the gains over all of the subchannels 140 (FIGS. 7 and 12-21) that form the signal pipe (i.e., all of the subchannels 140 associated with the transmit antenna 92 corresponding to the signal pipe) and comparing this sum to a threshold $Th_{gain}$. If $Gain_{sum} \geq Th_{gain}$, then the receiver 84 determines that the signal pipe has a sufficient gain; conversely, if $Gain_{sum} < Th_{gain}$, then the receiver 84 determines that the signal pipe has insufficient gain and should not be used for transmitting a respective data symbol.

If, at step 432, the receiver 84 determines that all of the signal pipes corresponding to the transmit antennas 92 identified at either step 428 or 430 have sufficient gain, then, at a step 434, the receiver selects all of the previously identified transmit antennas 92 for transmitting respective data symbols.

In contrast, if, at step 432, the receiver 84 determines that not all of the signal pipes corresponding to the transmit antennas 92 identified at either step 428 or 430 have sufficient gain, then, at a step 436, the receiver selects for transmitting respective data symbols only the identified transmit antennas 92 whose corresponding signal pipes have sufficient gain.

Then, at a step 438, the receiver 84 sets the sizes (e.g., number of bits) of the data symbols to be transmitted by the transmit antennas 92 selected at either step 434 or 436 according the gains of the signal pipes corresponding to the selected transmit antennas. For example, if a signal pipe as a higher gain than another signal pipe, then the receiver 84 may set the number of bits in the data symbol to be transmitted over the former signal pipe higher than the number of bits in the data symbol to be transmitted over the latter signal pipe. For example, the receiver 84 can use a "waterfall" procedure to set the data-symbol sizes as described in *Introduction to MIMO Communications*, which was previously incorporated by reference. After setting the data-symbol sizes, the receiver 84 sends to the transmitter 82 the identities of the selected transmit antennas 92 and the sizes of their respective data symbols. The receiver 84 can send this information to the transmitter via the antennas 94 (acting as transmit antennas) and 92 (acting as receive antennas), and the transmitter 82 can recover this information using an estimated channel matrix $\hat{H}$ that the transmitter 82, then acting as a receiver, previously estimated.

Next, at a step 440, the transmitter 82 transmits to the receiver 84 via the selected transmit antennas 92 respective data symbols each having the respective size set by the receiver 84 at step 438. Regarding the unselected transmit antennas 92, the transmitter 82 can deactivate them (i.e., send no signals via the unselected antennas), or can redundantly transmit via one or more of these unselected antennas a data symbol that the transmitter is also transmitting via a selected transmit antenna. For example, suppose transmit antenna $92_1$ is unselected, and the transmitter 82 transmits a data symbol $DS_0$ via the selected transmit antenna $92_0$. The transmitter 82 also can elect to transmit $DS_0$ via the transmit antenna $92_1$. Such redundant transmission of the data symbol $DS_0$ can increase, at the receiver 84, the total SNR of the MIMO-OFDM signals carrying $DS_0$, and can allow the transmitter 82 to increase the size of $DS_0$.

Still referring to FIG. 39, alternate embodiments of the procedure 420 are contemplated. For example, the procedure 420 may include steps not described herein, the procedure may omit one or more of the described steps, or the transmitter 82 and receiver 84 can perform the steps 422-440 in an order that is different from the described order. Furthermore, the transmitter 82 can perform one or more of the steps 424-438 in response to channel-state or other information that the receiver 84 provides to the transmitter. Moreover, although described as transmitting different training symbols from the antennas 92 during a training period, the transmitter 82 may transmit same training symbols from two or more of the antenna 92 during a training period either serially or simultaneously.

Figure 40:
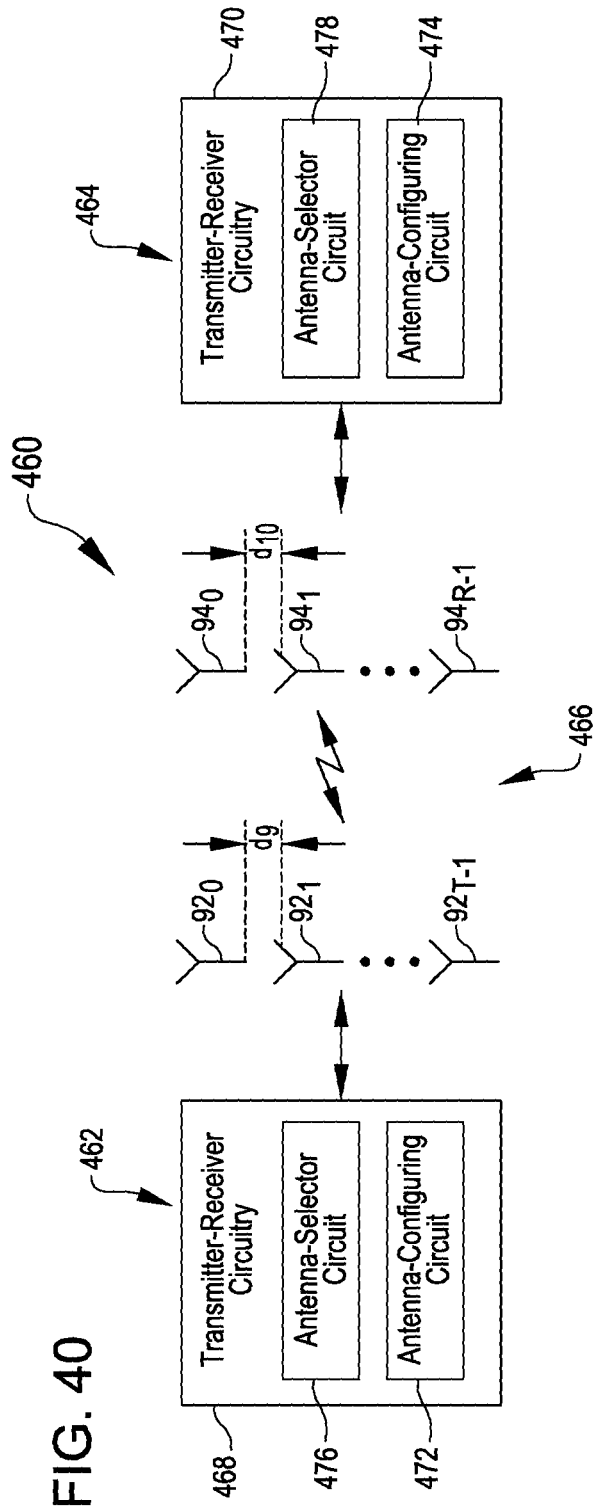
FIG. 40 is a diagram of two MIMO-OFDM transmitter-receivers that each can configure one or more characteristics its antennas so as to increase the channel capacity above the saturation channel capacity by increasing the number of signal pipes in the channel, according to an embodiment.

FIG. 40 is a diagram of a MIMO-OFDM system 460, which includes two MIMO-OFDM transmitter-receivers 462 and 464, and of the portion 466 of the communication channel between the transmitter-receivers, according to an embodiment. The transmitter-receivers 462 and 464 respectively include transmit-receive circuitry 468 and 470 and antennas 92 and 94, and the minimum spacings $d_9$ and $d_{10}$ between the antennas 92 and the antennas 94, respectively, are less than one half the wavelength $$\left(\frac{\lambda_c}{2}\right)$$

of the MIMO-OFDM carrier signal at frequency $f_c$. For example purposes, it is assumed that the transmitter-receiver 462 is transmitting MIMO-OFDM signals with the antennas 92, and that the transmitter-receiver 464 is receiving the transmitted signals with the antennas 94, it being understood that the below description would be similar if the transmitter-receiver 464 where transmitting the signals and the transmitter-receiver 462 were receiving the signals. Furthermore, it is assumed that the number T of transmitting antennas 92 is equal to the number R of receiving antennas 94. Moreover, it is assumed that each of the antennas 92 and 94 can be any type of antenna such as those described above in conjunction with FIGS. 22-37, and that the antennas 92 and the antennas 94 can be configured in any type of array pattern such as those described above in conjunction with FIGS. 12-21. In addition, each antenna 92 can be the same as, or different from, one or more other antennas 92, and each antenna 94 can be the same as, or different from, one or more other antennas 94. Furthermore, the antennas 92 can form a same type or a different type of array compared to the type of array that the antennas 94 form.

In an embodiment, the system 460 can be the same as the system 80 of one or more of FIGS. 7 and 12-21 but for the transmitter-receiver circuitry 468 and 470 respectively including antenna-configuring circuits 472 and 474. The transmitter-receiver circuits 468 and 470 also include antenna-selector circuits 476 and 478, which can be the same as the antenna-selector circuit 114 of FIG. 8.

The antenna-configuring circuit 472 is configured to configure one or more characteristics (e.g., radiation pattern, gain, phase, directivity, polarization, orientation, position) of each of the antennas 92. Therefore, during a transmission mode, the antenna-configuring circuit 472 can configure the transmission profile that each antenna 92 presents to the receive antennas 94. By configuring the transmission profiles of the antennas 92, the antenna-configuration circuit 472 can configure the antennas to increase the diversity of the channel, and thus to increase the capacity C of the channel above its saturation capacity $C_{saturation}$. Likewise, during a receiving mode, the antenna-configuring circuit 472 can configure the reception profile that each antenna 94 presents to transmit antennas. By configuring the reception profiles of the antennas 92, the antenna-configuration circuit 472 can configure the antennas to increase the diversity of the channel, and thus to increase the capacity C of the channel above its saturation capacity $C_{saturation}$.

The antenna-configuring circuit 472 can configure the radiation pattern, gain, phase, and directivity, either together or separately, of an antenna 92 by changing one or more physical parameters of the antenna. For example, if the antenna 92 is a multi-element antenna like the metamaterial antenna 300 of FIGS. 31-33, then the antenna-configuring circuit 472 can select which of the antenna elements to activate and to inactivate to set the antenna radiation pattern, gain, phase, and directivity together or separately.

The antenna-configuring circuit 472 also can configure the polarization of an antenna 92 by changing one or more physical parameters of the antenna. For example, if the antenna 92 is a multi-element antenna like the metamaterial antenna 300 of FIGS. 31-33, then the antenna-configuring circuit 472 can select which of the antenna elements to activate and to inactivate to set the antenna polarization. Or, if the antenna 92 is a polarized antenna like the antenna 252 of FIG. 26, then the antenna-configuring circuit 472 can move the components of the antenna relative to one another to change the polarization pattern of the antenna; for example, the antenna-configuring circuit can slide the component 254 of the antenna 252 left or right relative to the component 256, or can rotate the component 254 relative to the component 256 to change the angle between the components 254 and 256.

Furthermore, the antenna-configuring circuit 472 can configure the orientation and position of an antenna 92 together or separately by changing one or more physical parameters of the antenna. For example, if the antenna 92 is a multi-element antenna like the metamaterial antenna 300 of FIGS. 31-33, then the antenna-configuring circuit 472 can select which of the antenna elements to activate and to inactivate to set the effective antenna orientation or position (e.g., make it appear as if the antenna has rotated about one of its axes or shifted its position). Or, if the antenna 92 is dipole like the antenna 210 of FIG. 22 or is a patch antenna like the antenna 260 of FIGS. 27-29, then the antenna-configuring circuit 472 can move the antenna or can rotate the antenna about one or more of its axes.

And the antenna-configuring circuit 474 is configured to configure one or more characteristics (e.g., radiation pattern, gain, phase, directivity, polarization, orientation, position) of each of the antennas 94 in a similar manner.

Still referring to FIG. 40, alternate embodiments of the MIMO-OFDM system 460 are contemplated. For example, any of the alternate embodiments described above in conjunction with FIGS. 7 and 12-21 for the MIMO-OFDM system 80 can be applicable to the MIMO-OFDM system 460 of FIG. 40. Furthermore, the system 460 can include more than the two MIMO-OFDM transmitter-receivers 462 and 464, such as where one of the transmitter-receivers is a wireless 802.11 compatible router and the other transmitter-receivers are clients (e.g., WiFi enabled smart phones).

Figure 41:
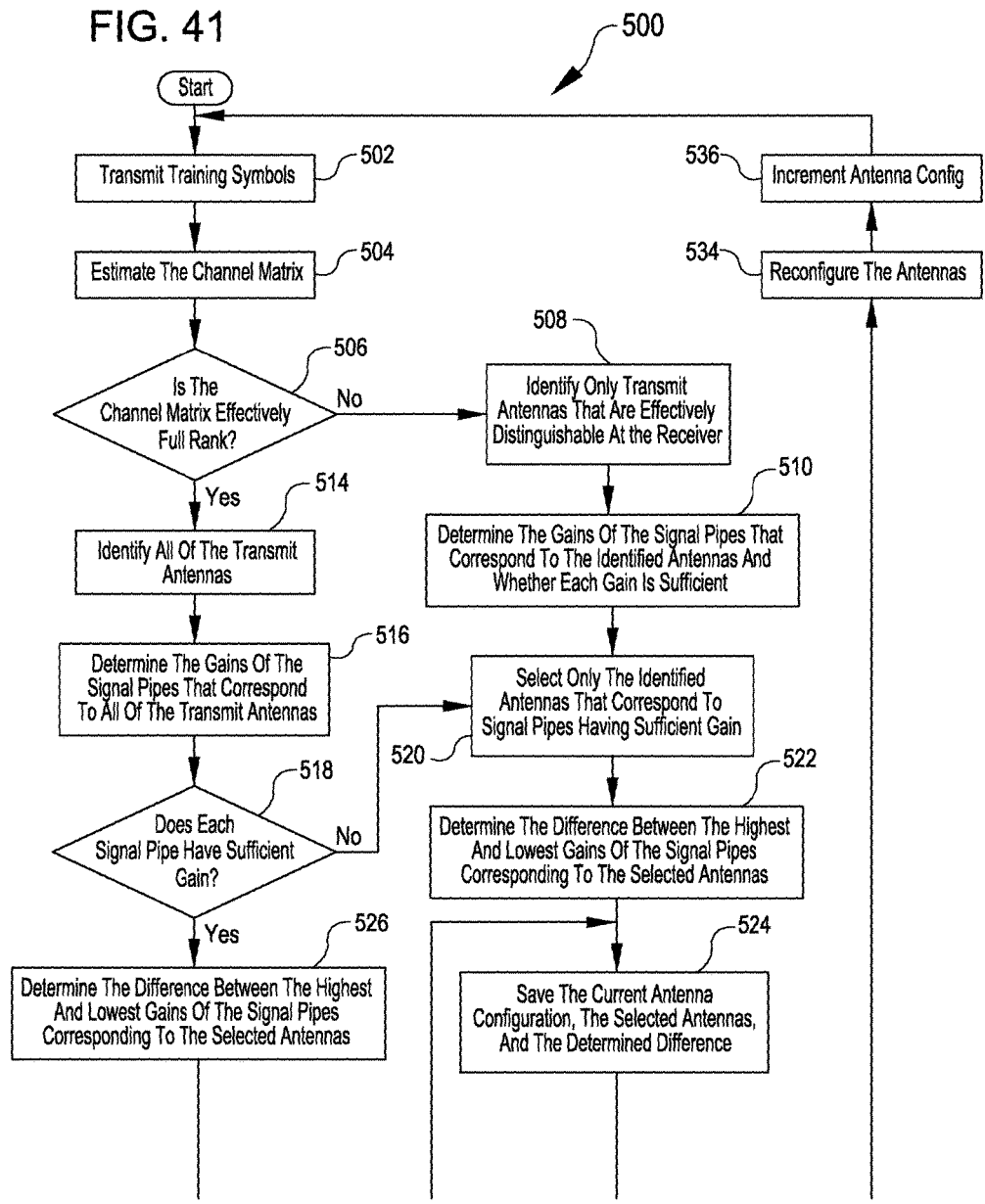
FIG. 41 is a flow diagram of a procedure that the MIMO-OFDM transmitter-receivers of FIG. 40 can implement for increasing the channel capacity above the saturation channel capacity by increasing the number of signal pipes in the channel, according to an embodiment.
Figure 41:
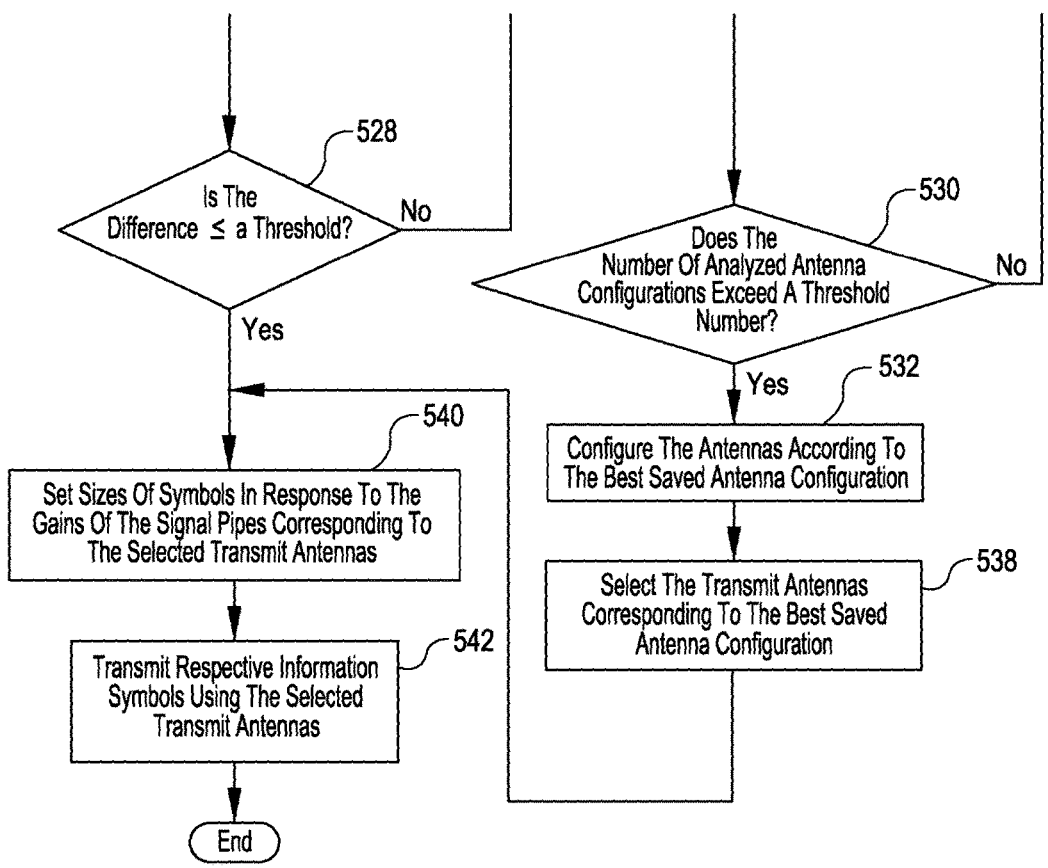

FIG. 41 is a flow diagram of a procedure 500, which the MIMO-OFDM transmitter-receiver 462, the MIMO-OFDM transmitter-receiver 464, or both the transmitter-receivers 462 and 464 can of FIG. 40 can use to determine how many respective data symbols the transmitter-receiver 462 can transmit simultaneously to the transmitter-receiver 464 during a single symbol period, according to an embodiment. Although the transmitter-receiver 462 is described as transmitting symbols to the transmitter-receiver 464, it is understood that a description of the transmitter-receiver 464 transmitting symbols to the transmitter-receiver 462 would be similar. Furthermore, for example purposes, the transmitter-receiver 462 is referred to as the transmitter, and the transmitter-receiver 464 is referred to as the receiver. Moreover, although an action may be attributed to the transmitter 462 or the receiver 464, it is understood that such action is performed by circuitry on board the transmitter or receiver, such as the transmitter-receiver circuitry 468 and the transmitter-receiver circuitry 470 of FIG. 40, other circuitry that is part of the transmitter-receiver circuitry 468 or 470, or other circuitry that is part of the transmitter 462 or the receiver 464.

In summary, if, by following the procedure 500, the receiver 464 determines that the channel capacity C with a current antenna configuration is greater than or equal to a threshold level that is greater than the saturation channel capacity $C_{saturation}$, then it notifies the transmitter 462 to transmit data symbols using the current antenna configuration; otherwise, the receiver causes one or more of the antennas 92 and 94 to be reconfigured in an attempt to increase the channel capacity, at least up to a set number of iterations.

In more detail, first, at a step 502, the transmitter 462 transmits respective training symbols from each of the antennas 92, where each of the training symbols is different rom the other training symbols. The transmitter 462 may transmit each of the training symbols serially, i.e., at separate times, or may transmit the training symbols simultaneously such as described above in conjunction with FIGS. 3-4. Sending different training symbols helps the receiver 464 better determine from which transmit antenna 92 the transmitter 462 transmitted each training symbol, particularly when the transmitter transmits the training symbols simultaneously. Alternatively, the transmitter 462 can transmit same training symbols from two or more of the antennas 92.

Next, at a step 504, the receiver 464 estimates the channel matrix $\hat{H}$.

Then, at a step 506, the receiver 464 determines whether the estimated channel matrix $\hat{H}$ is effectively full rank as described above in conjunction with FIG. 6. That is, the receiver 464 determines which of the transmit antennas 92 it can distinguish by determining which rows/columns of the estimated channel matrix $\hat{H}$ are effectively linearly independent from one another. If all rows/columns of the estimated channel matrix $\hat{H}$ are effectively linearly independent from one another, then the estimated channel matrix is effectively full rank.

If, at the step 506, the receiver 464 determines that the estimated channel matrix is not effectively full rank, then the receiver proceeds along a path of the procedure 500 that culminates in a reconfiguration of one or more of the antennas 92 and 94 in an effort to cause the estimated channel matrix to be effectively full rank. More specifically, the receiver 464 proceeds to a step 508, at which the receiver identifies the one or more transmit antennas 92 that the receiver can distinguish; that is, the receiver identifies the one or more transmit antennas that are associated with rows/columns of the estimated channel matrix $\hat{H}$ that are effectively linearly independent from the other rows/columns of $\hat{H}$. Next, at a step 510, the receiver 464 determines the gains of the signal pipes that correspond to the transmit antennas 92 identified at the step 508, and determines whether each gain is large enough to provide a sufficient SNR at the receiver. For example, the receiver 464 can determine the gain of a signal pipe by calculating a sum $Gain_{sum}$ of the gains over all of the subchannels that form the signal pipe (i.e., all of the subchannels associated with the transmit antenna 92 corresponding to the signal pipe), and then by comparing this sum to a threshold $Th_{gain}$. If $Gain_{sum} \geq Th_{gain}$, then the receiver 464 determines that the signal pipe has a sufficient gain; conversely, if $Gain_{sum} < Th_{gain}$, then the receiver 464 determines that the signal pipe has insufficient gain and should not be used to transmit a respective data symbol (the receiver can select, or be programmed with, a value for $Th_{gain}$ corresponding to the application or to other conventional criteria). The receiver 464 then proceeds to a step 520, which is described below.

In contrast, if, at the step 506, the receiver 464 determines that the estimated channel matrix is effectively full rank, then the receiver continues along a procedural path in which the current antenna configuration is deemed to provide a sufficient channel capacity. More specifically, the receiver 464 proceeds to a step 514, at which the receiver identifies all of the transmit antennas 92 as being distinguishable at the receiver, and, then proceeds to a step 516, at which the receiver determines the gains of the signal pipes that respectively correspond to all of the transmit antennas 92; the receiver can determine the gains of the signal pipes in a manner similar to that described above in conjunction with the step 510.

Next, at a step 518, the receiver 464 determines whether the gain of each signal pipe is sufficient to provide, at the receiver, a SNR that is large enough for the receiver to recover a data symbol from the MIMO-OFDM signal transmitted over the signal pipe. For example, the receiver 464 can determine whether a signal pipe has sufficient gain in a manner similar to that described above in conjunction with the step 510.

If, at the step 518, the receiver 464 determines that not all of the signal pipes have sufficient gain, then the receiver proceeds along the procedural path that culminates in a reconfiguration of one or more of the antennas 92 and 94 in an effort to cause each of the signal pipes to have a sufficient gain. More specifically, the receiver 464 proceeds to a step 520, at which the receiver selects only the transmit antennas 92 that were identified in the step 508 or in the step 514 and that correspond to signal pipes having sufficient gain. Then, at a step 522, the receiver 464 determines a difference $Gain_{diff}$ between the highest and lowest gains of the signal pipes corresponding to the antennas 92 selected at the step 520; as discussed below in conjunction with steps 526 and 528, $Gain_{diff}$ is an indication of the channel capacity C. Next, the receiver 464 proceeds to a step 524, which is described below.

In contrast, if, at the step 518, the receiver 464 determines that all of the signal pipes corresponding to all of the transmit antennas 92 have sufficient gain, then, at a step 526, the receiver determines the difference $Gain_{diff}$ between the highest and lowest gains of the signal pipes corresponding to the all of the antennas 92, and, at a step 528, compares Gain$_{diff}$ to a threshold Th$_{Gaindiff}$. As described above in conjunction with FIG. 6, the capacity of the communication channel is typically highest when the signal pipes with sufficient gain have similar gains (i.e., when the eigen values of the singular value decomposition of the channel matrix are equal to one another), as compared to one or more signal pipes having relatively large gains and other signal pipes having significantly lower gains. For example, if Th$_{gain}$=1 and there are four signal pipes with sufficient gain, then the four signal pipes having normalized gains of 5, 5, 5, 5 (Gain$_{diff}$=0) typically provide a higher channel capacity than do the four signal pipes having normalized gains 100, 2, 1.5, 1.3 (Gain$_{diff}$=98.7). Consequently, as discussed below, if Gain$_{diff}$>Th$_{Gaindiff}$, then the receiver 464 can cause one or both of the antenna configuring circuits 472 and 474 to reconfigure the characteristics of one or more of the antennas 92 and 94 in an effort to improve the channel capacity by reducing the difference Gain$_{diff}$ between the gains of the signal pipes with the highest and lowest gains.

If, at the step 528, the receiver 464 determines that Gain$_{diff}$>Th$_{Gaindiff}$, then the receiver proceeds along the procedural path that culminates in a reconfiguration of one or more of the antennas 92 and 94 in an effort to cause Gain$_{diff}$≤Th$_{Gaindiff}$. More specifically, the receiver 464 proceeds to the step 524, at which the receiver saves the current antenna configuration, the selected ones of the transmit antennas 92 for the current antenna configuration, and Gain$_{diff}$ for the current antenna configuration in a memory circuit that can be part of the transmitter-receiver circuitry 470. Next, at a step 530, the receiver 464 determines whether the number AntConfig of antenna configurations analyzed in the above manner exceeds a threshold number Th$_{Configuration\_number}$. If AntConfig>Th$_{Configuration\_number}$, then the receiver 464 proceeds to a step 532, which is described below. In contrast, if If AntConfig≤Th$_{Configuration\_number}$, then the receiver 464 proceeds to a step 534.

At the step 534, the receiver 464 causes one or more of the antennas 92 and 94 to be reconfigured in an effort to increase the channel capacity C by improving one or more of the effective rank of the estimated channel rank, the number of signal pipes with sufficient gain, and the difference Gain$_{diff}$ between the gains of the available signal pipes with the highest and lowest gains ("available" means that the signal pipes correspond to a transmit antenna 92 that is distinguishable at the receiver 464 and that has sufficient gain). More specifically, the receiver 464 can cause the antenna configuring circuit 474 to alter one or more reception characteristics (e.g., radiation pattern, gain, directivity, phase, polarization, orientation, location) of one or more of the antennas 94, and can send a signal (e.g., using a previously estimated channel matrix between the receiver 464 acting as a transmitter and the transmitter 462 acting as a receiver) to the transmitter 462 to cause the antenna configuring circuit 472 to alter one or more transmission characteristics of one or more of the antennas 92. The antenna configuring circuits 472 and 474 can respectively alter the characteristic of an antenna 92 and 94, respectively, according to any suitable algorithm. For example, the circuits 472 and 474 may alter the characteristic of an antenna 92 and 94, respectively, in a random manner, or according to a stored algorithm that takes into account, e.g., the channel state information (i.e., values of elements of the estimated channel matrix $\hat{H}$), the application in which the transmitter 462 and receiver 464 are being used, or a statistical analysis of the channel state information over time.

Next, at a step, 536, the receiver 464 increments AntConfig.

Then, the receiver 464 returns to the step 502 to repeat the above-described portion of the procedure 500.

Referring again to step 530, If AntConfig>Th$_{Configuration\_number}$, then at a step 532, the receiver 464 causes the antenna configuring circuits 472 and 474 to configure the antennas 92 and 94 in the best antenna configuration that the receiver previously analyzed and saved. The receiver 464 can determine which of the saved antenna configurations is best according to any suitable algorithm. For example, the best antenna configuration can be the configuration that yields the highest channel capacity C, or the highest number of available signal pipes (in the case of multiple configurations yielding a same highest number of available signal pipes, the best configuration can be the one with the lowest value of Gain$_{diff}$).

Next, at a step 538, the receiver 464 sends to the transmitter 462 a signal that causes the antenna-selector circuit 476 to select the transmit antennas 92 that were selected in the best saved antenna configuration. Then the receiver 464 proceeds to a step 540.

Referring again to step 528, if Gain$_{diff}$≤Th$_{Gaindiff}$, then the receiver 464 also proceeds to the step 540.

That is, the receiver 464 proceeds to step 540 under the following two conditions: 1) the number of tried antenna configurations exceeds a threshold number (AntConfig>Th$_{Configuration\_number}$), or 2) the receiver 464 finds a configuration that provides an estimated channel matrix that is effective full rank, sufficient gain for all signal pipes, and Gain$_{diff}$≤Th$_{Gaindiff}$.

At the step 540, the receiver 464 sets the sizes (e.g., number of bits) of the respective data symbols to be transmitted by the selected transmit antennas 92 according the gains of the signal pipes corresponding to the selected transmit antennas. For example, if a signal pipe has a higher gain than another signal pipe, then the receiver 464 can set the number of bits in the data symbol to be transmitted over the former signal pipe higher than the number of bits in the data symbol to be transmitted over the latter signal pipe. For example, the receiver 464 can use a "waterfall" procedure to set the data-symbol sizes as described in *Introduction to MIMO Communications*, which was previously incorporated by reference. After setting the symbol sizes, the receiver 464 sends to the transmitter 462 the identities of the selected transmit antennas 92 and the sizes of their respective data symbols. The receiver 464 may send this information to the transmitter 462 via the antennas 94 (acting as transmit antennas) and 92 (acting as receive antennas), and the transmitter 462 may recover this information using an estimated channel matrix that the transmitter 462, then acting as a receiver, previously estimated.

Next, at a step 542, the transmitter 462 transmits to the receiver 464 via the selected transmit antennas 92 respective data symbols each having the respective size set by the receiver 462 at step 540. Regarding the unselected transmit antennas 92 (if any are unselected), the transmitter 462 can deactivate them (i.e., send no signals via the unselected antennas), or can transmit redundantly via one or more of these unselected antennas a data symbol that the transmitter is also transmitting via a selected transmit antenna. For example, suppose the transmit antenna 92$_1$ is unselected, and the transmitter 462 transmits a data symbol DS$_0$ via the selected transmit antenna 92$_0$. The transmitter 462 also can elect to transmit DS$_0$ via the transmit antenna 92$_k$. Such redundant transmission of DS$_0$ can increase, at the receiver 464, the SNR of the MIMO-OFDM signals carrying DS$_0$, and can allow the transmitter 462 to increase the size of DS$_0$.

Still referring to FIG. 41, alternate embodiments of the procedure 500 are contemplated. For example, the procedure 500 may include steps not described herein, the procedure may omit described steps, and the transmitter 462 and receiver 464 may perform the steps 502-540 in an order that is different from the described order. Furthermore, the transmitter 462 can perform one or more of the steps 504-540 in response to channel-state and other information that the receiver 464 provides to the transmitter. Moreover, the receiver 464 can perform the procedure 500 before each data symbol to be transmitted by the transmitter 462, or can perform the procedure periodically such as described above in conjunction with FIG. 4. In the latter case, instead of iteratively performing the procedure 500 to determine the best antenna configuration for the current channel conditions, the receiver 464 can save a suitable prior number (e.g., 10, 100, 300) of estimated channel matrices, form and continually update a statistical representation (e.g., an average) of the channel over time using these estimated channel matrices, determine a suitable antenna configuration for this statistical representation, and then cause the antenna-configuration circuits 472 and 474 to configure the antennas 92 and 94, respectively, in the determined configuration.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

For example, any circuitry described above (e.g., the transmitter-receiver circuitry 68, 70, 468, and 470 of FIGS. 7, 12-21, and 40, respectively) can be formed from integrated-circuit components (e.g., transistors, resistors, capacitors, inductors, diodes) that are dedicated to performing the functions of the circuitry, can be formed from circuitry, such as microprocessor circuitry, that is configured to execute instructions to perform the circuit functions, can be formed from circuitry, such as field-programmable-gate-array circuitry, that is configurable with firmware to perform the circuit functions, or can be formed from a combination or subcombination of dedicated, instruction-executing, and firmware-configurable circuitry. In the case where at least some of the circuitry is instruction-executing or firmware-configurable, the corresponding instructions and firmware can be stored on a tangible, non-transitory computer-readable medium such as FLASH, RAM, or other types of electronic memory, a magnetic or an optical storage medium, or any other suitable type of a storage medium.

Furthermore, the MIMO-OFDM systems 80 and 460 of FIGS. 7, 12-21, and 40 may include any number of, and any suitable type of, transmitter-receivers 82, 84, 462, and 484, such as computers, laptops, tablets, smart phones, vehicles, medical devices and monitors, and items belonging to the Internet of Things (IoT).

Moreover, although the MIMO-OFDM systems 80 and 460 of FIGS. 7, 12-21, and 40 are described as including antennas 92 and 94 that are spaced apart from adjacent antennas by a minimum distance of less than $$\frac{\lambda_c}{2},$$

these systems may still provide an increased channel capacity when this minimum distance is greater than or equal to $$\frac{\lambda_c}{2}.$$

This is because even with this spacing, and regardless of whether the receiver is in the far field of the transmitter, the diversity of the channel portion between the transmit and receive antennas may be, by itself, insufficient to provide an estimated channel matrix of effective full rank, and to provide all signal pipes having sufficient gain.

While various aspects and embodiments have been disclosed herein, other aspects and embodiments will be apparent to those skilled in the art from the detailed description provided herein. The various aspects and embodiments disclosed herein are for purposes of illustration and are not intended to be limiting, with the true scope and spirit being indicated by the following claims.

This disclosure has been made with reference to various example embodiments. However, those skilled in the art will recognize that changes and modifications may be made to the embodiments without departing from the scope of the present disclosure. For example, various operational steps, as well as components for carrying out operational steps, may be implemented in alternate ways depending upon the particular application or in consideration of any number of cost functions associated with the operation of the system; e.g., one or more of the steps may be deleted, modified, or combined with other steps.

Additionally, as will be appreciated by one of ordinary skill in the art, principles of the present disclosure, including components, may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create a means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus.

In an embodiment, the system is integrated in such a manner that the system operates as a unique system configured specifically for function of the device, and any associated computing devices of the system operate as specific use computers for purposes of the claimed system, and not general use computers. In an embodiment, at least one associated computing device of the system operates as specific use computers for purposes of the claimed system, and not general use computers. In an embodiment, at least one of the associated computing devices of the system are hardwired with a specific ROM to instruct the at least one computing device.

The following references are incorporated by reference:
1. L. J. Chu, "Physical limitations of omnidirectional antennas," J. Appl. Phys., vol. 19, pp. 1163-1175; December, 1948.
2. R. F. Harrington, "On the Gain and Beamwidth of Directional Antennas," IRE Transactions on Antennas and Propagation, vol. 6, pp. 219-225; July, 1958.
3. R. F. Harrington, "Effect of Antenna Size on Gain, Bandwidth, and Efficiency", Journal of Research of the National Bureau of Standards—D. Radio Propagation, vol. 64D, No. 1, January-February 1960.
4. R. F. Harrington, "Antenna excitation for maximum gain", Antennas and Propagation, IEEE Transactions on, vol. 13, pp. 896-903; November 1965.
5. Y. T. Lo et al., Optimization of Directivity and Signal-to-Noise Ratio of an Arbitrary Antenna Array", Proc. IEEE, vol. 54, 0.1033; August 1966.
6. R. C. Hansen, "Fundamental limitations in Antennas", Proc. IEEE, vol. 69, p. 170; February 1981.
7. A. D. Yaghjian et al., "Electrically small supergain endfire arrays", Radio Science, vol. 43, RS3002, doi:10.1029/2007RS003747; May 2008.
8. Per-Simon Kildal and Steven R. Best, "Further Investigations of Fundamental Directivity Limitations of Small Antennas With and Without Ground Planes", Antennas and Propagation Society International Symposium, 2008. AP-S 2008. IEEE, doi:10.1109/APS.2008.4618968, p. 1-4; July 2008.
9. D. Sievenpiper, "Experimental Validation of Performance Limits and Design Guidelines for Small Antennas", Antennas and Propagation, IEEE Transactions on, vol. 60, pp. 8-19; January, 2012.
10. R. F. Harrington, "Resonant Behavior of a Small Aperture Backed by a Conducting Body", IEEE Trans. Ant. Prop vol. 30, p. 205; March 1982.
11. M. Gustafsson et al., "Physical limitations on antennas of arbitrary shape", Proc. R. Soc. A (2007) 463, 2589-2607; July 2007.
12. James S. McLean, "A Re-Examination of the Fundamental Limits on the Radiation Q of Electrically Small Antennas", IEEE Trans. Ant. Prop., vol. 44, p. 672; May 1996.
13. R. J. Dinger et al., "A Survey of Possible Passive Antenna Applications of High-Temperature Superconductors", IEEE Trans. Microwave Theory and Techniques, vol. 39, p. 1498; September 1991.
14. Kalis et al., Parasitic antenna arrays for wireless MIMO systems, Springer, New York, 2014.
15. N. Yaru, "A Note on Super-Gain Antenna Arrays," Proceedings of the IRE, Vol. 39, Issue 9, pp. 1081-1085; September 1951.

What is claimed is:
1. A transmitter-receiver, comprising:
a number of antennas each spaced from another of the antennas by approximately a distance and configured to provide, at one or more wavelengths that are greater than twice the distance, a channel capacity that exceeds a saturation channel capacity;
a transmitter circuit configured
to generate a number of first signals each having a wavelength that is greater than twice the distance, the number of first signals related to a number of first signal pipes, and
to couple each of the number of first signals to a respective one of the antennas; and
a receiver circuit configured
to receive, from a remote transmitter circuit via at least one of the antennas, a number of second signals each having a wavelength that is greater than twice the distance, the number of second signals related to the number of first signal pipes, and
to recover information from each of the number of second signals.

2. The transmitter-receiver of claim 1 wherein the number of antennas forms at least part of an antenna array.

3. The transmitter-receiver of claim 1 wherein at least two of the number of antennas form a metamaterial.

4. The transmitter-receiver of claim 1 wherein:
one of the number of antennas is configured to have a first transmission characteristic, and another one of the number of antennas is configured to have a second transmission characteristic that is different from the first transmission characteristic, while the transmitter circuit is coupling respective ones of the number of first signals to the one and to the other one of the number of antennas; and
one of the number of antennas is configured to have a first reception characteristic, and another one of the number of antennas is configured to have a second reception characteristic that is different from the first reception characteristic, while the receiver circuit is receiving at least one of the number of second signals with at least one of the one and the other one of the number of antennas.

5. The transmitter-receiver of claim 1 wherein:
the transmitter circuit is configured to cause one of the number of antennas to have a first transmission characteristic, and another one of the number of antennas to have a second transmission characteristic that is different from the first transmission characteristic, while the transmitter circuit is coupling respective ones of the number of first signals to the one and to the other one of the number of antennas; and
the receiver circuit is configured to cause one of the number of antennas to have a first reception characteristic, and another one of the number of antennas to have a second reception characteristic that is different from the first reception characteristic, while the receiver circuit is receiving at least one of the number of second signals with at least one of the one and the other one of the number of antennas.

6. The transmitter-receiver of claim 5 wherein:
the transmitter circuit is configured
to cause the one of the number of antennas to have the first transmission characteristic by configuring a parameter of the one of the number of antennas, and
to cause the other one of the number of antennas to have the second transmission characteristic by configuring a parameter of the other one of the number of antennas; and
the receiver circuit is configured
to cause the one of the number of antennas to have the first reception characteristic by configuring a parameter of the one of the number of antennas, and
to cause the other one of the number of antennas to have the second reception characteristic by configuring a parameter of the other one of the number of antennas.

7. The transmitter-receiver of claim 1 wherein:
the saturation channel capacity is the capacity of a number of second signal pipes that the number of antennas would provide if each of the number of antennas were to have a same antenna profile; and
the number of first signal pipes exceeds the number of second signal pipes.

8. The transmitter-receiver of claim 1 wherein:
the saturation channel capacity is the capacity of a number of second signal pipes, the number of second signal pipes being equal to a rank of a channel matrix that would represent a channel if each of the number of antennas were to have a same antenna profile; and
the number of first signal pipes exceeds the number of second signal pipes.

9. The transmitter-receiver of claim 1 wherein the saturation channel capacity is the channel capacity that the number of antennas would provide if each of the number of antennas were to have a same antenna profile.

10. The transmitter-receiver of claim 1 wherein:
the receiver circuit is further configured to determine channel information for a channel over which the number of second signals propagate from the remote transmitter circuit; and
the transmitter circuit is further configured to provide the determined channel information to the remote transmitter circuit.

11. The transmitter-receiver of claim 1 wherein the transmitter circuit is configured:
to receive, from a remote transmitter-receiver circuit, channel information for a channel over which the number of first signals propagate; and
to determine the number of first signal pipes in response to the channel information.

12. The transmitter-receiver of claim 1 wherein the number of first signals equals the number of first signal pipes.

13. The transmitter-receiver of claim 1 wherein the number of first signals is less than the number of first signal pipes.

14. The transmitter-receiver of claim 1 wherein the number of first signal pipes equals the number of antennas.

15. The transmitter-receiver of claim 1 wherein the number of first signal pipes is less than the number of antennas.

16. The transmitter-receiver of claim 1 wherein the number of first signals equals the number of antennas.

17. The transmitter-receiver of claim 1 wherein the number of first signals is less than the number of antennas.

18. The transmitter-receiver of claim 1 wherein the number of second signals equals the number of antennas.

19. The transmitter-receiver of claim 1 wherein the number of second signals is less than the number of antennas.

20. The transmitter-receiver of claim 1 wherein the number of second signals is greater than the number of antennas.

21. A method, comprising:
generating a number of first signals each having a wavelength that is greater than twice a distance, the number of first signals related to a number of first signal pipes of a channel having a capacity;
transmitting each of the number of first signals over the channel with a respective one of a number of antennas each spaced from another of the antennas by approximately the distance such that the capacity of the channel exceeds a saturation capacity of the channel;
receiving each of a number of second signals over the channel with at least one of the number of antennas such that the capacity of the channel exceeds the saturation capacity of the channel, each of the number of second signals having a wavelength that is greater than twice the distance, the number of second signals related to the number of first signal pipes; and
recovering information from the received number of second signals.

22. The method of claim 21 wherein:
the saturation channel capacity is the capacity of a number of second signal pipes that the number of antennas would provide if each of the number of antennas were to have a same antenna profile; and
the number of first signal pipes exceeds the number of second signal pipes.

23. The method of claim 21 wherein:
the saturation capacity of the channel is the capacity of a number of second signal pipes, the number of second signal pipes being equal to a rank of a channel matrix that would represent the channel if each of the number of antennas were to have a same antenna profile; and
the number of first signal pipes exceeds the number of second signal pipes.

24. The method of claim 21 wherein the saturation capacity of the channel is the channel capacity that the number of antennas would provide if each of the number of antennas were to have a same antenna profile.

25. The method of claim 21, further comprising determining the number of first signal pipes.

26. The method of claim 21, further comprising:
determining channel information; and
determining the number of first signal pipes in response to the channel information.

27. A tangible non-transitory computer-readable medium storing instructions that, when executed by a computing machine, cause the computing machine, or circuitry under control of the computing machine:
to generate a number of first signals each having a wavelength that is greater than twice a distance, the number of first signals related to a number of first signal pipes of a channel having a capacity;
to transmit each of the number of first signals over the channel with a respective one of a number of antennas each spaced from another of the antennas by approximately the distance such that the capacity of the channel exceeds a saturation capacity of the channel;
to receive each of a number of second signals over the channel with at least one of the number of antennas such that the capacity of the channel exceeds the saturation capacity of the channel, each of the number of second signals having a wavelength that is greater than twice the distance, the number of second signals related to the number of first signal pipes; and to recover information from the received number of second signals.

28. The tangible non-transitory computer-readable medium of claim 27 wherein:

the saturation capacity of the channel is the capacity of a number of second signal pipes that the number of antennas would provide if each of the number of antennas were to have a same antenna profile; and the number of first signal pipes exceeds the number of second signal pipes.

29. The tangible non-transitory computer-readable medium of claim 27 wherein:

the saturation capacity of the channel is the capacity of a number of second signal pipes, the number of second signal pipes being equal to a rank of a channel matrix that would represent the channel if each of the number of antennas were to have a same antenna profile; and the number of first signal pipes exceeds the number of second signal pipes.

30. The tangible non-transitory computer-readable medium of claim 27 wherein the saturation capacity of the channel is the channel capacity that the number of antennas would provide if each of the number of antennas were to have a same antenna profile.

* * * * *